(12) United States Patent
Griffin et al.

(10) Patent No.: US 9,201,510 B2
(45) Date of Patent: Dec. 1, 2015

(54) METHOD AND DEVICE HAVING TOUCHSCREEN KEYBOARD WITH VISUAL CUES

(75) Inventors: Jason Tyler Griffin, Kitchener (CA); Jerome Pasquero, Kitchener (CA); Alistair Robert Hamilton, Sammamish, WA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/447,704

(22) Filed: Apr. 16, 2012

(65) Prior Publication Data

US 2013/0275923 A1 Oct. 17, 2013

(51) Int. Cl.
*G06F 3/041* (2006.01)
*G06F 3/023* (2006.01)
*G06F 3/0488* (2013.01)

(52) U.S. Cl.
CPC .......... *G06F 3/0237* (2013.01); *G06F 3/04886* (2013.01)

(58) Field of Classification Search
CPC . G06F 3/04886; G06F 3/0488; G06F 3/0237; G06F 3/0233; G06F 3/0416; G06F 3/04895; G06F 3/0481; G06F 8/38; G06F 3/04817; G06F 3/04842
USPC ........................................................ 345/173
See application file for complete search history.

(56) References Cited

U.S. PATENT DOCUMENTS

| | | |
|---|---|---|
| 3,872,433 A | 3/1975 | Holmes et al. |
| 4,408,302 A | 10/1983 | Fessel et al. |
| 5,261,009 A | 11/1993 | Bokser |
| 5,664,127 A | 9/1997 | Anderson et al. |
| 5,832,528 A | 11/1998 | Kwatinetz et al. |
| 5,963,671 A | 10/1999 | Comerford et al. |
| 6,002,390 A | 12/1999 | Masui |
| 6,064,340 A | 5/2000 | Anderson et al. |
| 6,094,197 A | 7/2000 | Buxton et al. |
| 6,223,059 B1 | 4/2001 | Haestrup |

(Continued)

FOREIGN PATENT DOCUMENTS

| | | |
|---|---|---|
| CA | 2688204 A1 | 7/2010 |
| CA | 2812457 A1 | 10/2013 |

(Continued)

OTHER PUBLICATIONS touchpal (combination of two sources: first, youtube video on touchpal at url: http://www.youtube.com/watch?v=eJUWFEXxJal, dated on Dec. 1, 2011, with screen captures shown below; second, TimeOfIndia website article on touchpal at url: http://articles.timesofindia.indiatimes.com/2012-01-29/computing/30673975_1_swype-android-market-qwerty).*

(Continued)

*Primary Examiner* — Charles Hicks
*Assistant Examiner* — Charles Zheng
(74) *Attorney, Agent, or Firm* — Fish & Richardson P.C.

(57) ABSTRACT

A method for providing visual cues rendered on a display is provided. The method comprises: detecting a touch input associated with a user interface element rendered on the display; determining an input direction of the touch input; and displaying on the display a visual cue associated with the user interface element, wherein the visual cue is located at a position based on the input direction of the touch input.

8 Claims, 40 Drawing Sheets

(56) References Cited

U.S. PATENT DOCUMENTS

| | | |
|---|---|---|
| 6,226,299 B1 | 5/2001 | Henson |
| 6,351,634 B1 | 2/2002 | Shin |
| 6,421,453 B1 | 7/2002 | Kanevsky et al. |
| 6,573,844 B1 | 6/2003 | Venolia et al. |
| 6,621,424 B1 | 9/2003 | Brand |
| 6,646,572 B1 | 11/2003 | Brand |
| 6,801,190 B1 | 10/2004 | Robinson et al. |
| 7,061,403 B2 | 6/2006 | Fux |
| 7,098,896 B2 | 8/2006 | Kushler et al. |
| 7,107,204 B1 | 9/2006 | Liu et al. |
| 7,216,588 B2 | 5/2007 | Suess |
| 7,259,752 B1 | 8/2007 | Simmons |
| 7,277,088 B2 | 10/2007 | Robinson et al. |
| 7,292,226 B2 | 11/2007 | Matsuura et al. |
| 7,382,358 B2 | 6/2008 | Kushler et al. |
| 7,394,346 B2 | 7/2008 | Bodin |
| 7,443,316 B2 | 10/2008 | Lim |
| 7,479,949 B2 | 1/2009 | Jobs et al. |
| 7,487,461 B2 | 2/2009 | Zhai et al. |
| 7,526,316 B2 | 4/2009 | Shimizu |
| 7,530,031 B2 | 5/2009 | Iwamura et al. |
| 7,661,068 B2 | 2/2010 | Lund |
| 7,671,765 B2 | 3/2010 | Fux |
| 7,698,127 B2 | 4/2010 | Trower, II et al. |
| 7,886,233 B2 | 2/2011 | Rainisto et al. |
| 7,934,156 B2 | 4/2011 | Forstall et al. |
| 8,023,930 B2 | 9/2011 | Won |
| 8,059,101 B2 | 11/2011 | Westerman et al. |
| 8,065,624 B2 | 11/2011 | Morin et al. |
| 8,201,087 B2 | 6/2012 | Kay et al. |
| 8,225,203 B2 | 7/2012 | Unruh |
| 8,289,283 B2 | 10/2012 | Kida et al. |
| 8,326,358 B2 | 12/2012 | Runstedler et al. |
| 8,490,008 B2 | 7/2013 | Griffin et al. |
| 8,516,386 B2 | 8/2013 | Adam et al. |
| 8,542,206 B2 | 9/2013 | Westerman et al. |
| 8,543,934 B1 | 9/2013 | Thorsander et al. |
| 2002/0080186 A1 | 6/2002 | Frederiksen |
| 2002/0097270 A1 | 7/2002 | Keely et al. |
| 2002/0154037 A1 | 10/2002 | Houston |
| 2002/0180797 A1 | 12/2002 | Bachmann |
| 2004/0111475 A1 | 6/2004 | Schultz |
| 2004/0135818 A1 | 7/2004 | Thomson et al. |
| 2004/0140956 A1 | 7/2004 | Kushler et al. |
| 2004/0153963 A1 | 8/2004 | Simpson et al. |
| 2004/0201576 A1 | 10/2004 | Shimada et al. |
| 2005/0017954 A1 | 1/2005 | Kay et al. |
| 2005/0024341 A1 | 2/2005 | Gillespie et al. |
| 2005/0039137 A1 | 2/2005 | Bellwood et al. |
| 2005/0052425 A1 | 3/2005 | Zadesky et al. |
| 2005/0093826 A1 | 5/2005 | Huh |
| 2005/0162407 A1 | 7/2005 | Sakurai et al. |
| 2005/0195173 A1 | 9/2005 | McKay |
| 2005/0244208 A1 | 11/2005 | Suess |
| 2005/0275632 A1 | 12/2005 | Pu et al. |
| 2006/0022947 A1 | 2/2006 | Griffin et al. |
| 2006/0026521 A1 | 2/2006 | Hotelling et al. |
| 2006/0033724 A1 | 2/2006 | Chaudhri et al. |
| 2006/0053387 A1 | 3/2006 | Ording |
| 2006/0176283 A1 | 8/2006 | Suraqui |
| 2006/0209040 A1 | 9/2006 | Garside et al. |
| 2006/0239562 A1 | 10/2006 | Bhattacharyay et al. |
| 2006/0253793 A1 | 11/2006 | Zhai et al. |
| 2006/0265648 A1 | 11/2006 | Rainisto et al. |
| 2006/0265668 A1 | 11/2006 | Rainisto |
| 2006/0279548 A1 | 12/2006 | Geaghan |
| 2007/0015534 A1 | 1/2007 | Shimizu |
| 2007/0046641 A1 | 3/2007 | Lim |
| 2007/0061753 A1 | 3/2007 | Ng et al. |
| 2007/0097096 A1 | 5/2007 | Rosenberg |
| 2007/0150842 A1 | 6/2007 | Chaudhri et al. |
| 2007/0156394 A1 | 7/2007 | Banerjee et al. |
| 2007/0157085 A1 | 7/2007 | Peters |
| 2007/0229476 A1 | 10/2007 | Huh |
| 2007/0256029 A1 | 11/2007 | Maxwell |
| 2007/0263932 A1 | 11/2007 | Bernardin et al. |
| 2008/0033713 A1 | 2/2008 | Brostrom |
| 2008/0100581 A1 | 5/2008 | Fux |
| 2008/0122796 A1 | 5/2008 | Jobs et al. |
| 2008/0126387 A1 | 5/2008 | Blinnikka |
| 2008/0136587 A1 | 6/2008 | Orr |
| 2008/0141125 A1 | 6/2008 | Ghassabian |
| 2008/0158020 A1 | 7/2008 | Griffin |
| 2008/0168366 A1 | 7/2008 | Kocienda et al. |
| 2008/0184360 A1 | 7/2008 | Kornilovsky et al. |
| 2008/0189605 A1 | 8/2008 | Kay et al. |
| 2008/0195388 A1 | 8/2008 | Bower et al. |
| 2008/0231610 A1 | 9/2008 | Hotelling et al. |
| 2008/0259040 A1 | 10/2008 | Ording et al. |
| 2008/0266261 A1 | 10/2008 | Idzik |
| 2008/0273013 A1 | 11/2008 | Levine et al. |
| 2008/0281583 A1 | 11/2008 | Slothouber et al. |
| 2008/0304890 A1 | 12/2008 | Shin et al. |
| 2008/0309644 A1 | 12/2008 | Arimoto |
| 2008/0316183 A1 | 12/2008 | Westerman et al. |
| 2008/0318635 A1 | 12/2008 | Yoon et al. |
| 2009/0002326 A1 | 1/2009 | Pihlaja |
| 2009/0006991 A1 | 1/2009 | Lindberg et al. |
| 2009/0025089 A1 | 1/2009 | Martin et al. |
| 2009/0058823 A1 | 3/2009 | Kocienda |
| 2009/0058830 A1 | 3/2009 | Herz et al. |
| 2009/0066668 A1 | 3/2009 | Kim et al. |
| 2009/0077464 A1 | 3/2009 | Goldsmith et al. |
| 2009/0085881 A1 | 4/2009 | Keam |
| 2009/0094562 A1 | 4/2009 | Jeong et al. |
| 2009/0125848 A1 | 5/2009 | Keohane et al. |
| 2009/0132576 A1 | 5/2009 | Miller et al. |
| 2009/0144667 A1 | 6/2009 | Christoffersson et al. |
| 2009/0150785 A1 | 6/2009 | Asami et al. |
| 2009/0160800 A1 | 6/2009 | Liu et al. |
| 2009/0167700 A1 | 7/2009 | Westerman et al. |
| 2009/0174667 A1 | 7/2009 | Kocienda et al. |
| 2009/0193334 A1 | 7/2009 | Assadollahi |
| 2009/0213081 A1 | 8/2009 | Case, Jr. |
| 2009/0228792 A1 | 9/2009 | Van Os et al. |
| 2009/0228842 A1 | 9/2009 | Westerman et al. |
| 2009/0237361 A1 | 9/2009 | Mosby et al. |
| 2009/0247112 A1 | 10/2009 | Lundy et al. |
| 2009/0251410 A1 | 10/2009 | Mori et al. |
| 2009/0254818 A1 | 10/2009 | Jania et al. |
| 2009/0259962 A1 | 10/2009 | Beale |
| 2009/0265669 A1 | 10/2009 | Kida et al. |
| 2009/0267909 A1 | 10/2009 | Chen et al. |
| 2009/0284471 A1 | 11/2009 | Longe et al. |
| 2009/0295737 A1 | 12/2009 | Goldsmith et al. |
| 2009/0307768 A1 | 12/2009 | Zhang et al. |
| 2009/0313693 A1 | 12/2009 | Rogers |
| 2010/0020033 A1 | 1/2010 | Nwosu |
| 2010/0020036 A1 | 1/2010 | Hui et al. |
| 2010/0026650 A1 | 2/2010 | Srivastava et al. |
| 2010/0045705 A1 | 2/2010 | Vertegaal et al. |
| 2010/0050121 A1 | 2/2010 | Shin |
| 2010/0052880 A1 | 3/2010 | Laitinen et al. |
| 2010/0070908 A1 | 3/2010 | Mori et al. |
| 2010/0079413 A1 | 4/2010 | Kawashima et al. |
| 2010/0095238 A1 | 4/2010 | Baudet |
| 2010/0097321 A1 | 4/2010 | Son et al. |
| 2010/0115402 A1 | 5/2010 | Knaven et al. |
| 2010/0127991 A1 | 5/2010 | Yee |
| 2010/0131900 A1 | 5/2010 | Spetalnick |
| 2010/0141590 A1 | 6/2010 | Markiewicz et al. |
| 2010/0156813 A1 | 6/2010 | Duarte et al. |
| 2010/0156818 A1 | 6/2010 | Burrough et al. |
| 2010/0161538 A1 | 6/2010 | Kennedy, Jr. et al. |
| 2010/0197352 A1 | 8/2010 | Runstedler et al. |
| 2010/0199176 A1 | 8/2010 | Chronqvist |
| 2010/0225599 A1 | 9/2010 | Danielsson et al. |
| 2010/0235726 A1 | 9/2010 | Ording et al. |
| 2010/0253620 A1 | 10/2010 | Singhal |
| 2010/0257478 A1 | 10/2010 | Longe et al. |
| 2010/0257490 A1 | 10/2010 | Lyon et al. |
| 2010/0259482 A1 | 10/2010 | Ball |
| 2010/0259561 A1 | 10/2010 | Forutanpour et al. |
| 2010/0265181 A1 | 10/2010 | Shore |

(56) References Cited

U.S. PATENT DOCUMENTS

| | | |
|---|---|---|
| 2010/0269040 A1 | 10/2010 | Lee |
| 2010/0277424 A1 | 11/2010 | Chang et al. |
| 2010/0287486 A1 | 11/2010 | Coddington |
| 2010/0292984 A1 | 11/2010 | Huang et al. |
| 2010/0293475 A1* | 11/2010 | Nottingham et al. ......... 715/752 |
| 2010/0295801 A1 | 11/2010 | Bestle et al. |
| 2010/0313127 A1 | 12/2010 | Gosper et al. |
| 2010/0313158 A1 | 12/2010 | Lee et al. |
| 2010/0315266 A1 | 12/2010 | Gunawardana et al. |
| 2010/0325721 A1 | 12/2010 | Bandyopadhyay et al. |
| 2010/0333027 A1 | 12/2010 | Martensson et al. |
| 2011/0010655 A1 | 1/2011 | Dostie et al. |
| 2011/0018812 A1 | 1/2011 | Baird |
| 2011/0029862 A1 | 2/2011 | Scott et al. |
| 2011/0035696 A1 | 2/2011 | Elazari et al. |
| 2011/0041056 A1 | 2/2011 | Griffin et al. |
| 2011/0043455 A1 | 2/2011 | Roth et al. |
| 2011/0060984 A1 | 3/2011 | Lee |
| 2011/0061029 A1 | 3/2011 | Yeh et al. |
| 2011/0063231 A1 | 3/2011 | Jakobs et al. |
| 2011/0074704 A1 | 3/2011 | Causey et al. |
| 2011/0078613 A1 | 3/2011 | Bangalore |
| 2011/0086674 A1 | 4/2011 | Rider et al. |
| 2011/0090151 A1 | 4/2011 | Huang et al. |
| 2011/0099505 A1 | 4/2011 | Dahl |
| 2011/0099506 A1 | 4/2011 | Gargi et al. |
| 2011/0119623 A1 | 5/2011 | Kim |
| 2011/0148572 A1 | 6/2011 | Ku |
| 2011/0171617 A1 | 7/2011 | Yeh et al. |
| 2011/0179355 A1 | 7/2011 | Karlsson |
| 2011/0193797 A1 | 8/2011 | Unruh |
| 2011/0201387 A1 | 8/2011 | Paek et al. |
| 2011/0202835 A1 | 8/2011 | Jakobsson et al. |
| 2011/0202876 A1 | 8/2011 | Badger et al. |
| 2011/0209087 A1 | 8/2011 | Guyot-Sionnest |
| 2011/0233407 A1 | 9/2011 | Wu et al. |
| 2011/0239153 A1 | 9/2011 | Carter et al. |
| 2011/0242138 A1 | 10/2011 | Tribble |
| 2011/0248945 A1 | 10/2011 | Higashitani |
| 2011/0249076 A1 | 10/2011 | Zhou et al. |
| 2011/0256848 A1 | 10/2011 | Bok et al. |
| 2011/0260829 A1 | 10/2011 | Lee |
| 2011/0285656 A1 | 11/2011 | Yaksick et al. |
| 2011/0302518 A1 | 12/2011 | Zhang |
| 2011/0305494 A1 | 12/2011 | Kang |
| 2012/0005576 A1 | 1/2012 | Assadollahi |
| 2012/0023447 A1 | 1/2012 | Hoshino et al. |
| 2012/0029910 A1 | 2/2012 | Medlock et al. |
| 2012/0030566 A1 | 2/2012 | Victor |
| 2012/0030623 A1 | 2/2012 | Hoellwarth |
| 2012/0030624 A1* | 2/2012 | Migos ............................ 715/830 |
| 2012/0036469 A1 | 2/2012 | Suraqui |
| 2012/0053887 A1 | 3/2012 | Nurmi |
| 2012/0062465 A1 | 3/2012 | Spetalnick |
| 2012/0062494 A1 | 3/2012 | Hsieh et al. |
| 2012/0068937 A1 | 3/2012 | Backlund et al. |
| 2012/0079373 A1 | 3/2012 | Kocienda et al. |
| 2012/0084734 A1 | 4/2012 | Wilairat |
| 2012/0092278 A1 | 4/2012 | Yamano |
| 2012/0110518 A1 | 5/2012 | Chan et al. |
| 2012/0117506 A1 | 5/2012 | Koch et al. |
| 2012/0119997 A1 | 5/2012 | Gutowitz |
| 2012/0149477 A1 | 6/2012 | Park et al. |
| 2012/0159317 A1 | 6/2012 | Di Cocco et al. |
| 2012/0162081 A1 | 6/2012 | Stark |
| 2012/0166696 A1 | 6/2012 | Kallio et al. |
| 2012/0167009 A1 | 6/2012 | Davidson et al. |
| 2012/0223959 A1 | 9/2012 | Lengeling |
| 2012/0306772 A1 | 12/2012 | Tan et al. |
| 2012/0311437 A1 | 12/2012 | Weeldreyer et al. |
| 2013/0007606 A1 | 1/2013 | Dolenc |
| 2013/0061317 A1 | 3/2013 | Runstedler et al. |
| 2013/0063356 A1 | 3/2013 | Martisauskas |
| 2013/0067411 A1 | 3/2013 | Kataoka et al. |
| 2013/0104068 A1 | 4/2013 | Murphy et al. |
| 2013/0120266 A1 | 5/2013 | Griffin et al. |
| 2013/0120267 A1 | 5/2013 | Pasquero et al. |
| 2013/0120268 A1 | 5/2013 | Griffin et al. |
| 2013/0125034 A1 | 5/2013 | Griffin et al. |
| 2013/0125035 A1 | 5/2013 | Griffin et al. |
| 2013/0125036 A1 | 5/2013 | Griffin et al. |
| 2013/0125037 A1 | 5/2013 | Pasquero et al. |
| 2013/0176228 A1 | 7/2013 | Griffin et al. |
| 2013/0187858 A1 | 7/2013 | Griffin et al. |
| 2013/0187868 A1 | 7/2013 | Griffin et al. |
| 2013/0222249 A1 | 8/2013 | Pasquero et al. |
| 2013/0222255 A1 | 8/2013 | Pasquero et al. |
| 2013/0222256 A1 | 8/2013 | Pasquero et al. |
| 2013/0246329 A1 | 9/2013 | Pasquero et al. |
| 2013/0263038 A1 | 10/2013 | Griffin et al. |
| 2013/0271375 A1 | 10/2013 | Griffin et al. |
| 2013/0271385 A1 | 10/2013 | Griffin et al. |
| 2013/0275923 A1 | 10/2013 | Griffin et al. |
| 2013/0285913 A1 | 10/2013 | Griffin et al. |
| 2013/0285914 A1 | 10/2013 | Pasquero et al. |
| 2013/0285916 A1 | 10/2013 | Griffin et al. |
| 2013/0285927 A1 | 10/2013 | Pasquero et al. |
| 2013/0285928 A1 | 10/2013 | Thorsander |
| 2013/0285930 A1 | 10/2013 | Thorsander et al. |
| 2013/0285935 A1 | 10/2013 | Thorsander |
| 2013/0290906 A1 | 10/2013 | Thorsander |
| 2013/0314331 A1 | 11/2013 | Rydenhag et al. |
| 2013/0342452 A1 | 12/2013 | Kuo et al. |
| 2014/0002363 A1 | 1/2014 | Griffin et al. |
| 2014/0062886 A1 | 3/2014 | Pasquero et al. |
| 2014/0062923 A1 | 3/2014 | Thorsander et al. |
| 2014/0063067 A1 | 3/2014 | Compton et al. |
| 2014/0067372 A1 | 3/2014 | Pasquero et al. |

FOREIGN PATENT DOCUMENTS

| | | |
|---|---|---|
| CA | 2813393 A1 | 10/2013 |
| CA | 2819839 A1 | 12/2013 |
| CA | 2820997 A1 | 1/2014 |
| CN | 101021762 A | 8/2007 |
| EP | 0844571 A2 | 5/1998 |
| EP | 0880090 A2 | 11/1998 |
| EP | 0880090 A3 | 11/1998 |
| EP | 1847917 A2 | 10/2007 |
| EP | 1847917 A3 | 10/2007 |
| EP | 1850217 A2 | 10/2007 |
| EP | 1909161 A1 | 4/2008 |
| EP | 1939715 A1 | 7/2008 |
| EP | 1942398 A1 | 7/2008 |
| EP | 2077491 A1 | 7/2009 |
| EP | 2109046 A1 | 10/2009 |
| EP | 2128750 A2 | 12/2009 |
| EP | 2146271 A2 | 1/2010 |
| EP | 2184686 A1 | 5/2010 |
| EP | 2214118 A1 | 8/2010 |
| EP | 2256614 A1 | 12/2010 |
| EP | 2282252 A1 | 2/2011 |
| EP | 2293168 A1 | 3/2011 |
| EP | 2320312 A1 | 5/2011 |
| EP | 2336851 A2 | 6/2011 |
| EP | 2381384 A1 | 10/2011 |
| EP | 2386976 A1 | 11/2011 |
| EP | 2402846 A2 | 1/2012 |
| EP | 2420925 A2 | 2/2012 |
| EP | 2431842 A2 | 3/2012 |
| EP | 2400426 B1 | 3/2013 |
| EP | 2618248 A1 | 7/2013 |
| EP | 2631758 A1 | 8/2013 |
| EP | 2653955 A1 | 10/2013 |
| EP | 2660696 A1 | 11/2013 |
| EP | 2660697 A1 | 11/2013 |
| EP | 2660699 A1 | 11/2013 |
| EP | 2660727 A1 | 11/2013 |
| EP | 2703955 A1 | 3/2014 |
| EP | 2703956 A1 | 3/2014 |
| EP | 2703957 A1 | 3/2014 |
| JP | 2011-197782 A | 10/2011 |
| JP | 2012-68963 A | 4/2012 |
| KP | 20120030652 A | 3/2012 |

(56) References Cited

FOREIGN PATENT DOCUMENTS

| WO | 03/029950 A2 | 4/2003 |
|---|---|---|
| WO | 03/054681 A1 | 7/2003 |
| WO | 2004/001560 A1 | 12/2003 |
| WO | WO2005/064587 A2 | 7/2005 |
| WO | 2006/100509 A2 | 9/2006 |
| WO | 2007/068505 A1 | 6/2007 |
| WO | 2007/076210 A1 | 7/2007 |
| WO | 2007/134433 A1 | 11/2007 |
| WO | WO2008/030974 | 3/2008 |
| WO | WO2008/057785 A2 | 5/2008 |
| WO | WO2008/085741 A2 | 7/2008 |
| WO | 2009/019546 A2 | 2/2009 |
| WO | 2010/035574 A1 | 4/2010 |
| WO | 2010/035585 A1 | 4/2010 |
| WO | WO2010/035574 A1 | 4/2010 |
| WO | WO2010/099835 A1 | 9/2010 |
| WO | WO2010/112841 A1 | 10/2010 |
| WO | 2011/073992 A2 | 6/2011 |
| WO | WO2011/073992 A2 | 6/2011 |
| WO | 2011/098925 A1 | 8/2011 |
| WO | WO2011/113057 A1 | 9/2011 |
| WO | 2012/043932 A1 | 4/2012 |
| WO | WO2013/163718 A1 | 11/2013 |
| WO | WO2013/164013 A1 | 11/2013 |

OTHER PUBLICATIONS iPhone (NPL on iPhone dated on Mar. 19, 2010, attached as iphone.pdf, also available from http://www.iphonejd.com/iphone_id/2010/03/typing-letters-or-symbols-that-are-not-on-the-iphone-keyboard.html).*
DROID X by Motorola © 2010 Screen shots.
DROID X by Motorola © 2010 User Manual (72 pages).
Extended European Search Report dated Aug. 24, 2012, issued in European Application No. 12166115.1 (5 pages).
Extended European Search Report dated Aug. 31, 2012, issued in European Application No. 12166170.6 (7 pages).
Extended European Search Report dated Sep. 10, 2012, issued in European Application No. 12166246.4 (6 pages).
Extended European Search Report dated Sep. 10, 2012, issued in European Application No. 12166247.2 (8 pages).
Extended European Search Report dated Sep. 21, 2012, issued in European Application No. 12164240.9 (6 pages).
Extended European Search Report dated Sep. 25, 2012, issued in European Application No. 11192713.3 (7 pages).
Extended European Search Report dated Sep. 3, 2012, issued in European Application No. 12164300.1 (7 pages).
International Search Report and Written Opinion mailed Sep. 10, 2012, issued for International Application No. PCT/EP2012/057945 (11 pages).
U.S. Office Action dated Oct. 5, 2012, issued in U.S. Appl. No. 13/447,835 (20 pages).
U.S. Office Action dated Sep. 10, 2012, issued in U.S. Appl. No. 13/524,678 (12 pages).
U.S. Office Action dated Sep. 28, 2012, issued in U.S. Appl. No. 13/494,794 (14 pages).
"Windows Mobile Café —Software (Freeware): Touchpal, Let's Try Tabbing Up to 300 Chars/Min", Nov. 4, 2007, retrieved from URL:http://windows-mobile-cafe.blogspot.nl/2007/11/software-freeware-touchpal-lets-try.html, accessed online Jan. 18, 2013 (2 pages).
European Partial Search Report dated Jan. 16, 2013, issued in European Application No. 12182612.7 (5 pages).
European Partial Search Report dated Mar. 7, 2013, issued in European Application No. 12184574.7 (5 pages).
Extended European Search Report dated Feb. 28, 2013, issued in European Application No. 12182610.1 (7 pages).
Extended European Search Report dated Jan. 25, 2013, issued in European Application No. 12166520.2 (8 pages).
Extended European Search Report dated Mar. 8, 2013, issued in European Application No. 12182611.9 (8 pages).
Extended European Search Report dated Nov. 22, 2012, issued in European Application No. 12172892.7 (7 pages).
Extended European Search Report dated Sep. 25, 2012, issued in European Application No. 12176453.4 (7 pages).
Extended European Search Report dated Sep. 25, 2012, issued in European Application No. 12180190.6 (8 pages).
Final Office Action dated Feb. 1, 2013, issued in U.S. Appl. No. 13/563,943 (17 pages).
Final Office Action dated Feb. 28, 2013, issued in U.S. Appl. No. 13/524,678 (21 pages).
Final Office Action dated Jan. 18, 2013, issued in U.S. Appl. No. 13/482,705 (18 pages).
Final Office Action dated Mar. 15, 2013, issued in U.S. Appl. No. 13/572,232 (36 pages).
iPhone J.D. Typing Letters or Symbols That Are Not on the iPhone Keyboard dated Mar. 19, 2010, accessed "http://www.iphonejd.com/iphone_jd2010/03/typing-letters-or-symbols-that-are-not-on-the-iphone-keyboard.html" on Feb. 26, 2013 (3 pages).
Notice of Allowance dated Mar. 15, 2013, issued in U.S. Appl. No. 13/373,356 (25 pages).
Office Action dated Dec. 28, 2012, issued in U.S. Appl. No. 13/459,301 (22 pages).
Office Action dated Jan. 22, 2013, issued in U.S. Appl. No. 13/564,687 (19 pages).
Office Action dated Jan. 29, 2013, issued in U.S. Appl. No. 13/563,182 (19 pages).
Office Action dated Jan. 7, 2013, issued in U.S. Appl. No. 13/564,070 (21 pages).
Office Action dated Jan. 7, 2013, issued in U.S. Appl. No. 13/564,697 (19 pages).
Office Action dated Mar. 12, 2013, issued in U.S. Appl. No. 13/560,796 (22 pages).
Office Action dated Nov. 14, 2012, issued in U.S. Appl. No. 13/572,232 (24 pages).
Office Action dated Nov. 16, 2012, issued in U.S. Appl. No. 13/554,583 (21 pages).
Office Action dated Nov. 8, 2012, issued in U.S. Appl. No. 13/373,356 (18 pages).
Office Action dated Oct. 26, 2012, issued in U.S. Appl. No. 13/554,436 (22 pages).
PCT International Search Report and Written Opinion dated Jan. 24, 2013, issued in International Application No. PCT/CA2012/050274 (9 pages).
PCT International Search Report and Written Opinion dated Nov. 7, 2012, issued in International Application No. PCT/CA2012/050362 (9 pages).
Swype Product Features, accessed online at http://www.swype.com/about/specifications/ on Feb. 25, 2013 (2 pages).
U.S. Appl. No. 13/616,423, filed Sep. 14, 2012 (30 pages).
U.S. Appl. No. 13/773,812, filed Feb. 22, 2013 (94 pages).
Wang, Feng, et al., "Detecting and Leveraging Finger Orientation for Interaction with Direct-Touch Surfaces", UIST '09, Oct. 4-7, 2009, Victoria, British Columbia, Canada (10 pages).
Canadian Office Action dated Aug. 8, 2012, issued in Canadian Application No. 2,688,204 (3 pages).
Canadian Office Action dated Mar. 27, 2013, issued in Canadian Application No. 2,737,314 (3 pages).
Distinctive Touch: Gesture-based lightweight identification for touchscreen displays, Electronic Max, Dec. 7, 2004, http://courses.media.mit.edu/2004fall/mas622j/04.projects/students/VanKleek/; accessed online Apr. 27, 2009, pp. 1-11.
European Examination Report dated Apr. 5, 2013, issued in European Application No. 12180190.6 (7 pages).
Extended European Search Report dated Aug. 24, 2012, issued in European Application No. 12172458.7 (6 pages).
Extended European Search Report dated Aug. 27, 2012, issued in European Application No. 12169649.6 (7 pages).
Extended European Search Report dated Jun. 26, 2013, issued in European Application No. 12184574.7 (10 pages).
Extended European Search Report dated May 6, 2009, issued in European Application No. 09151723.5 (7 pages).
Extended European Search Report dated Nov. 28, 2011, issued in European Application No. 11180985.1 (4 pages).

(56) References Cited

OTHER PUBLICATIONS

Final Office Action dated Apr. 25, 2013, issued in U.S. Appl. No. 13/564,697 (11 pages).
Final Office Action dated Apr. 4, 2013, issued in U.S. Appl. No. 13/447,835 (20 pages).
Final Office Action dated Jul. 9, 2013, issued in U.S. Appl. No. 13/564,070 (26 pages).
Final Office Action dated May 10, 2013, issued in U.S. Appl. No. 13/459,301 (16 pages).
Final Office Action dated May 15, 2013, issued in U.S. Appl. No. 13/563,182 (21 pages).
Final Office Action dated May 2, 2013, issued in U.S. Appl. No. 13/564,687 (17 pages).
Final Office Action dated May 29, 2012, issued in U.S. Appl. No. 12/362,536 (16 pages).
Final Office Action dated Oct. 26, 2011, issued in U.S. Appl. No. 12/362,536 (21 pages).
Office Action dated Jun. 8, 2011, issued in U.S. Appl. No. 12/362,536 (19 pages).
Office Action dated May 30, 2013, issued in U.S. Appl. No. 13/572,232 (49 pages).
PCT International Search Report and Written Opinion dated Nov. 8, 2012, issued in International Application No. PCT/CA2012/050405 (12 pages).
Through the Magic Window—Magic Window word processor for the Apple II, Artsci Publishing, 1980, http://www.artscipub.com/history/magicwindow, accessed May 21, 2013 (5 pages).
U.S. Appl. No. 13/601,736, filed Aug. 31, 2012 (44 pages).
"Features Included in the T-Mobile G1", http://www.t-mobileg1.com/T-Mobile-G1-Features.pdf, 2009.
BlackBerry Seeker—Freeware—Pattern Lock v1.0.7, http://www.blackberryseeker.com/applications/preview/Pattern-Lock-v107.aspx, Jul. 28, 2009.
Chong et al., Exploring the Use of Discrete Gestures for Authentication, IFIP International Federation for Information Processing, 2009.
European Search Report dated Feb. 28, 2011, issued in European Patent Application No. 10160590.5.
Google Mobile Help—Editing text, http://support.google.com/mobile/bin/answer.py?hl=en&answer=168926 (2 pages).
GSMArena—Samsung announce s5600 & s5230 full touch midrange phones, http://www.gsmarena.com/samsung_announce_s5600_and_s5230__full_touch_midrange_phones-news-825.php, Mar. 10, 2009.
Hardware Sphere—Samsung s5600 & s5230 Touchscreen phones, http://hardwaresphere.com/2009/03/09/samsung-s5600-s5230-touchscreen-phones/, Mar. 9, 2009.
International Search Report and Written Opinion issued in International Application No. PCT/IB2011/003273, on Jun. 14, 2012, 8 pages.
iPhone User Guide—for iPhone OS 3.1 Software, 2009 (217 pages).
Madhvanath, Sriganesh, HP-Gesture based computing interfaces, Mar. 2008.
Manual del usuario Samsung Moment™ with Google™ , dated May 20, 2012 (224 pages).
Mobile Tech News—Samsung launches new Gesture Lock touchscreen handsets, http://www.mobiletechnews.com/info/2009/03/11/124559.html, Mar. 11, 2009.
Partial European Search Report; Application No. 10160590.5; Sep. 16, 2010.
Sprint Support Tutorial Set the Screen Lock Pattern—Samsung Moment, http://support.sprint.com/support/tutorial/Set_the_Screen_Lock_Pattern_Samsung_Moment/10887-171, date of access: May 31, 2012 (9 pages).
Sprint Support Tutorial Unlock a Forgotten Lock Pattern—Samsung Moment, http://support.sprint.com/support/tutorial/Unlock_a_Forgotten_Lock_Pattern_Samsung_Moment/10887-339, date of access: May 31, 2012 (7 pages).
Support—Sprint Cell Phones SPH-M900—Samsung Cell Phones, http://www.samsung.com/us/support/owners/product/SPH-M900?tabContent-content2, date of access: May 31, 2012 (1 page).
T-Mobile Forum—Help & How to—Hidden Pattern, http://forums.t-mobile.com/tmbl/board/message?board.id=Android3&message.id=3511&query.id=52231#M3511, Oct. 23, 2008.
T-Mobile Forum—Help & How to—Screen Unlock Pattern, http://forums.t-mobile.com/tmbl/board/message?board.id=Android3&message.id=6015&query.id=50827#M6015, Oct. 22, 2008.
T-Mobile launches the highly anticipated T-Mobile G1, Oct. 22, 2008.
U.S. Office Action for U.S. Appl. No. 12/764,298, dated Jul. 20, 2012, 38 pages.
U.S. Office Action for U.S. Appl. No. 13/482,705, dated Aug. 7, 2012, 10 pages.
User Guide Samsung Moment(TM) with Google(TM), dated Dec. 4, 2009 (122 pages).
User Guide Samsung Moment(TM) with Google(TM), dated Mar. 2, 2010 (218 pages).
Enable or Disable SureType with a RIM BlackBerry Pearl Using Handheld Software, version 4.x, "http://www.wireless.att.com/support_static_files/KB/KB72601.html", at least as early as Feb. 8, 2008 (3 pages).
European Examination Report dated Aug. 22, 2013, issued in European Application No. 12166520.2, (4 pages).
European Examination Report dated Aug. 22, 2013, issued in European Application No. 12173818.1, (6 pages).
Extended European Search Report dated Dec. 21, 2012, issued in European Application No. 12173818.1, (8 pages).
Final Office Action dated Jul. 25, 2013, issued in U.S. Appl. No. 13/560,796, (19 pages).
Final Office Action dated Jul. 30, 2013, issued in U.S. Appl. No. 13/459,301 (27 pages).
Notice of Allowance dated Aug. 12, 2013, issued in U.S. Appl. No. 13/564,687, (10 pages).
Notice of Allowance mailed Oct. 11, 2013, issued in U.S. Appl. No. 13/563,943, (20 pages).
Office Action dated Oct. 17, 2013, issued in U.S. Appl. No. 13/485,723, (28 pages).
U.S. Appl. No. 13/459,301, filed Apr. 30, 2012, (87 pages).
U.S. Appl. No. 13/459,716, filed Apr. 30, 2012, (63 pages).
U.S. Appl. No. 13/459,761, filed Apr. 30, 2012, (35 pages).
U.S. Appl. No. 13/459,872, filed Apr. 30, 2012, (35 pages).
U.S. Appl. No. 13/459,980, filed Apr. 30, 2012, (35 pages).
U.S. Appl. No. 13/481,171, filed May 25, 2012, (24 pages).
U.S. Appl. No. 13/525,576, filed Jun. 18, 2012, (87 pages).
U.S. Appl. No. 13/529,182, filed Jun. 21, 2012, (24 pages).
U.S. Appl. No. 13/534,101, filed Jun. 27, 2012, (85 pages).
U.S. Appl. No. 13/601,864, filed Aug. 31, 2012, (23 pages).
U.S. Appl. No. 13/601,898, filed Aug. 31, 2012, (28 pages).
Conveniently select text, images, annotations, etc. in a PDF or any other text format on a touch based mobile/tablet device, IP.com Journal, Mar. 1, 2011, XP013142665, (10 pages).
Extended European Search Report dated Oct. 9, 2012, issued in European Application No. 12166244.9 (6 pages).
International Search Report and Written Opinion issued in International Application No. PCT/EP2012/057944, on Oct. 12, 2012, (10 pages).
Merrett, Andy, "iPhone OS 3.0: How to cut, copy and paste text and images", http://www.iphonic.tv/2009/06/iphone_os_30_how_to_cut_copy_a.html, Jun. 18, 2009, XP002684215, (8 pages).
U.S. Office Action dated Oct. 15, 2012, issued in U.S. Appl. No. 13/560,270 (15 pages).
U.S. Office Action dated Oct. 17, 2012, issued in U.S. Appl. No. 13/563,943 (17 pages).
U.S. Office Action dated Oct. 18, 2012, issued in U.S. Appl. No. 13/563,182 (12 pages).
U.S. Office Action dated Oct. 23, 2012, issued in U.S. Appl. No. 12/764,298 (41 pages).
U.S. Office Action dated Oct. 25, 2012, issued in U.S. Appl. No. 13/459,732 (15 pages).
European Examination Report dated Dec. 9, 2013, issued in European Application No. 12172458.7, (4 pages).
Final Office Action dated Dec. 13, 2013, issued in U.S. Appl. No. 13/572,232, (30 pages).

(56) References Cited

OTHER PUBLICATIONS

Office Action dated Dec. 6, 2013, issued in U.S. Appl. No. 13/564,697, (22 pages).
Canadian Office Action dated Jun. 12, 2014, issued in Canadian Application No. 2,818,720, (3 pages).
Canadian Office Action dated Jun. 12, 2014, issued in Canadian Application No. 2,821,772, (2 pages).
Canadian Office Action dated Jun. 19, 2014, issued in Canadian Application No. 2,821,814, (3 pages).
Canadian Office Action dated Jun. 2, 2014, issued in Canadian Application No. 2,812,033, (3 pages).
Canadian Office Action dated Jun. 25, 2014, issued in Canadian Application No. 2,812,457, (5 pages).
Canadian Office Action dated Jun. 30, 2014, issued in Canadian Application No. 2,819,839, (3 pages).
Canadian Office Action dated May 13, 2014, issued in Canadian Application No. 2,789,827, (4 pages).
Canadian Office Action dated May 5, 2014, issued in Canadian Application No. 2,803,192, (4 pages).
European Examination Report dated Apr. 11, 2014, issued in European Application No. 12182612.7, (5 pages).
European Examination Report dated Apr. 16, 2014, issued in European Application No. 11192713.3, (7 pages).
European Examination Report dated Jun. 2, 2014, issued in European Application No. 12166142.5, (4 pages).
European Examination Report dated Jun. 3, 2014, issued in European Application No. 12172458.7, (5 pages).
European Examination Report dated Mar. 12, 2014, issued in European Application No. 12169649.6, (7 pages).
Final Office Action dated Feb. 10, 2014, issued in U.S. Appl. No. 13/485,723, (19 pages).
Final Office Action dated Jul. 2, 2014, issued in U.S. Appl. No. 13/534,101, (20 pages).
Final Office Action dated Mar. 26, 2014, issued in U.S. Appl. No. 13/564,697, (9 pages).
Office Action dated Apr. 11, 2014, issued in U.S. Appl. No. 13/481,171, (29 pages).
Office Action dated Apr. 11, 2014, issued in U.S. Appl. No. 13/572,232, (38 pages).
Office Action dated Apr. 18, 2014, issued in U.S. Appl. No. 13/524,678, (29 pages).
Office Action dated Apr. 21, 2014, issued in U.S. Appl. No. 13/601,736, (33 pages).
Office Action dated Jan. 31, 2014, issued in U.S. Appl. No. 13/534,101, (38 pages).
Office Action dated Jun. 11, 2014, issued in U.S. Appl. No. 13/563,182, (12 pages).
Office Action dated Jun. 18, 2014, issued in U.S. Appl. No. 13/601,898, (27 pages).
Office Action dated Mar. 12, 2014, issued in U.S. Appl. No. 13/616,423, (21 pages).
Office Action dated Mar. 14, 2014, issued in U.S. Appl. No. 13/569,000, (25 pages).
Office Action dated Mar. 26, 2014, issued in U.S. Appl. No. 13/548,469, (46 pages).
Office Action dated May 15, 2014, issued in U.S. Appl. No. 13/482,705, (19 pages).
Office Action dated May 2, 2014, issued in U.S. Appl. No. 13/459,301, (25 pages).
Office Action dated May 21, 2014, issued in U.S. Appl. No. 13/485,723, (18 pages).

* cited by examiner

METHOD AND DEVICE HAVING TOUCHSCREEN KEYBOARD WITH VISUAL CUES

RELATED APPLICATION DATA

The present disclosure relates to commonly owned U.S. patent application Ser. No. 13/373,356, filed Nov. 10, 2011, which is incorporated herein by reference in its entirety.

TECHNICAL FIELD

The present disclosure relates generally to input methodologies for electronic devices, such as handheld electronic devices, and more particularly, to a method and device for touchscreen keyboard with visual cues.

BACKGROUND

Increasingly, electronic devices, such as computers, netbooks, cellular phones, smart phones, personal digital assistants, tablets, etc., have touchscreens that allow a user to input characters into an application, such as a word processor or email application. Character input on touchscreens can be a cumbersome task due to, for example, the small touchscreen area, particularly where a user needs to input a long message.

DESCRIPTION OF EXAMPLE EMBODIMENTS

Figure 1:
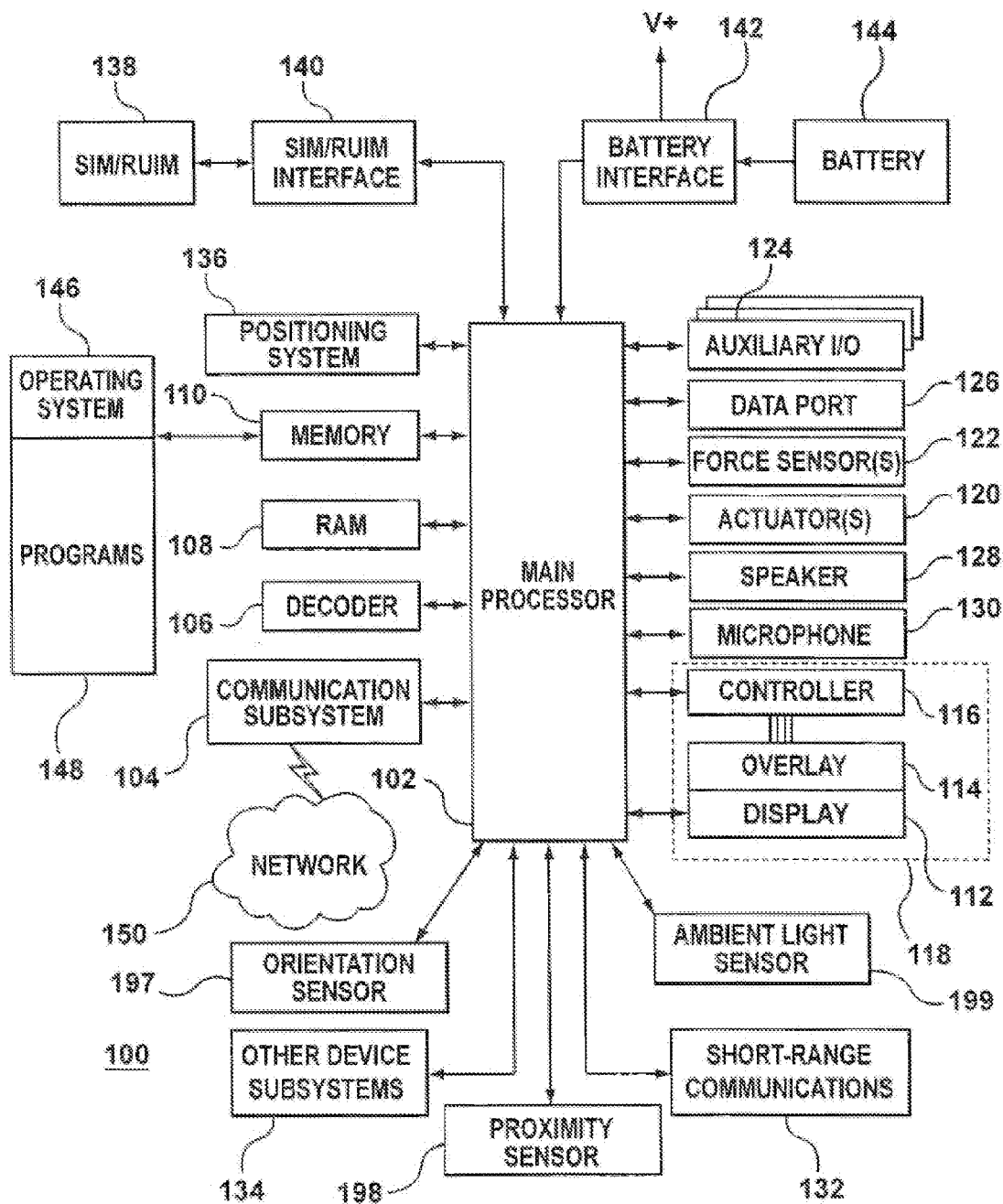
FIG. 1 is an example block diagram of an electronic device, consistent with embodiments disclosed herein.

Reference will now be made in detail to various embodiments, examples of which are illustrated in the accompanying drawings. Wherever possible, the same reference numbers will be used throughout the drawings to refer to the same or like parts.

The present disclosure relates to an electronic device, including wired communication devices (for example, a laptop computer having a touchscreen) and mobile or handheld wireless communication devices such as cellular phones, smartphones, wireless organizers, personal digital assistants, wirelessly enabled notebook computers, tablets, and similar devices. The electronic device can also be an electronic device without wireless communication capabilities, such as a handheld electronic game device, digital photograph album, digital camera, or other device.

Basic predictive text input solutions have been introduced for assisting with input on an electronic device. These solutions include predicting which word a user is entering and offering a suggestion for completing the word. But these solutions can have limitations, often requiring the user to input most or all of the characters in a word before the solution suggests the word the user is trying to input. Even then, a user often has to divert focus from the keyboard to view and consider the suggested word displayed elsewhere on the display of the electronic device, and thereafter, look back at the keyboard to continue typing. Refocusing of one's eyes relative to the keyboard while inputting information in an electronic device, particularly when composing large texts, can strain the eyes and be cumbersome, distracting, and otherwise inefficient. Moreover, processing cycles are lost and display power wasted as the processor is idling while the user is focusing attention to the input area, and then back at the virtual keyboard.

The efficiency of predictive text input solutions, from the perspective of both device resources and user experience, sometimes depends on the particular user and the nature of the interaction of the particular user with the touchscreen. Virtual keyboard usage patterns can be broadly categorized as being of two types: "rapid" and "precise". Rapid typists are typically fast two-thumb typists which rely on auto-correction. This usage pattern corresponds most closely with experienced, frequent touchscreen users. Precise typists are typically careful typists who are inclined to use a single finger point to tap keys in the virtual keyboard, and often choose predictions as an input accelerator rather than auto-correction. This usage pattern corresponds most closely with novice/new touchscreen users as well as potentially one-handed (thumb) use situations.

Accordingly, example embodiments described herein permit the user of an electronic device to input characters without diverting attention from the keyboard and subsequently refocusing. Example embodiments described herein also seek to accommodate different user types, such as rapid typists and precise typists, and the different efficiency challenges presented by the different user types.

Use of the indefinite article "a" or "an" in the specification and the claims is meant to include one or more than one of the feature that it introduces, unless otherwise indicated. Thus, the term "a set of characters" as used in "generating a set of characters" can include the generation of one or more than one set of characters. Similarly, use of the definite article "the", or "said," particularly after a feature has been introduced with the indefinite article, is meant to include one or more than one of the feature to which it refers (unless otherwise indicated). Therefore, the term "the generated set of characters" as used in "displaying the generated set of characters" includes displaying one or more generated set of characters. References to orientation contained herein, such as horizontal and vertical, are relative to the screen orientation of a graphical user interface rather than any physical orientation.

In accordance with one embodiment, there is provided a method comprising receiving an input of a character from a virtual keyboard rendered on a display; generating one or more sets of predicted input characters based on the input character; and displaying one or more of the generated sets of predicted input characters.

In accordance with one embodiment, there is provided a method for providing a virtual keyboard rendered on a display with visual cues, comprising: detecting a touch input associated with a user interface element rendered on the display; determining an input direction of the touch input; and displaying on the display a visual cue associated with the user interface element, wherein the visual cue is located at a position based on the input direction of the touch input.

In accordance with a further embodiment, there is provided a method for providing visual cues rendered on a display, comprising: detecting a touch input associated with a user interface element rendered on the display; determining whether the touch input is associated with a left hand or a right hand of a user; and displaying on the display a visual cue associated with the user interface element, wherein the visual cue is located at a position based on whether the touch input is associated with the left hand or the right hand.

In a further embodiment, an electronic device is provided that comprises a display having a virtual keyboard rendered thereupon, and a processor. The processor can be configured to perform methods described herein.

In a further embodiment, a keyboard rendered on a display of an electronic device is provided. The keyboard can include a plurality of keys, each key corresponding to one or more different characters of a plurality of characters. The keyboard is configured to perform methods described herein in response to receiving an input.

In a further embodiment, a non-transitory computer-readable storage medium is provided that includes computer executable instructions for performing methods described herein.

These example embodiments, as well as those described below, permit the user of an electronic device to input a set of characters without diverting attention from the virtual keyboard and subsequently refocusing. Predicting and providing various options that the user is likely contemplating, and doing so at appropriate locations on the keyboard, allows the focus to remain on the keyboard, which enhances efficiency, accuracy, and speed of character input.

FIG. 1 is a block diagram of an electronic device 100, consistent with example embodiments disclosed herein. Electronic device 100 includes multiple components, such as a main processor 102 that controls the overall operation of electronic device 100. Communication functions, including data and voice communications, are performed through a communication subsystem 104. Data received by electronic device 100 is decompressed and decrypted by a decoder 106. The communication subsystem 104 receives messages from and sends messages to a network 150. Network 150 can be any type of network, including, but not limited to, a wired network, a data wireless network, voice wireless network, and dual-mode wireless networks that support both voice and data communications over the same physical base stations. Electronic device 100 can be a battery-powered device and include a battery interface 142 for receiving one or more batteries 144.

Main processor 102 is coupled to and can interact with additional subsystems such as a Random Access Memory (RAM) 108; a memory 110, such as a hard drive, CD, DVD, flash memory, or a similar storage device; one or more actuators 120; one or more force sensors 122; an auxiliary input/output (I/O) subsystem 124; a data port 126; a speaker 128; a microphone 130; short-range communications 132; other device subsystems 134; and a touchscreen 118.

Touchscreen 118 includes a display 112 with a touch-active overlay 114 connected to a controller 116. User-interaction with a graphical user interface (GUI), such as a virtual keyboard rendered on the display 112 as a GUI for input of characters, or a web-browser, is performed through touch-active overlay 114. Main processor 102 interacts with touch-active overlay 114 via controller 116. Characters, such as text, symbols, images, and other items are displayed on display 112 of touchscreen 118 via main processor 102. Characters are inputted when the user touches the touchscreen at a location associated with said character.

Touchscreen 118 is connected to and controlled by main processor 102. Accordingly, detection of a touch event and/or determining the location of the touch event can be performed by main processor 102 of electronic device 100. A touch event includes in some embodiments, a tap by a finger, a swipe by a finger, a swipe by a stylus, along press by finger or stylus, or a press by a finger for a predetermined period of time, and the like.

While specific embodiments of a touchscreen have been described, any suitable type of touchscreen for an electronic device can be used, including, but not limited to, a capacitive touchscreen, a resistive touchscreen, a surface acoustic wave (SAW) touchscreen, an embedded photo cell touchscreen, an infrared (IR) touchscreen, a strain gauge-based touchscreen, an optical imaging touchscreen, a dispersive signal technology touchscreen, an acoustic pulse recognition touchscreen or a frustrated total internal reflection touchscreen. The type of touchscreen technology used in any given embodiment will depend on the electronic device and its particular application and demands.

Main processor 102 can also interact with a positioning system 136 for determining the location of electronic device 100. The location can be determined in any number of ways, such as by a computer, by a Global Positioning System (GPS), either included or not included in electric device 100, through a Wi-Fi network, or by having a location entered manually. The location can also be determined based on calendar entries.

Main processor 102 can also interact with an orientation sensor 197 for sensing the orientation of the device. In some examples, the orientation sensor 197 may be one or more accelerometers. In some examples, the orientation sensor may detect acceleration along multiple orthogonal axes. Main processor 102 can also interact with one or more proximity sensors 198 for detecting the proximity of nearby objects. In some examples, the proximity sensor may be one or more infrared emitter/sensor pairs. The main processor 102 can also interact with an ambient light sensor 199 for detecting the intensity and/or color temperature of ambient light.

In some embodiments, to identify a subscriber for network access, electronic device 100 uses a Subscriber Identity Module or a Removable User Identity Module (SIM/RUIM) card 138 inserted into a SIM/RUIM interface 140 for communication with a network, such as network 150. Alternatively, user identification information can be programmed into memory 110.

Electronic device 100 also includes an operating system 146 and programs 148 that are executed by main processor 102 and are typically stored in memory 110. Additional applications may be loaded onto electronic device 100 through network 150, auxiliary I/O subsystem 124, data port 126, short-range communications subsystem 132, or any other suitable subsystem.

A received signal such as a text message, an e-mail message, or web page download is processed by communication subsystem 104 and this processed information is then provided to main processor 102. Main processor 102 processes the received signal for output to display 112, to auxiliary I/O subsystem 124, or a combination of both. A user can compose data items, for example e-mail messages, which can be transmitted over network 150 through communication subsystem 104. For voice communications, the overall operation of electronic device 100 is similar. Speaker 128 outputs audible information converted from electrical signals, and microphone 130 converts audible information into electrical signals for processing.

Figure 2:
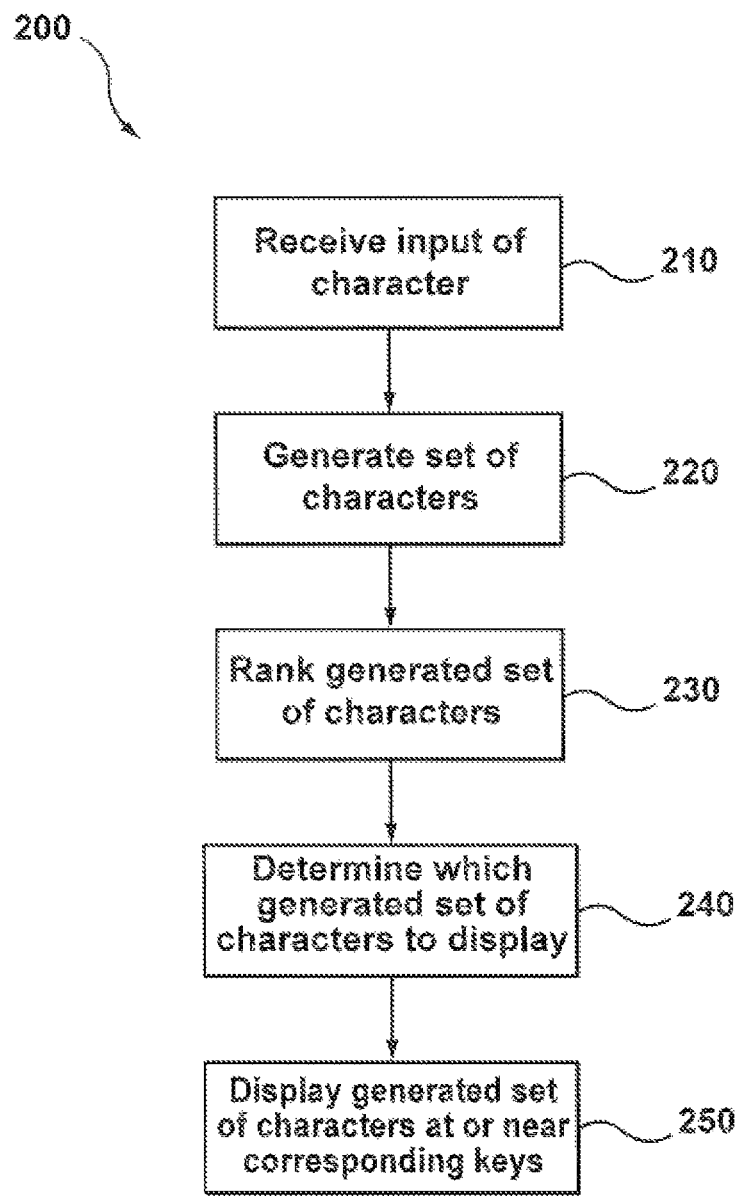
FIG. 2 is a flowchart illustrating an example method for predicting a selected set of characters, consistent with embodiments disclosed herein.

FIG. 2 is a flowchart illustrating an example method 200 for predicting a set of characters, consistent with example embodiments disclosed herein. As used herein, a predictor (such as a predictive algorithm, program or firmware) includes a set of instructions that when executed by a processor (for example, main processor 102), can be used to disambiguate for example, received ambiguous text input and provide various options, such as a set of characters (for example, words or phrases, acronyms, names, slang, colloquialisms, abbreviations, or any combination thereof) that a user might be contemplating. A predictor can also receive otherwise unambiguous text input and predict a set of characters potentially contemplated by the user based on several factors, such as context, frequency of use, and others as appreciated by those skilled in the field.

For example, in the predictor is a program 148 residing in memory 110 of electronic device 100. Accordingly, method 200 includes a predictor for generating a set of characters corresponding to a subsequent candidate input character based on inputted characters. It can be appreciated that while the example embodiments described herein are directed to a predictor program executed by a processor, the predictor can be executed by a virtual keyboard controller.

Method 200 begins at block 210, where the processor receives an input of one or more characters from a virtual keyboard displayed on a touchscreen. As used herein, however, a character can be any alphanumeric character, such as a letter, a number, a symbol, a punctuation mark, and the like. The inputted character can be displayed in an input field (for example, input field 330 further described below in FIGS. 3-9) that displays the character the user inputs using the virtual keyboard.

At block 220, the processor generates one or more sets of characters such as words or phrases, acronyms, names, slang, colloquialisms, abbreviations, or any combination thereof based on the input received in block 210. The set of characters includes, for example, a set of characters that are stored in a dictionary (for example, a word or an acronym) of a memory of the electronic device, a set of characters that were previously inputted by the user (for example, a name or acronym), a set of characters based on a hierarchy or tree structure, a combination thereof, or any set of characters that are selected by a processor based on defined arrangement.

In some embodiments, the processor can use contextual data for generating a set of characters. Contextual data considers the context of characters in the input field. Contextual data can include information about, for example, set of characters previously inputted by the user, grammatical attributes of the characters inputted in the input field (for example, whether a noun or a verb is needed as the next set of characters in a sentence), or any combination thereof. For example, if the set of characters "the" has already been inputted into the display, the processor can use the contextual data to determine that a noun—instead of a verb—will be the next set of characters after "the". Likewise, if the set of characters "Guy Lafleur played in the National Hockey" was inputted, based on the context, the processor can determine the subsequent set of characters is likely "League". Using the contextual data, the processor can also determine whether an inputted character was incorrect. For example, the processor can determine that the inputted character was supposed to be a "w" instead of an "a", given the proximity of these characters on a QWERTY virtual keyboard.

Processor 102 can also include an affix as part of the set of characters, such as an adverb ending, an adjective ending, different verb tenses, and the like, or any other change to make a complete set of characters. Processor 102 can also use the received input to generate affixes, such as plural endings or plural forms. Any known predictive technique or software can be used to process the received input and the contextual data in generating set of characters at block 220.

In some example embodiments, the set of characters generated at block 220 can begin with the same character received as input at block 210. For example, if the characters "pl" have been received as input using a virtual keyboard, these characters will be received by the processor as the input. In these embodiments, the set of characters generated at block 220 would all begin with "pl", such as "please" or "plot." There is no limit on the length of a generated set of characters. Regarding affixes, if the user has input the characters "child", for example, the affixes generated at block 220 could include "-ren", to make the set of characters "children", or "-ish", to make the set of characters "childish".

In some example embodiments, the set of characters generated at block 220 can simply include the same characters received as input at block 210. For example, if the received input is an "x," the processor may generate "example" or "xylophone" as the set of characters. Such sets of characters can be generated using the contextual data.

In another example embodiment, if input has not been received or a delimiter (such as a <SPACE>) has been used, the generated set of characters can be placed on subsequent candidate input characters that correspond to the first letter of the generated set of characters.

Next, at block 230, the generated set of characters from block 220 can be ranked. The rankings reflect the likelihood that a candidate set of characters might have been intended by the user, or might be chosen by a user compared to another candidate set of characters.

In some embodiments, contextual data can be included in the ranking at block 230. In some embodiments, the electronic device can be configured to rank nouns or adjectives higher based on the previous inputted set of characters. If the inputted set of characters is suggestive of a noun or adjective, the processor, using the contextual data, can rank the nouns or adjectives corresponding to what the user is typing higher at block 230. In an additional embodiment, set of characters including adjective affixes (such as "-ish" or "-ful"), phrases, plurals, or combinations thereof can also be ranked. Contextual data can increase the likelihood that the higher ranked generated set of characters are intended by a user. In some embodiments, contextual data can include information about which programs or applications are currently running or being used by a user. For example, if the user is running an email application, then set of characters associated with that user's email system, such as set of characters from the user's contact list, can be used to determine the ranking. N-grams, including unigrams, bigrams, trigrams, and the like, can be also used in the ranking of the sets of characters. Alternatively, the geolocation of the electronic device or user can be used in the ranking process. If for example, the electronic device recognizes that a user is located at his/her office, then sets of characters generally associated with work can be ranked higher in the list. If, on the other hand, the device determines a user is at the beach, then sets of characters generally associated with the beach can be ranked higher in the list.

At block 240, the processor determines which of the set of characters to display based on the ranking. For example, higher ranked sets of characters are more likely to be determined that they should be displayed. A ranker (such as a ranking algorithm, program or firmware) includes a set of instructions that when executed by a processor (for example, main processor 102), can be executed to determine ranking in this regard. In some embodiments, the ranker is a program 146 residing in memory 110 of electronic device 100.

At block 250, the determined set of characters is displayed at a location on the keyboard corresponding to a subsequent candidate input character, predicted as the next character in a word that the user might input. For instance, if a user inputs "pl", the word "please" would be displayed on the key for the letter "e"—the subsequent candidate input character for that word. Similarly, the word "plus" would also be displayed on the key for the letter "u"—another subsequent candidate input character. The subsequent candidate input character can be any alphanumeric character, such as a letter, number, symbol, punctuation mark, and the like.

In some embodiments, the generated set of characters is displayed at or near keys on the virtual keyboard associated with the subsequent candidate input characters. Its placement at or near a key can depend, for instance, on the size of the word or the number of nearby subsequent candidate input characters and the size of their associated set of characters.

The set of characters can be displayed in a manner that will attract the user's attention. In some embodiments, a displayed set of character's appearance can be enhanced or changed in a way that makes the set more readily visible to the user. For example, displayed sets of characters can be displayed with backlighting, highlighting, underlining, bolding, italicizing, using combinations thereof, or in any other way for making the displayed set of characters more visible.

When identifying the set of characters for display at block 240, the processor can limit the displayed set of characters to the top few or choose among the higher ranked sets of characters. For example, if two sets of characters are both ranked high, and these sets of characters would otherwise be displayed at the same key, the electronic device could be configured to display only the highest ranked generated set of characters. In other embodiments, both sets of characters could be displayed at or around the same key, or one set of characters is displayed at one key while the second set of characters is displayed at another key. In some example embodiments, the processor can take into account the display size to limit the number of generated sets of characters.

In some embodiments, the ranking could be used to choose between two or more sets of characters that, when displayed on adjacent subsequent candidate input characters, would overlap with each other (e.g., because of their respective lengths). In such a scenario, the electronic device could be configured to display the higher ranked set of characters on the keyboard. For example, if the set of characters "establishment" is ranked first in a list generated at block 240 after the letter "E" is inputted, "establishment" could be displayed at the "S" key. When displayed on a virtual keyboard, however, its length might occupy some space on the "A" key and the "D" key, potentially blocking a set of characters that would be displayed on or around those keys. At block 240, it could be determined that "establishment" would be displayed fully, and no other set of characters would be placed at the "A" or "D" keys ahead of the first ranked set of characters "establishment." An alternative to displaying only the top ranked set of characters would be to use abbreviations or recognized shortened forms of the set of characters, effectively permitting a long set of characters to be displayed within or mostly within the boundaries of a single key simultaneously with other sets of characters on adjacent keys of a virtual keyboard.

FIGS. 3-9 illustrate a series of example front views of the touchscreen 118 having a virtual keyboard 320, consistent with example embodiments disclosed herein. Starting with FIG. 3A, touchscreen 118 includes a virtual keyboard 320 that is touch-active. The position of the virtual keyboard 320 is variable such that virtual keyboard 320 can be placed at any location on touchscreen 118. Touchscreen 118 could be configured to detect the location and possibly pressure of one or more objects at the same time. Touchscreen 118 includes two areas: (1) an input field 330 that displays characters after a user has inputted those characters and (2) the virtual keyboard 320 that receives the input from the user. As described throughout this disclosure, a virtual keyboard displays a set of characters at a location on the keyboard corresponding to a subsequent candidate input character that might be received as input from the user.

The examples and embodiments illustrated in FIGS. 3-9 can be implemented with any set of characters, such as words, phrases, acronyms, names, slang, colloquialisms, abbreviations, or any combination thereof.

Figure 3A:
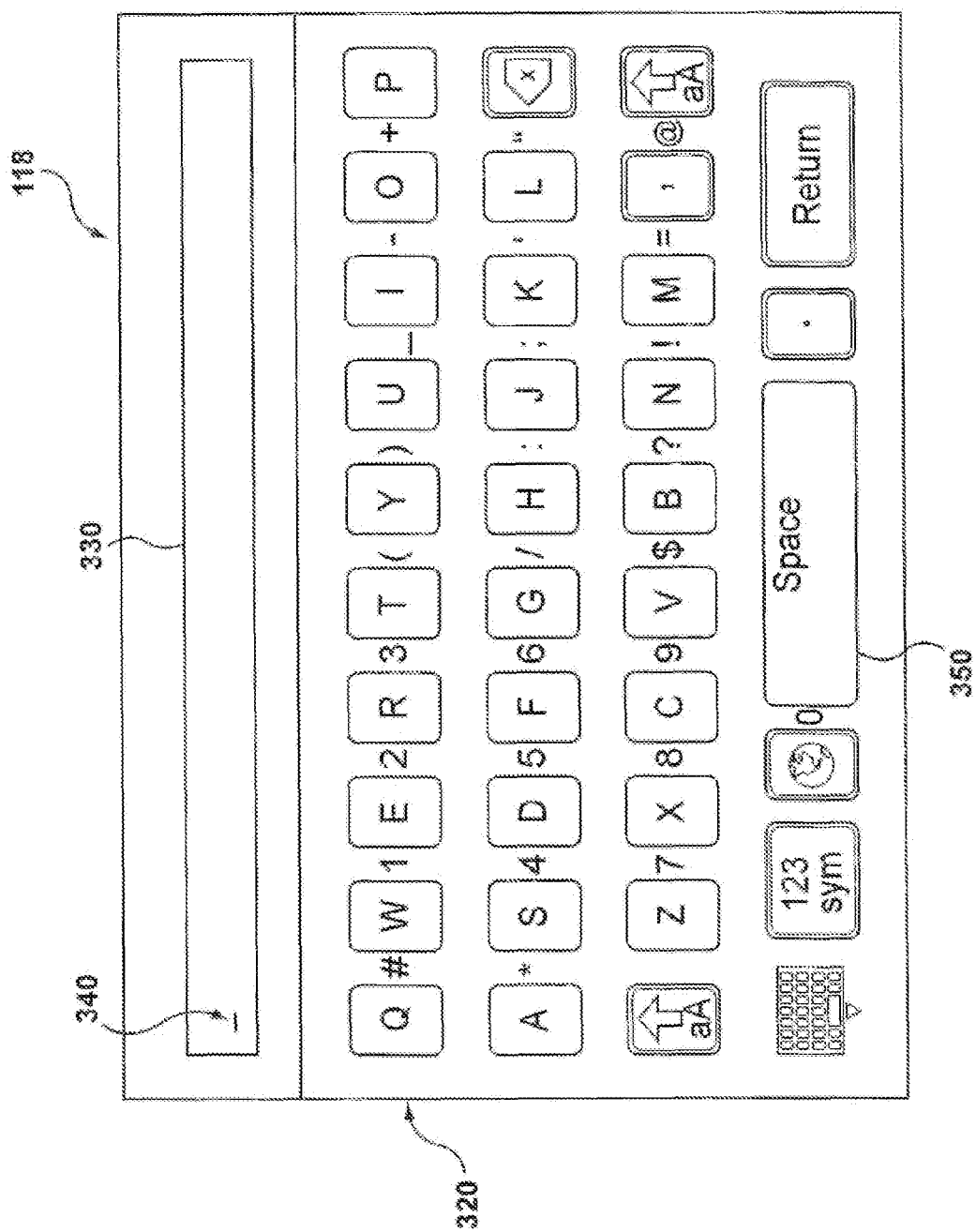
FIGS. 3A, 3B, 3C, and 3D show example front views of a touchscreen, consistent with embodiments disclosed herein.

As shown in FIG. 3A, touchscreen 118 displays a standard QWERTY virtual keyboard 320; however, any conventional key configuration can be displayed for use in the device, such as AZERTY, QWERTZ, or a layout based on the International Telecommunication Union (ITU) standard (ITU E.161) having "ABC" on key 2, "DEF" on key 3, and so on. Virtual keyboard 320 includes space key 350 as well as other keys that can provide different inputs, such as punctuation, letters, numbers, enter or return keys, and function keys. While virtual keyboard 320 is shown as having a square shape, it can have any other shape (such as an arch).

As shown in FIG. 3A, touchscreen 118 displays input field 330, which displays the characters the user inputs using virtual keyboard 320. Input field 330 includes a cursor 340, which can be an underscore (as shown) or any other shape, such as a vertical line. Cursor 340 represents the character space where a next inputted character, selected character, or selected set of characters will be inserted.

Figure 3B:
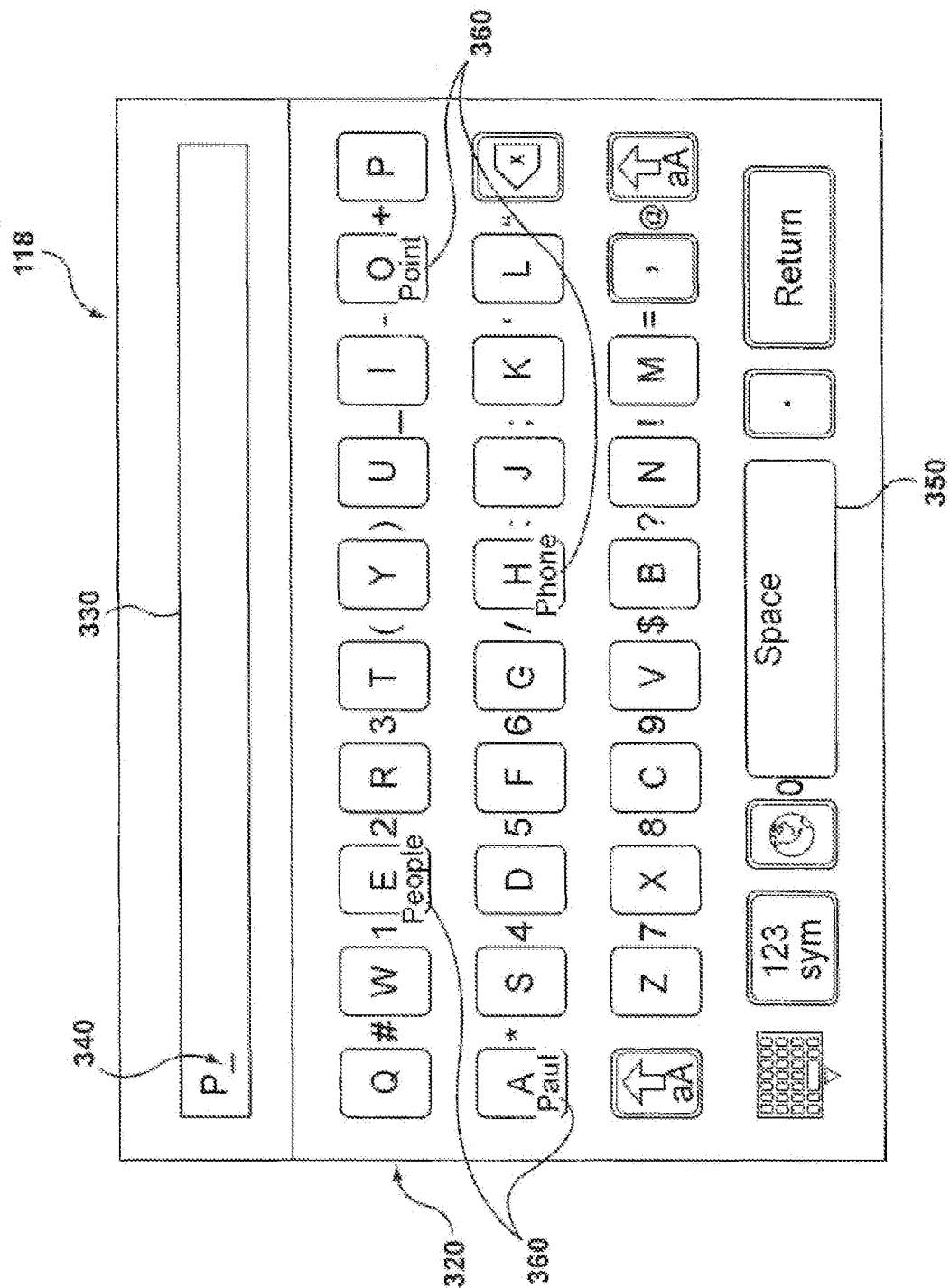

As shown in FIG. 3B, when a user inputs a character (in this example, "P"), this character is displayed in input field 330 and cursor 340 moves to the character space where the next inputted character or word will be inserted. After the character is inputted, a predictor (such as, a predictive algorithm or a circuit) can generate set of characters 360 (for this embodiment) that all begin with the character "P", or characters if more than one character is input. The generated set of characters are displayed at a location on the keyboard corresponding to a subsequent candidate input character that might be received as input from the user. As mentioned, generated set of characters 360 can be displayed at or near the key corresponding to the subsequent candidate input characters (for example, under the respective A, E, H, and O keys of the virtual keyboard 320). Indeed, slightly shifting the display location of the generated set of characters can address overcrowding of subsequent candidate input characters, effectively permitting more set of characters to be displayed.

In the example shown in FIG. 3B, "P" is received as input and a predictor generates several set of characters 360, which are displayed at keys corresponding to each generated set of characters' subsequent candidate input character. As shown in FIG. 3B, "People" is placed at the "E" key because the next letter after "P" of "People" is "E"; "Paul" will be place at the "A" key because the next letter after "P" of "Paul" is "A"; "Phone" will be placed at the "H" key because the next letter after "P" of "Phone" is "H"; and so on. It should be noted that any of the letters in the set of characters can be upper case or lower case.

Figure 3C:
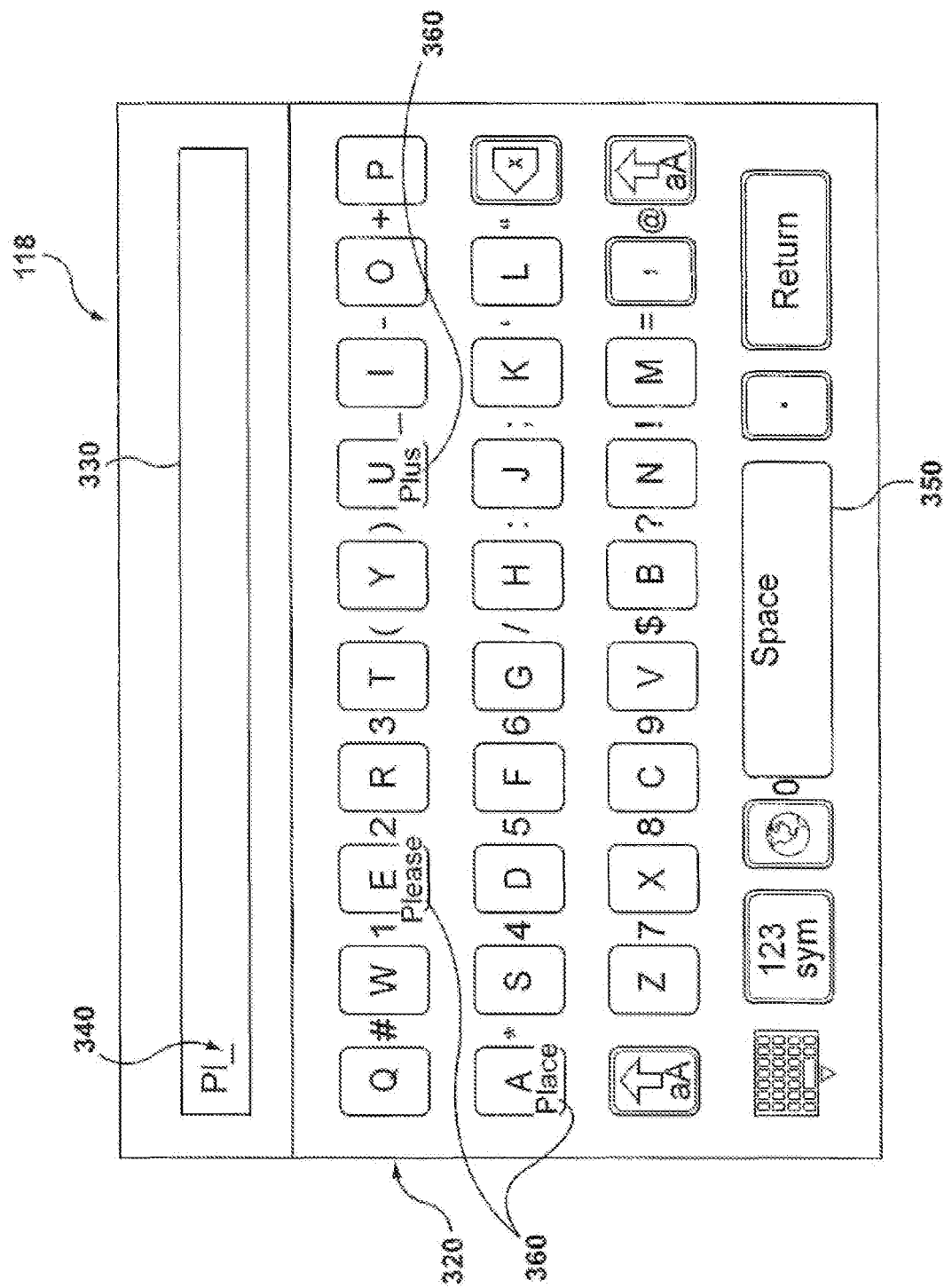

In the embodiment shown in FIG. 3C, "L" is the next input received by the touchscreen, and a predictor determines several generated set of characters 360, which are displayed at a key corresponding to subsequent candidate input characters (for example, under the respective A, E, and U keys of the virtual keyboard 320), for the current position of cursor 340, which is in the third character position, as shown in input field 330. In another embodiment, a generated set of characters 360 can be presented such as to include the subsequent candidate input character. For example, the set of characters "Please" can be displayed so that the characters "Pl" are displayed before the "E" character on the "E" key, and the characters "ase" can be placed after the "E" character on the "E" key. Further, in this or other embodiments, the displayed "E" can be presented in a manner that differs from the "Pl" and "ase", thereby enabling the user to still recognize it as the "E" key while also making it readily visible so that the user can either input the generated set of characters "Please" or input the character "E". The "E" can be capitalized or in lowercase. In other embodiments, an affix can be displayed at the key. Using the example of the set of characters "Please" above, the "ase" could be displayed at the "E" key so the set of characters fragment "-ease" or "-Ease" would appear.

If the user inputs a generated set of characters, that set of characters is placed in input field 330. This can be seen in FIG. 3D, where the user has inputted generated set of characters "Please," resulting in its placement in the input field. A space is inserted after the set of characters if the user wants to input a new set of characters. A user could input a generated set of characters in various ways, including in a way that differs from a manner of inputting a character key. For example, to input a generated set of characters, a user could use a finger or stylus to swipe the generated set of characters. As used herein, swiping includes swiping the set of characters itself or swiping or touching near the set of characters. For the latter embodiment, the device can detect a swipe or touch near a set of characters, be it a generated set of characters or a predicted set of characters (to be described below), and through the use of a predictor, determine the set of characters the user intended to input. In another embodiment, the user could press a key for a predetermined period of time, such as a long press. That key can be, for example, the key corresponding to the subsequent candidate input character of the set of characters. So, if the set of characters "Please" is intended to be inputted instead of "E", the electronic device 100 can be configured to require that the "E" key be pressed for a predetermined period of time to trigger the input of "Please".

Figure 3D:
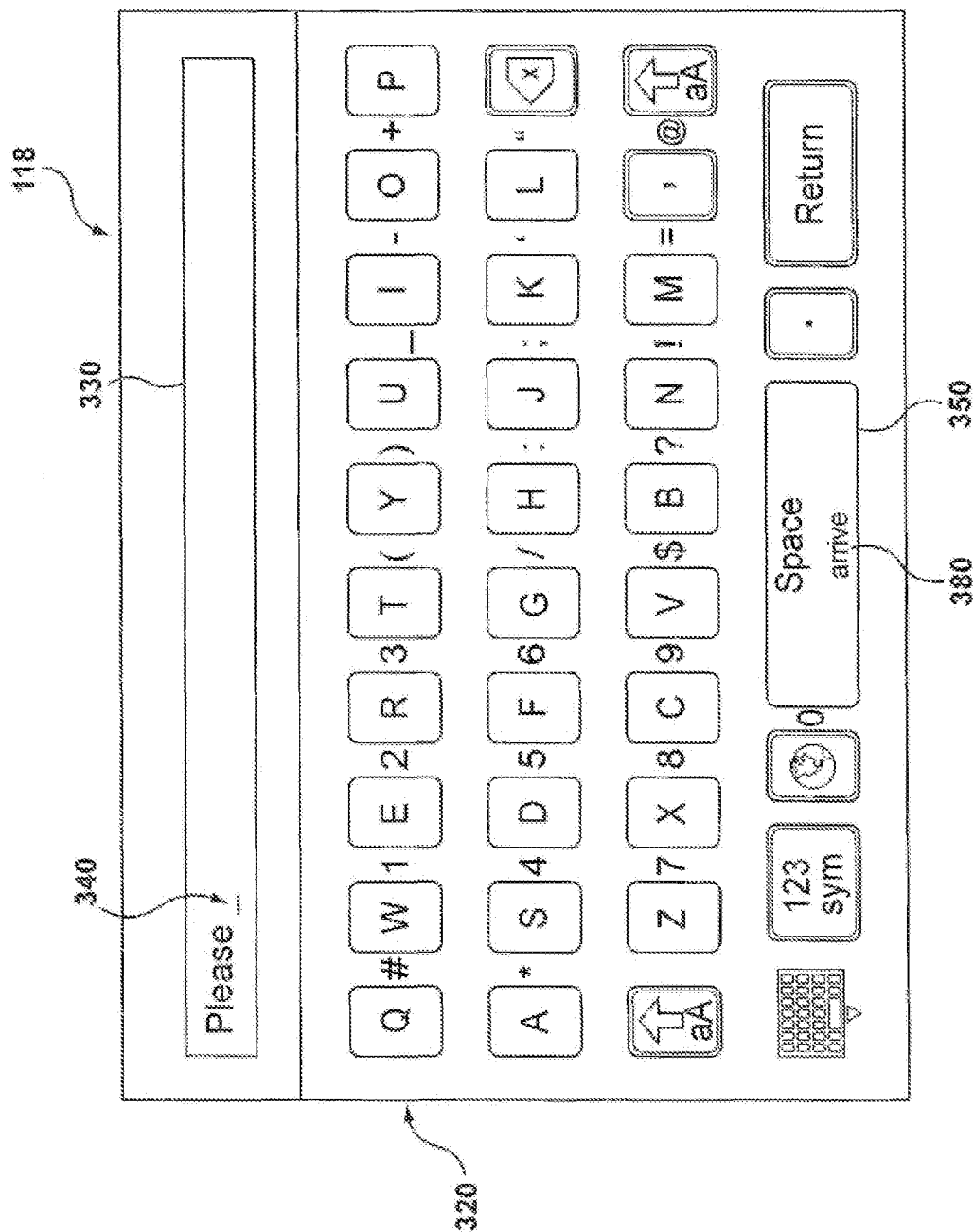

After a generated set of characters 360 has been determined, as shown in FIG. 3D, a predicted set of characters 380 can be displayed, shown here at space key 350. Predicted set of characters 380 can differ from generated set of characters 360 (as shown in FIGS. 3A-3C) and is the system's attempt to predict the next set of characters a user might be contemplating. A predictor is used to determine predicted set of characters 380. As with displayed generated set of characters 360, predicted set of characters 380 can be received as input in any number of ways, including receiving a swiping of the predicted set of characters with a finger or stylus or receiving a pressing of a key (such as the space key or another designated key) for a predetermined period of time (long press).

Figure 4A:
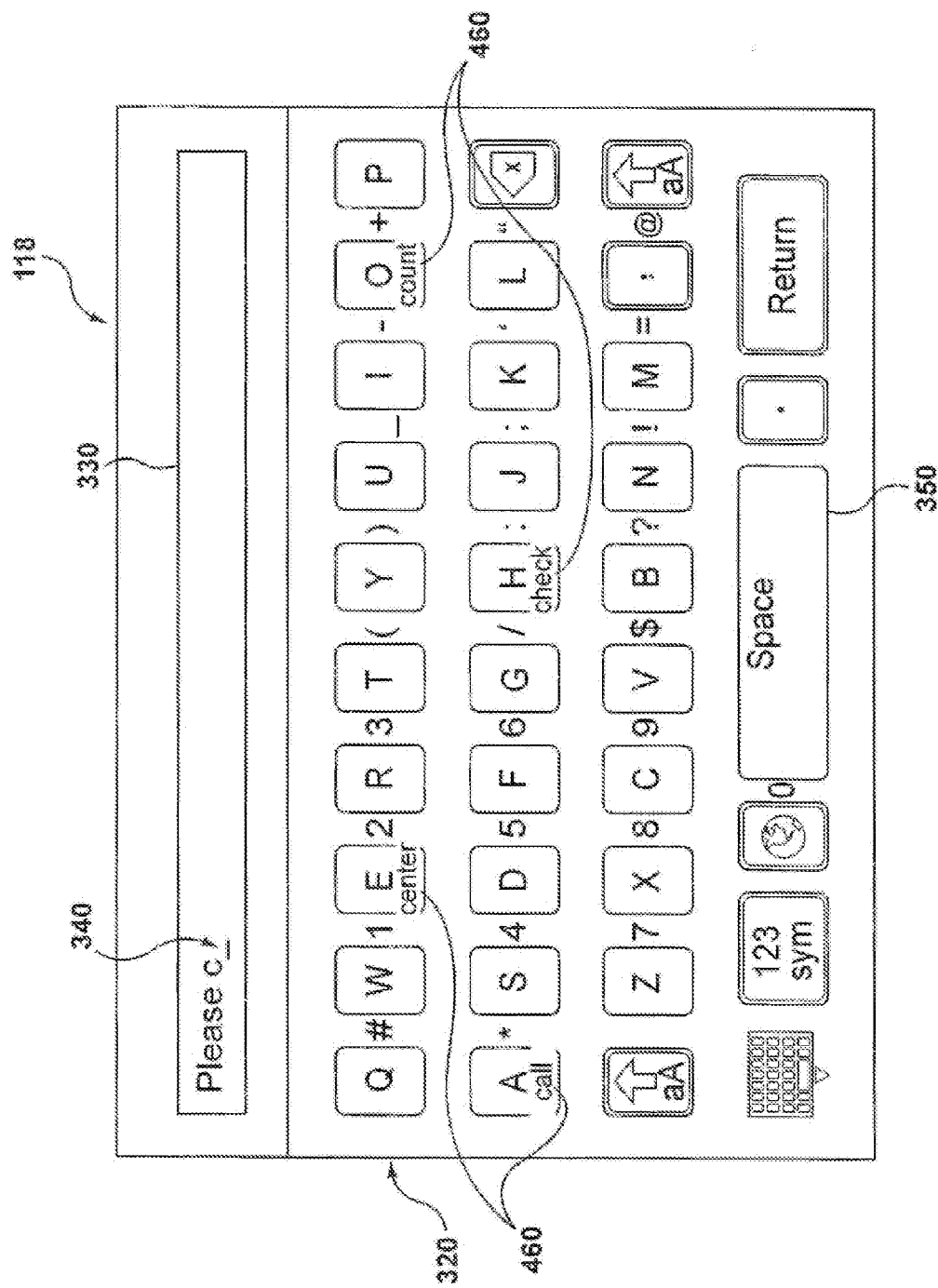
FIGS. 4A and 4B show example front views of a touchscreen, consistent with embodiments disclosed herein.
Figure 4B:
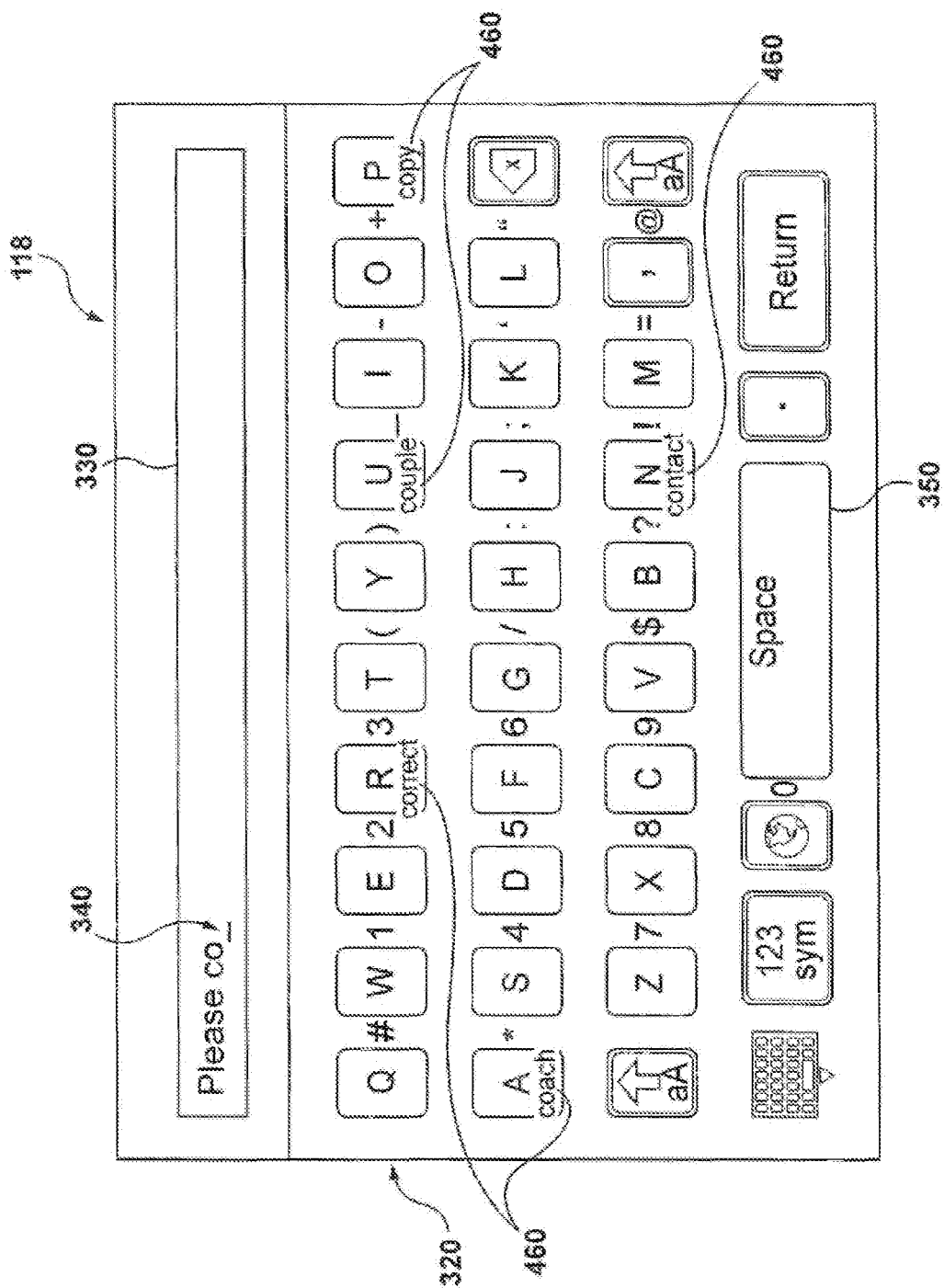

In FIG. 4A, electronic device 100 receives "C" as input from virtual keyboard 320. Again, a predictor determines generated set of characters 460 based in part on the received input. In FIG. 4B, electronic device 100 receives "O" as input from the virtual keyboard and outputs the "O" in input field 330. As shown in FIG. 4A, the set of characters "count" was displayed at the "O" key after the input of the "C" character was received. Since the "O" key was pressed in a manner to only input the "O" character, as shown in FIG. 4B, an "O" is displayed as second character of the currently inputted set of characters, and the set of characters "count" is not inputted by the user. Alternatively, if a user wanted to input the generated set of characters "count," the user can input the "O" key in FIG. 4A in a manner different from a manner of inputting the "O" key, such as by swiping the set of characters "count" or by a long press on the "O" key, as opposed to tapping. Returning to FIG. 4B, after the "O" is inputted, generated set of characters 460 are displayed at the keys corresponding to subsequent candidate input characters, as shown in FIG. 4B.

Figure 5:
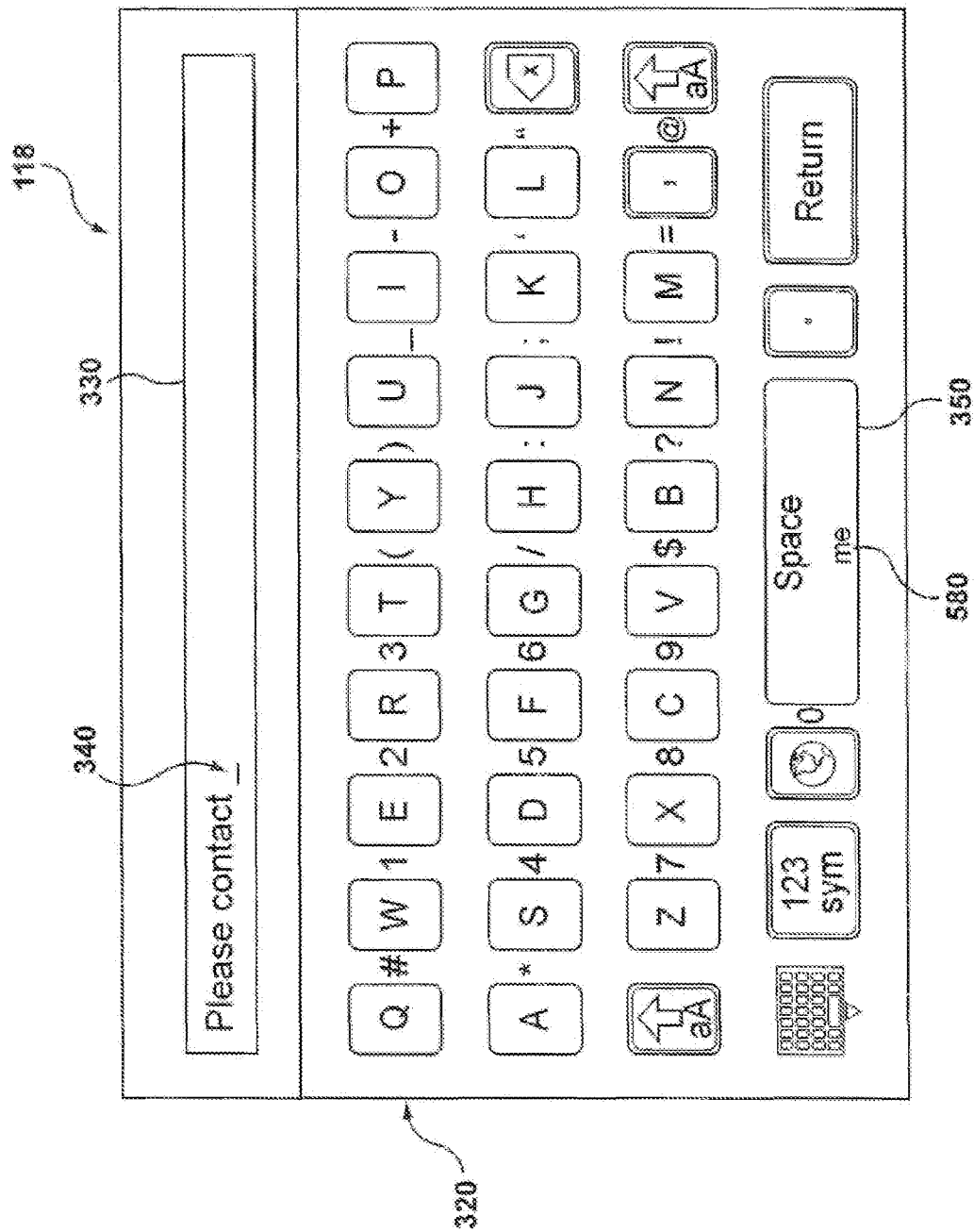
FIG. 5 shows an example front view of a touchscreen, consistent with embodiments disclosed herein.

FIG. 5 shows input field 330 displaying the set of characters "contact" followed by a space. In that instance, the user inputted the generated set of characters "contact" 460 as was shown in FIG. 4B at the "N" key. Referring back to FIG. 5, a <SPACE> character is now automatically inserted after the generated word in the input field. Predicted word "me" 580 is now displayed on space key 350.

Figure 6A:
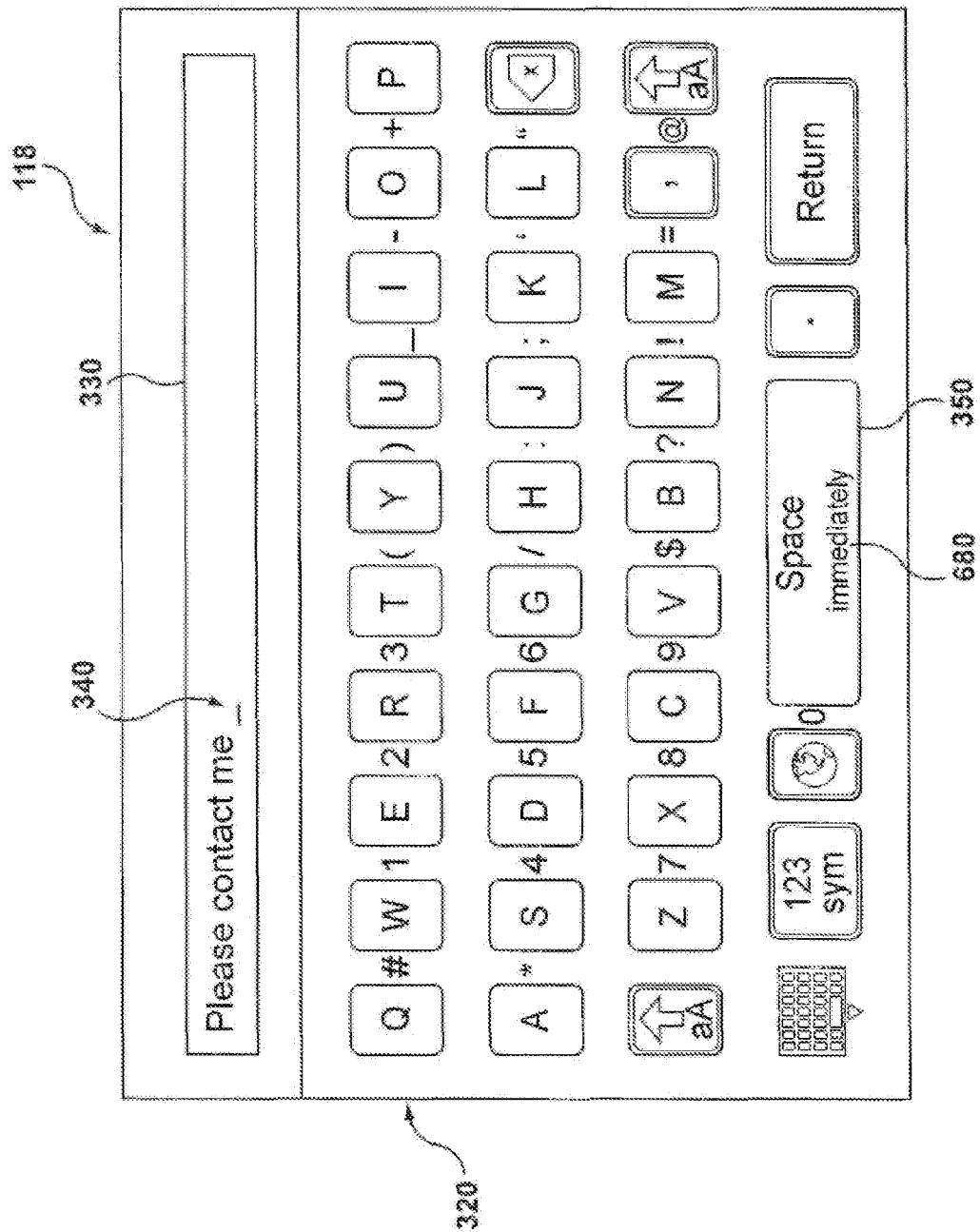
FIGS. 6A, 6B, and 6C show example front views of a touchscreen, consistent with embodiments disclosed herein.

If the predicted word "me" 580 is received as input, the word "me" 580 is then displayed in input field 330 followed by a space as shown in FIG. 6A, which then shows predicted word 680 "immediately" displayed on space key 350. The predicted word is presented after a completed word and space have been displayed in input field 330.

Figure 6B:
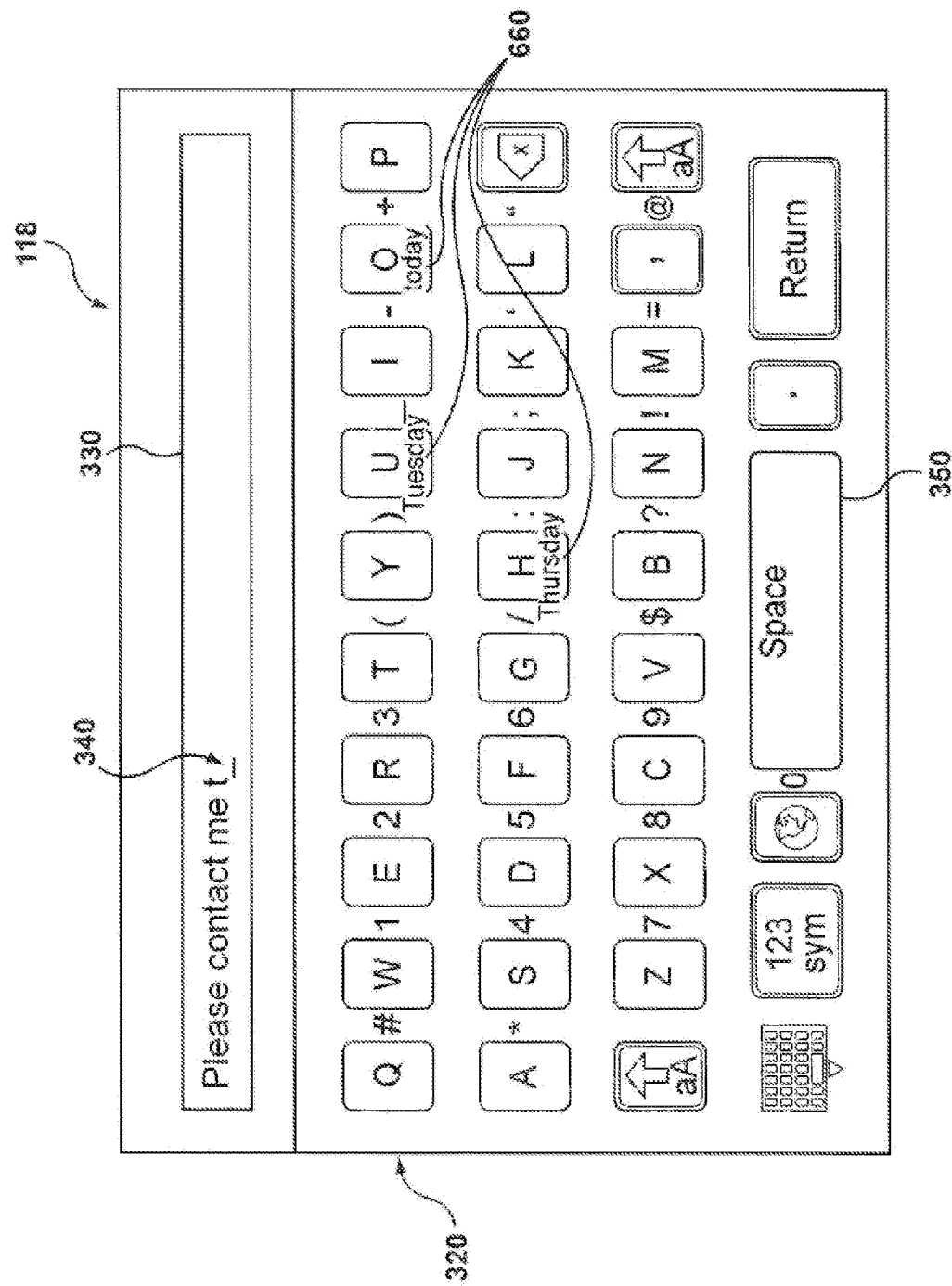
Figure 6C:
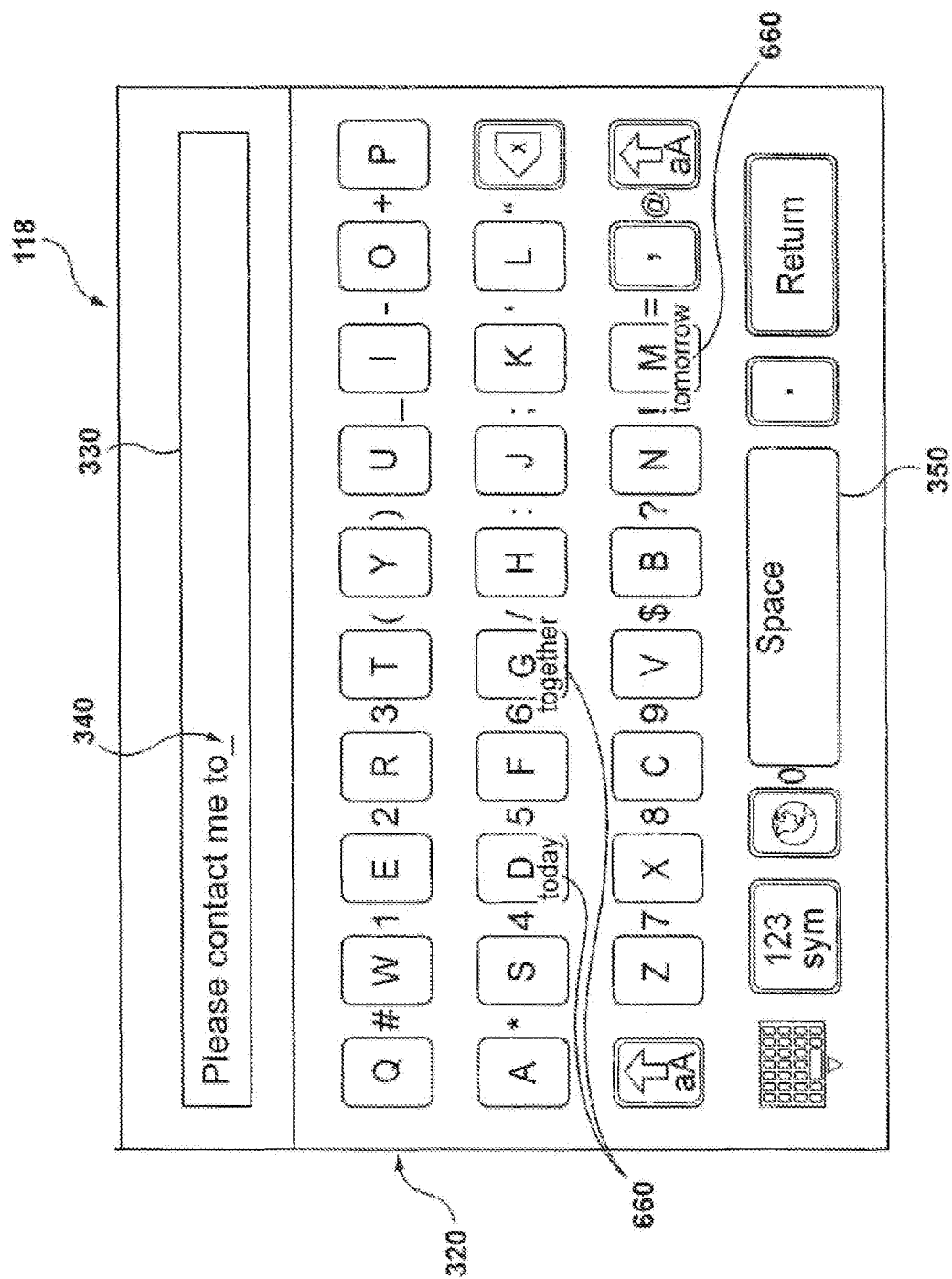

FIG. 6B shows an example where touchscreen 118 has received the "T" character as input after the user has pressed the "T" key. In this scenario, touchscreen 118 displays a "t" in input field 330. Generated set of characters 660 (for example, "Tuesday," "today," and "Thursday") are displayed at the keys of the subsequent candidate input characters. FIG. 6C shows an example where electronic device 100 has received the "o" character as input after the user presses the "O" key instead of inputting generated set of characters 660 "today" as was shown in FIG. 6B. Thus, "o" is now displayed in input field 330.

Figure 7:
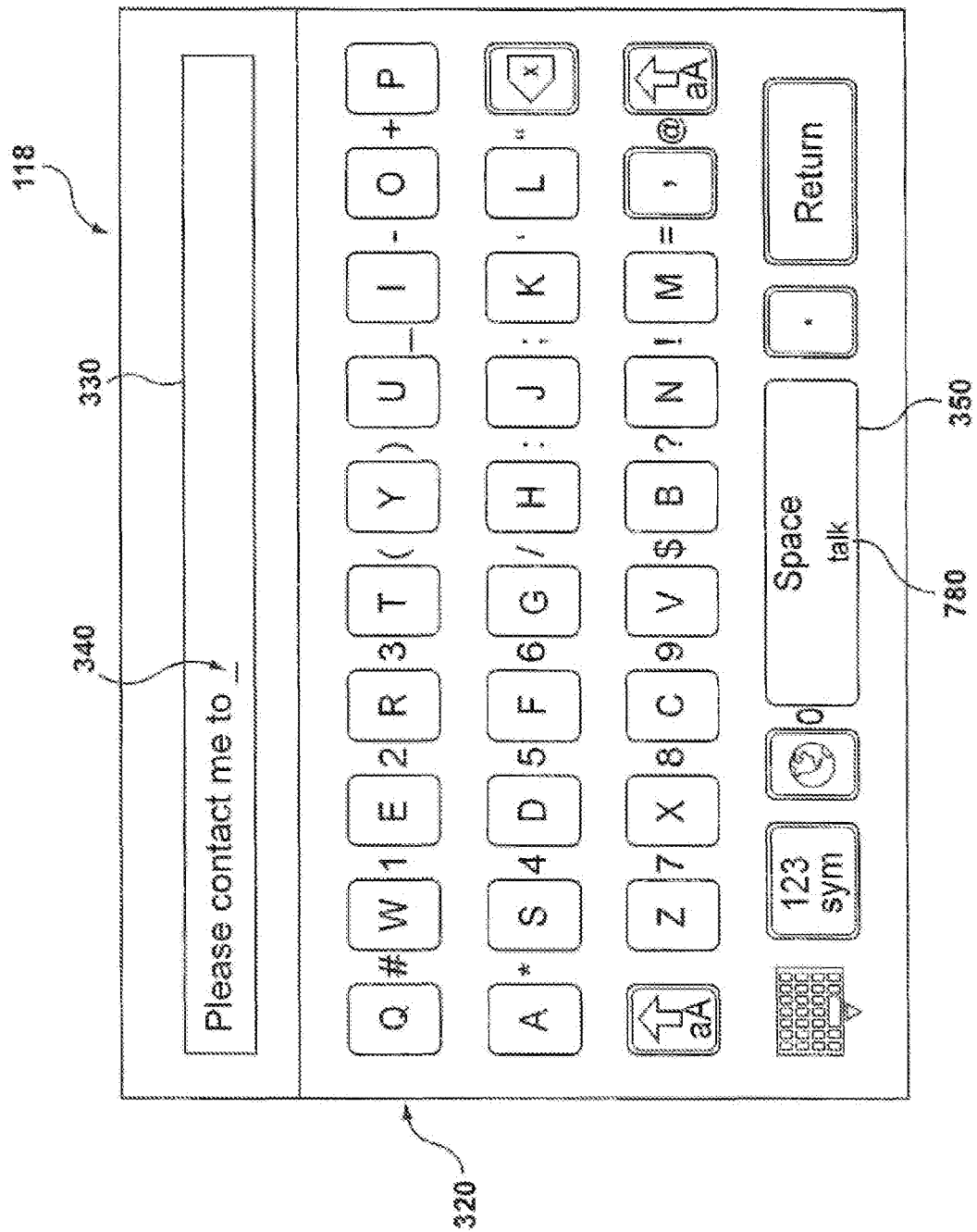
FIG. 7 shows an example front view of a touchscreen, consistent with embodiments disclosed herein.

FIG. 7 shows an example where touchscreen 118 has received the <SPACE> character as input after the user selects the space key. In this scenario, touchscreen 118 inserts a <SPACE> character, and then displays predicted set of characters "talk" 780 at space key 350.

Figure 8A:
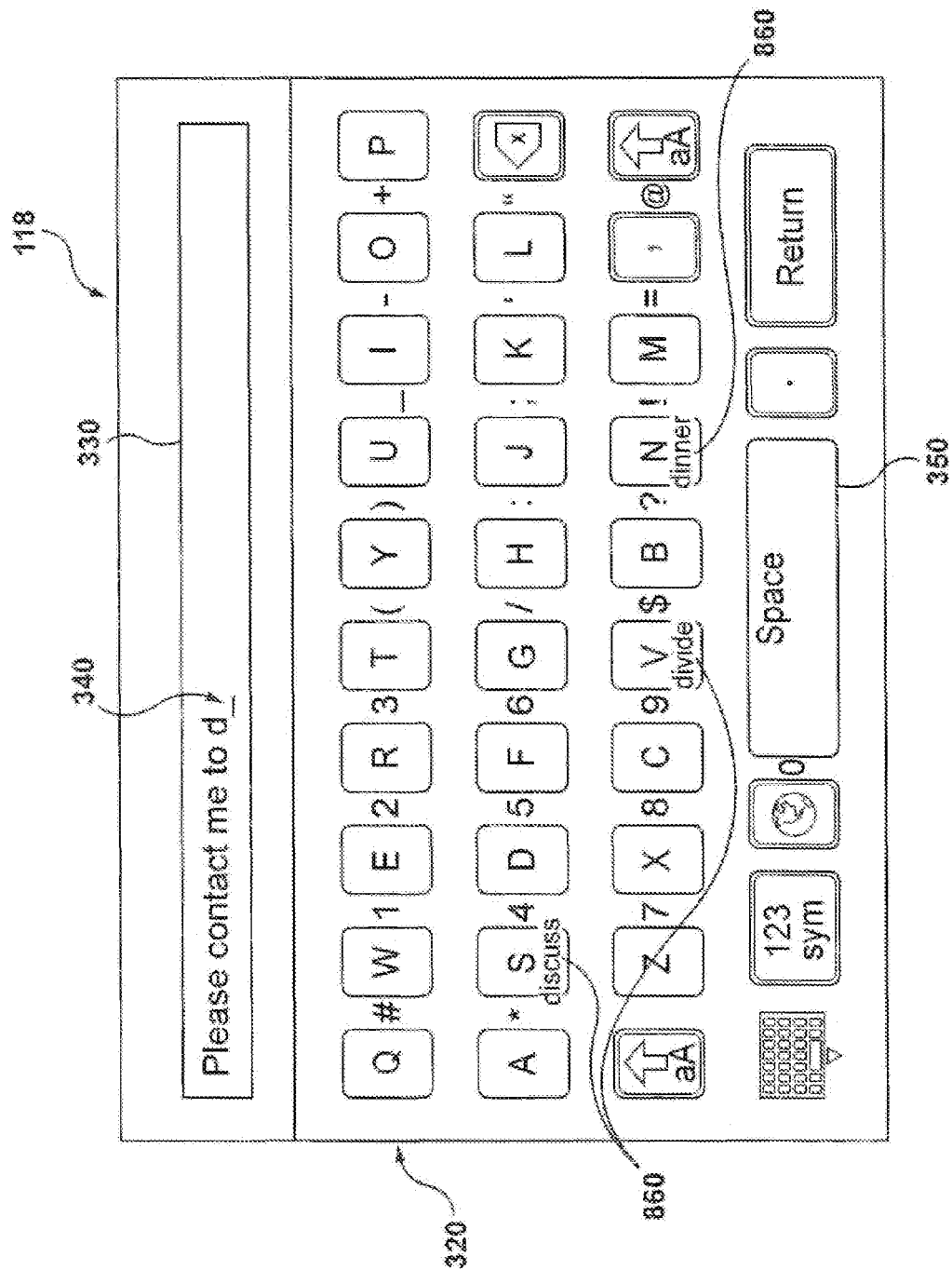
FIGS. 8A and 8B show example front views of a touchscreen, consistent with embodiments disclosed herein.

FIG. 8A shows an example where touchscreen 118 has received the "d" character as input after the user presses the "D" key. In this scenario, touchscreen 118 displays a "d" in the input field 330 and displays generated set of characters "discuss," "divide," and "dinner" 860 on keys corresponding to subsequent candidate input characters. In this example embodiment, while the character "I" was never received as input, electronic device 100 determined that generated set of characters "discuss," "divide," and "dinner" 860 were the set of characters to be displayed on touchscreen. In this embodiment, because each of these set of characters has "i" as its second letter, touchscreen 118 displayed generated set of characters using a further subsequent letter in the set of characters (for example, "discuss" under the "S" key, "divide" under the "V" key, and "dinner" under the "N" key). In other embodiments, generated set of characters "discuss," "divide," and "dinner" 860 can be displayed at or near the "I" key.

Figure 8B:
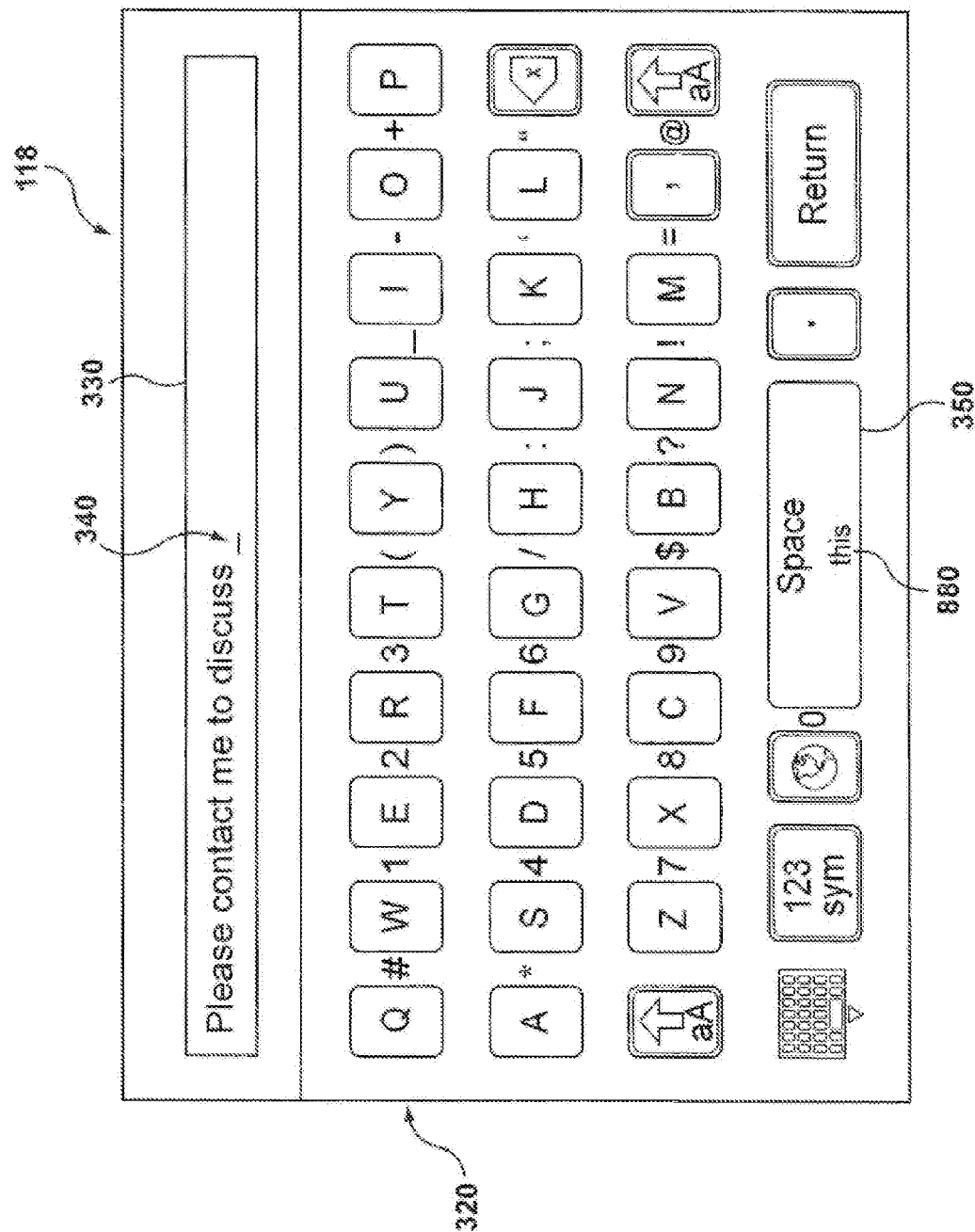

FIG. 8B shows an example where touchscreen 118 has received the set of characters "discuss" as input after the user chooses generated set of characters "discuss" 860. In this example, touchscreen 118 displays predicted set of characters "this" 880 at space key 350.

Figure 9:
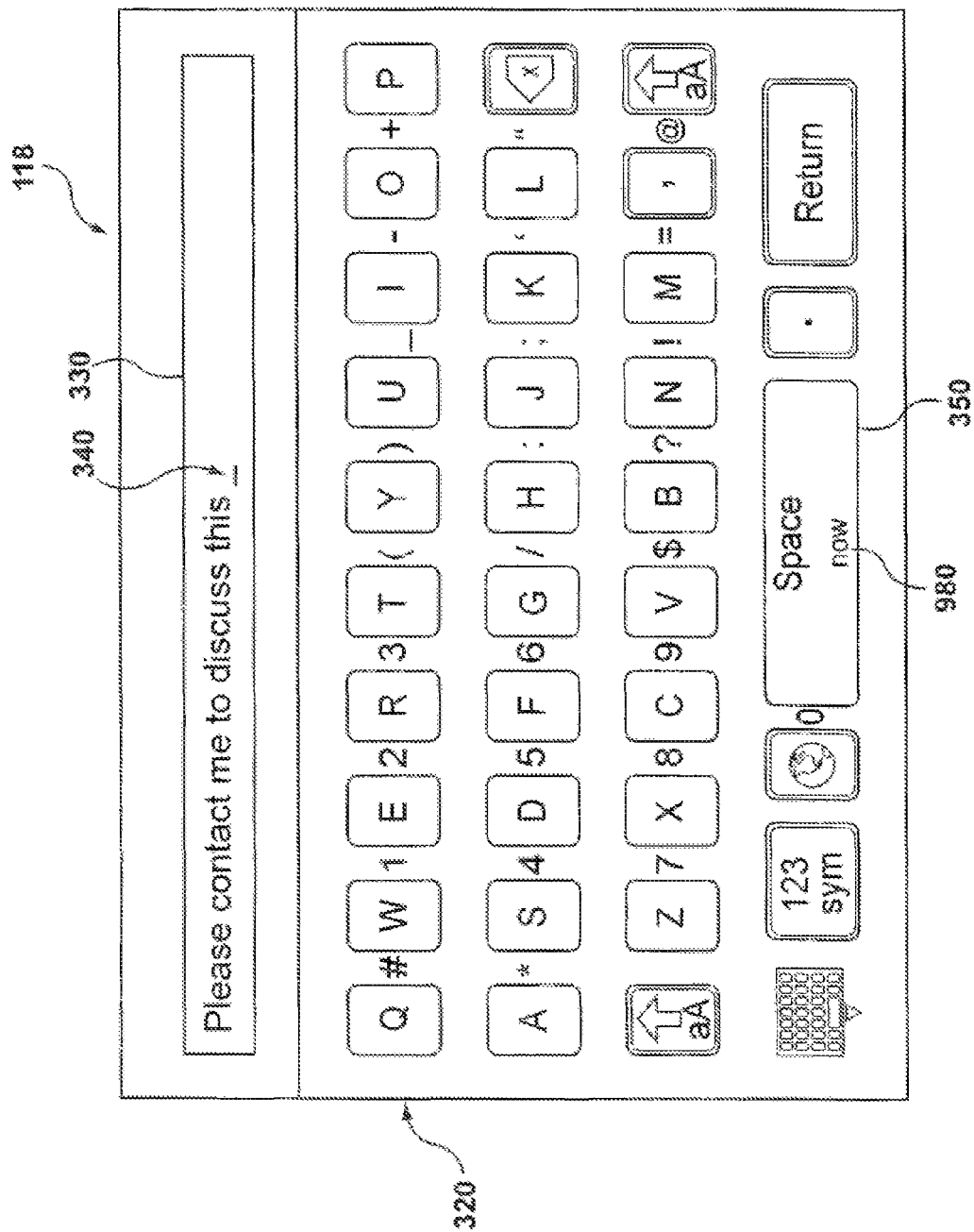
FIG. 9 shows an example front view of a touchscreen, consistent with embodiments disclosed herein.

FIG. 9 shows an example where touchscreen 118 receives the "this" set of characters as input after user selects "this" as a desired predicted set of characters 880. In this example, touchscreen 118 displays predicted set of characters "now" 980 at space key 350.

Touchscreen 118 can also receive punctuation as input at any time during the typing of a message. If a user decides to use punctuation after inputting either a generated set of characters or a predicted set of characters, the <SPACE> character (for example, the <SPACE> character prior to cursor 940 of FIG. 9) is deleted and the inputted punctuation is inserted.

Figure 10A:
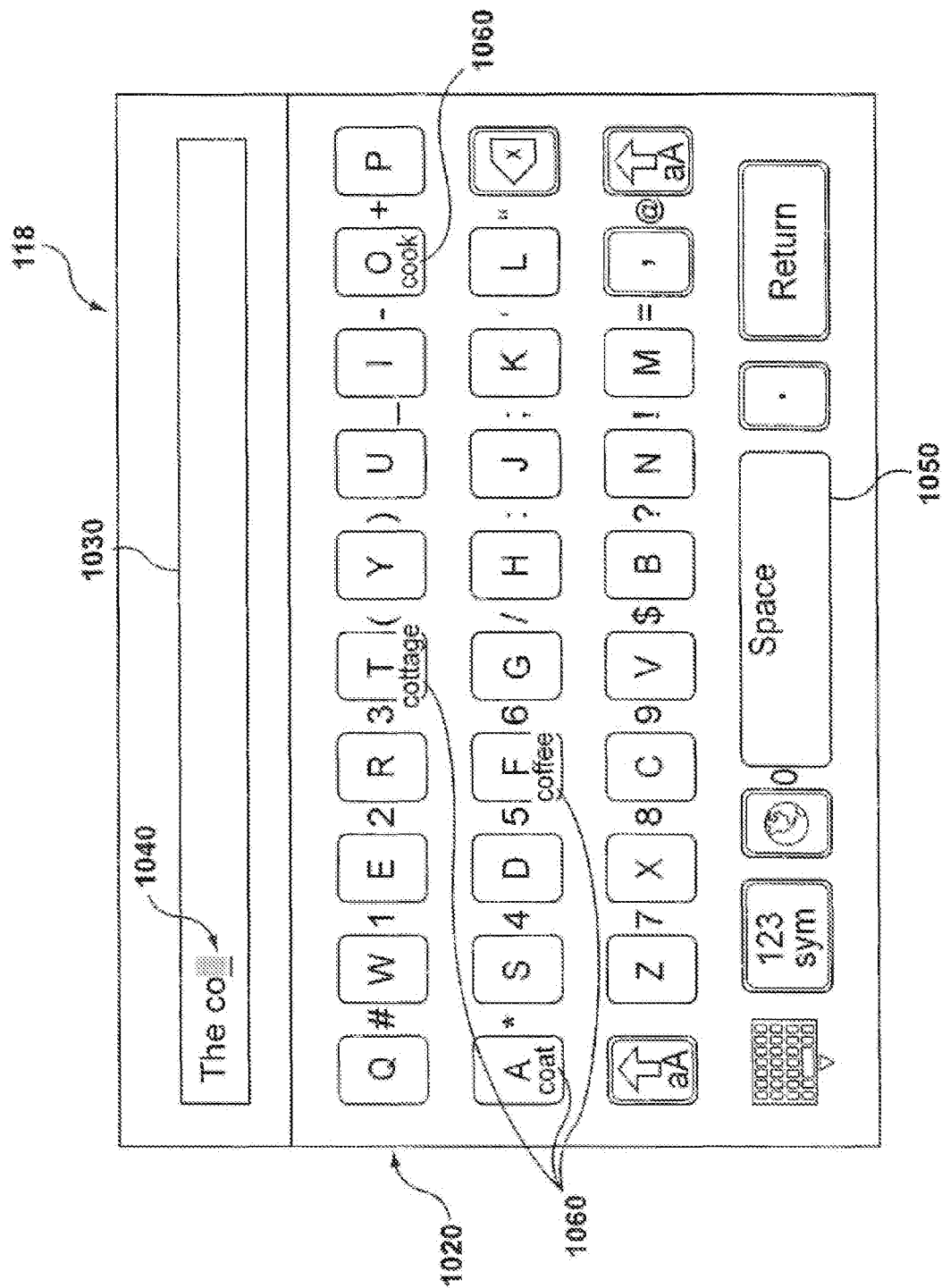
FIGS. 10A and 10B show example front views of a touchscreen, consistent with embodiments disclosed herein.
Figure 10B:
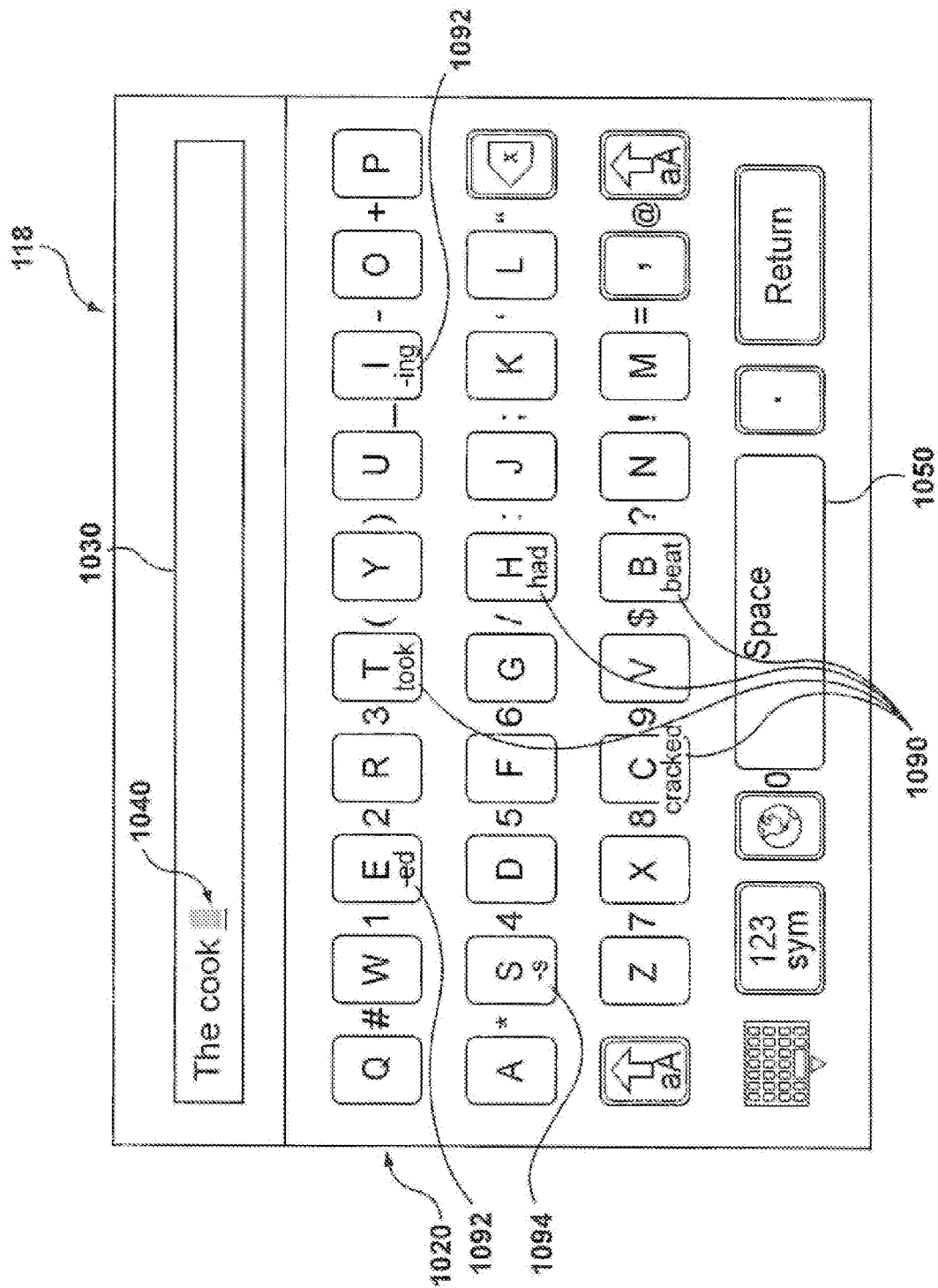

FIGS. 10A and 10B show example front views of a touchscreen, consistent with embodiments disclosed herein. FIG. 10A shows an example where touchscreen 118 displays "The co" in a text bar 1030 and several generated set of characters 1060 are displayed at subsequent candidate input characters. In this example, touchscreen 118 displays generated set of characters "cottage" 1060 under the "T" key, generated set of characters "cook" 1060 under the "O" key, generated set of characters "coat" 1060 under the "A" key, and generated set of characters "coffee" 1060 under the "A" key.

FIG. 10B shows an example where touchscreen 118 receives the set of characters "cook" as input after the user has selected the generated set of characters 1060 "cook." The set of characters "cook" is inserted into input field 1030 along with a <SPACE> character. In this example, set of characters include new predicted set of characters (such as words 1090, affixes 1092 (for example, "-ed" under the "E" key and "-ing" under the "I" key), and plurals 1094 (for example, "-s" under the "S" key)), all of which are displayed at subsequent candidate input characters. Each predicted word 1090, affix 1092, or plural 1094 is located on respective subsequent candidate input characters that match the first letter of the predicted word 1090, affix 1092, or plural 1094. Now the user has the added option of inputting a predicted set of characters 1090, 1092, and 1094. Input is made in the same manner as described above. In some embodiments, when touchscreen 118 receives either affix 1092 or plural 1094 as an input, the <SPACE> character between cursor 1040 and "cook" is deleted and the corresponding inputted affix or plural is added to the end of "cook."

Figure 11A:
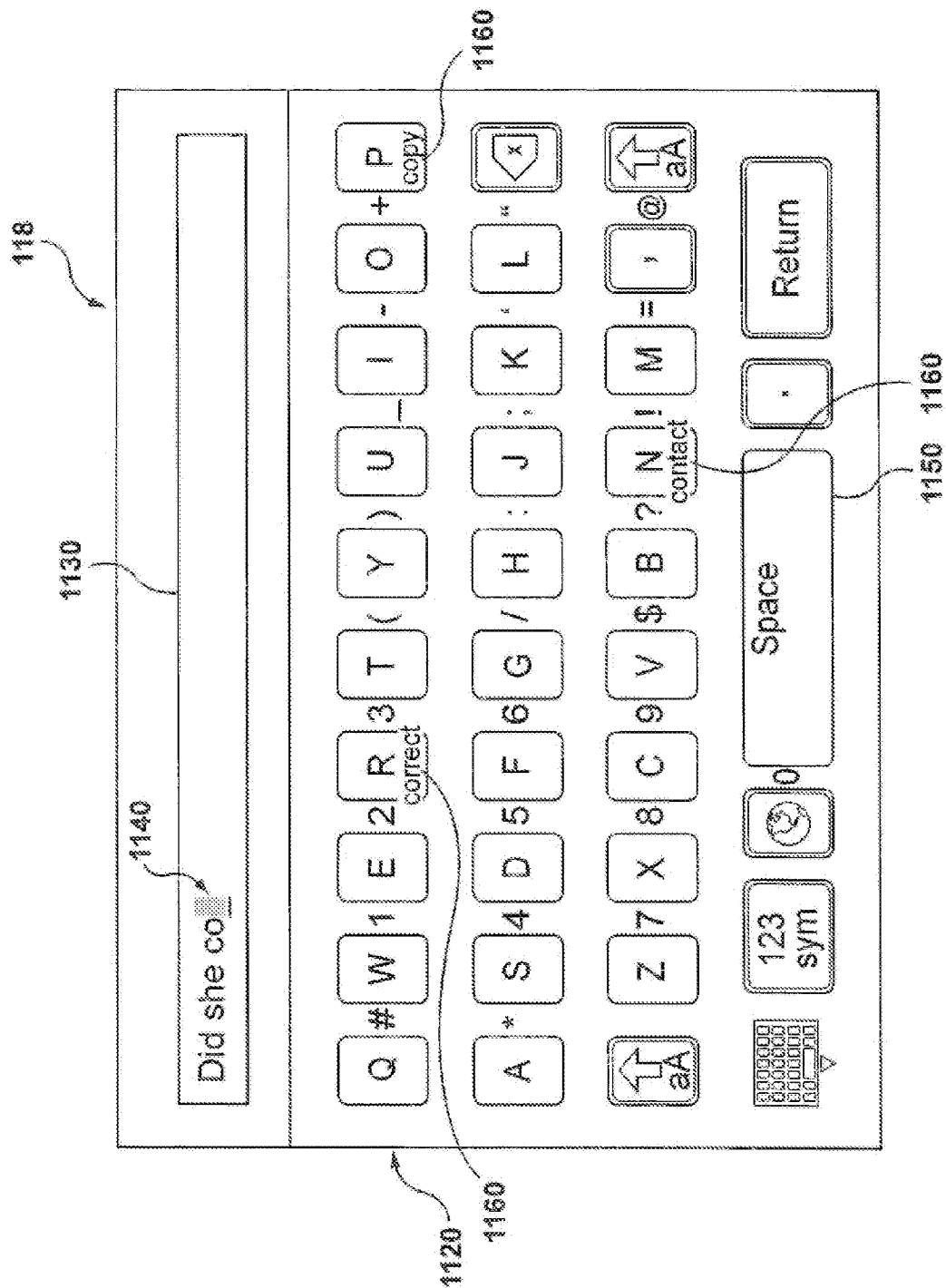
FIGS. 11A and 11B show example front views of a touchscreen, consistent with embodiments disclosed herein.

FIG. 11A shows an example where touchscreen 118 displays "Did she co" in a text bar 1130 and several generated set of characters 1160 are displayed at subsequent candidate input characters. In this example, touchscreen 118 displays generated set of characters "correct" 1160 under the "R" key, generated set of characters "copy" 1160 under the "P" key, and generated set of characters "contact" 1160 under the "N" key. While "co" is provided in the text bars of both FIG. 10A and FIG. 11A, touchscreen displays different generated set of characters based on the context of the characters in their respective text bars 1030 and 1130. For example, in FIG. 10A, the characters "co" follows "The," which implies that a noun beginning with "co" should follow. In FIG. 11A, the characters "co" follow a pronoun, which implies that a verb beginning with "co" should follow. As stated above, contextual data can be used to determine when certain set of characters are more appropriate based on, for example, the set of characters in a text bar or previous actions by a user.

Figure 11B:
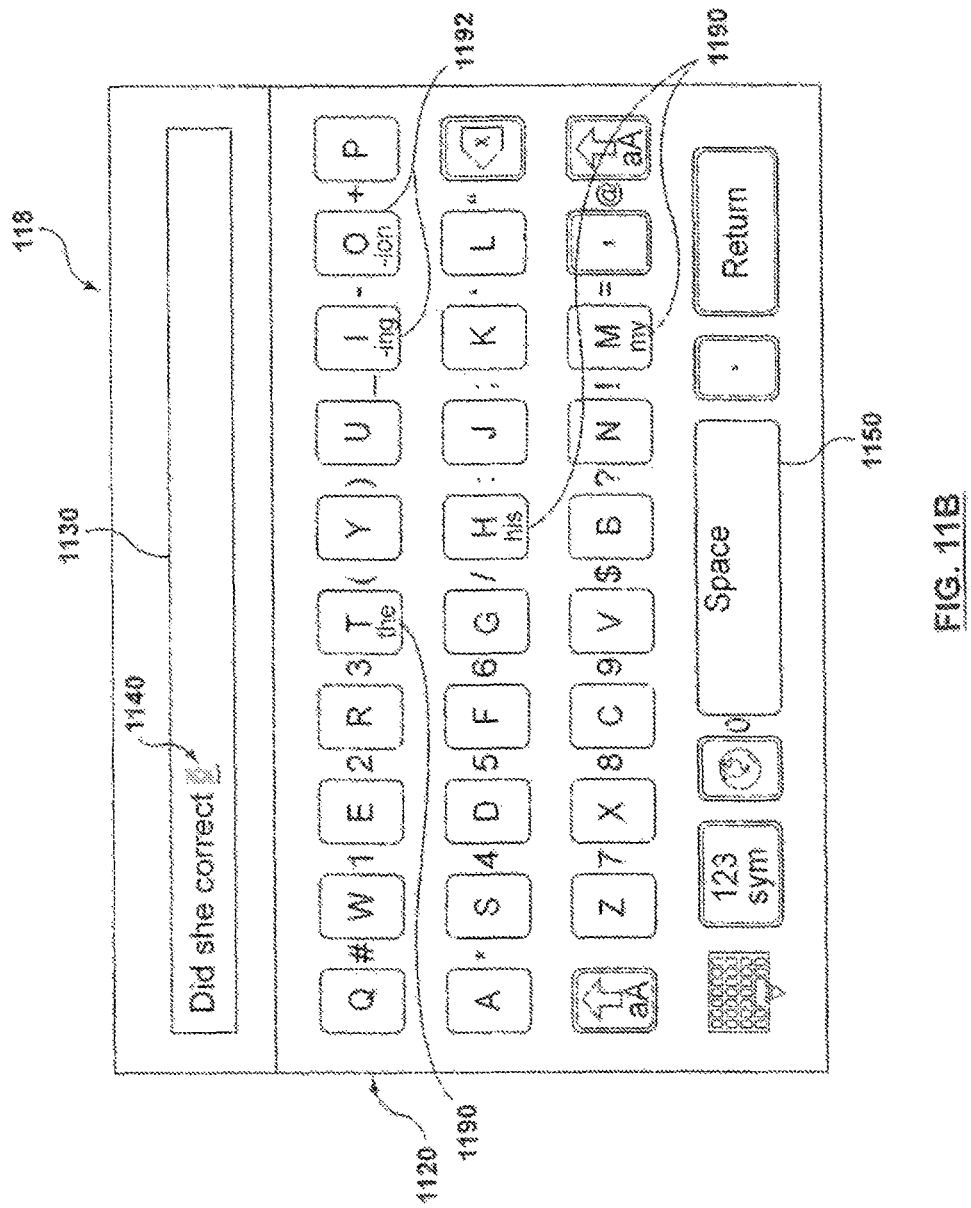

FIG. 11B shows an example where touchscreen 118 receives the set of characters "correct" as input after the user has selected the generated set of characters "correct" 1160. In this example, the set of characters "correct" is inserted in input field 1130 and a <SPACE> character is also inserted. Predicted set of characters (such as words 1190 and affixes 1192) are now displayed at subsequent candidate input characters. In this example, while affixes "-ing" and "-ion" both correspond to the "I" key, touchscreen 118 displays "-ing" with the "I" key and "-ion" with the "O" key. As stated above, the predicted affix may be assigned to a certain key based on a ranking, on contextual data, or a combination of both. In this embodiment, the "-ing" affix may have had a higher ranking than the "-ion" affix and was thus assigned to the "I" key. Accordingly, the "-ion" affix was assigned to the "O" key based on the corresponding "O" character being in the "-ion" affix.

Figure 12A:
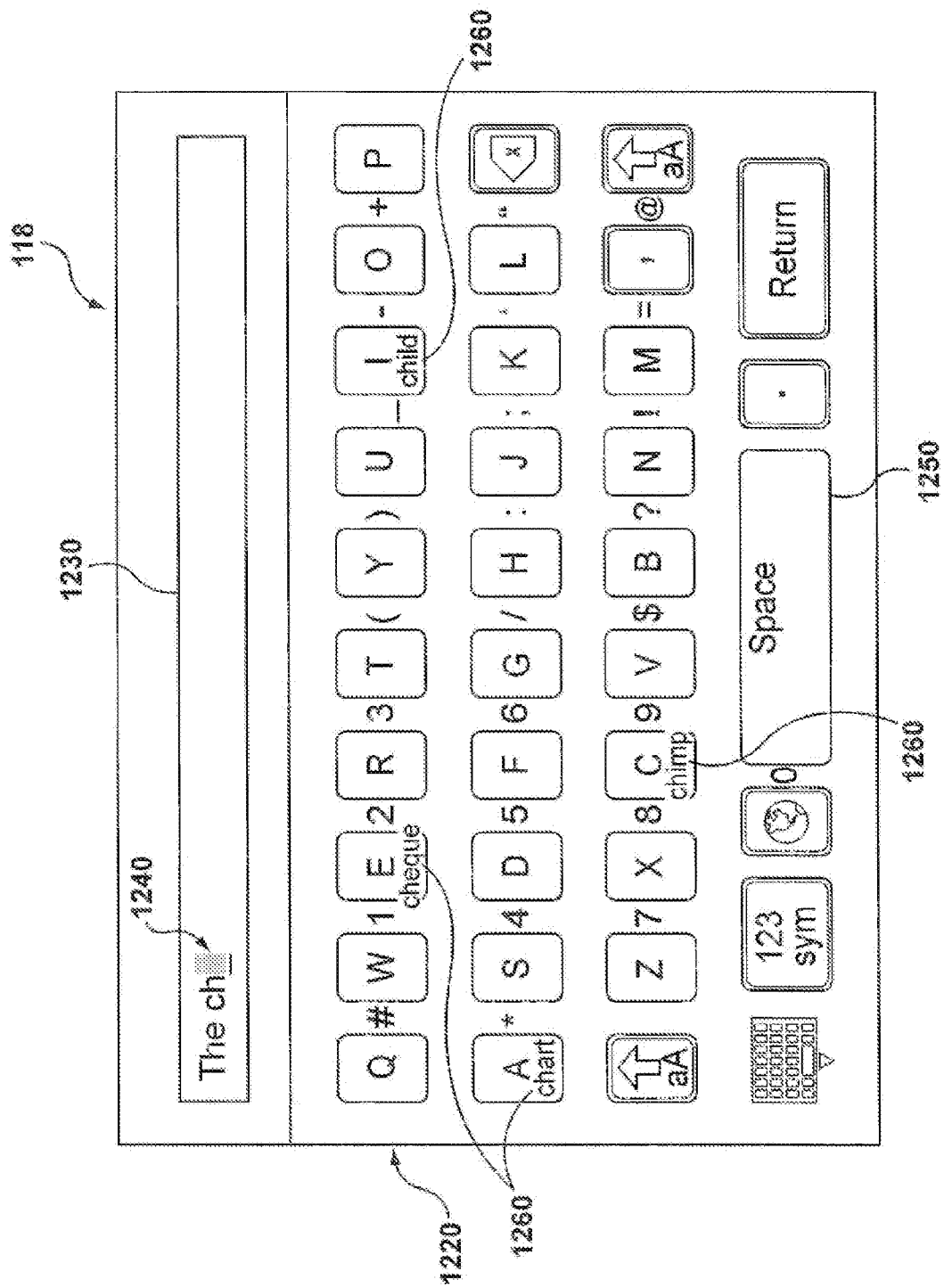
FIGS. 12A and 12B show example front views of a touchscreen, consistent with embodiments disclosed herein.

FIG. 12A shows an example where touchscreen 118 displays "The ch" in a text bar 1230 and several generated set of characters 1260 are displayed at subsequent candidate input characters. In this example, generated set of characters 1260 include both "child" and "chimp." In this embodiment, while the third letter in both "child" and "chimp" are the same, touchscreen displays "child" under the "I" key and displays "chimp" under the "C" key. The determination on which generated set of characters goes under which candidate input key can be based on a ranking (as specified above). As illustrated in this embodiment, touchscreen 118 can display a generated set of characters (in this case, "chimp") on a key even though that key may not be associated with any subsequent characters of the characters in text bar 1230.

Figure 12B:
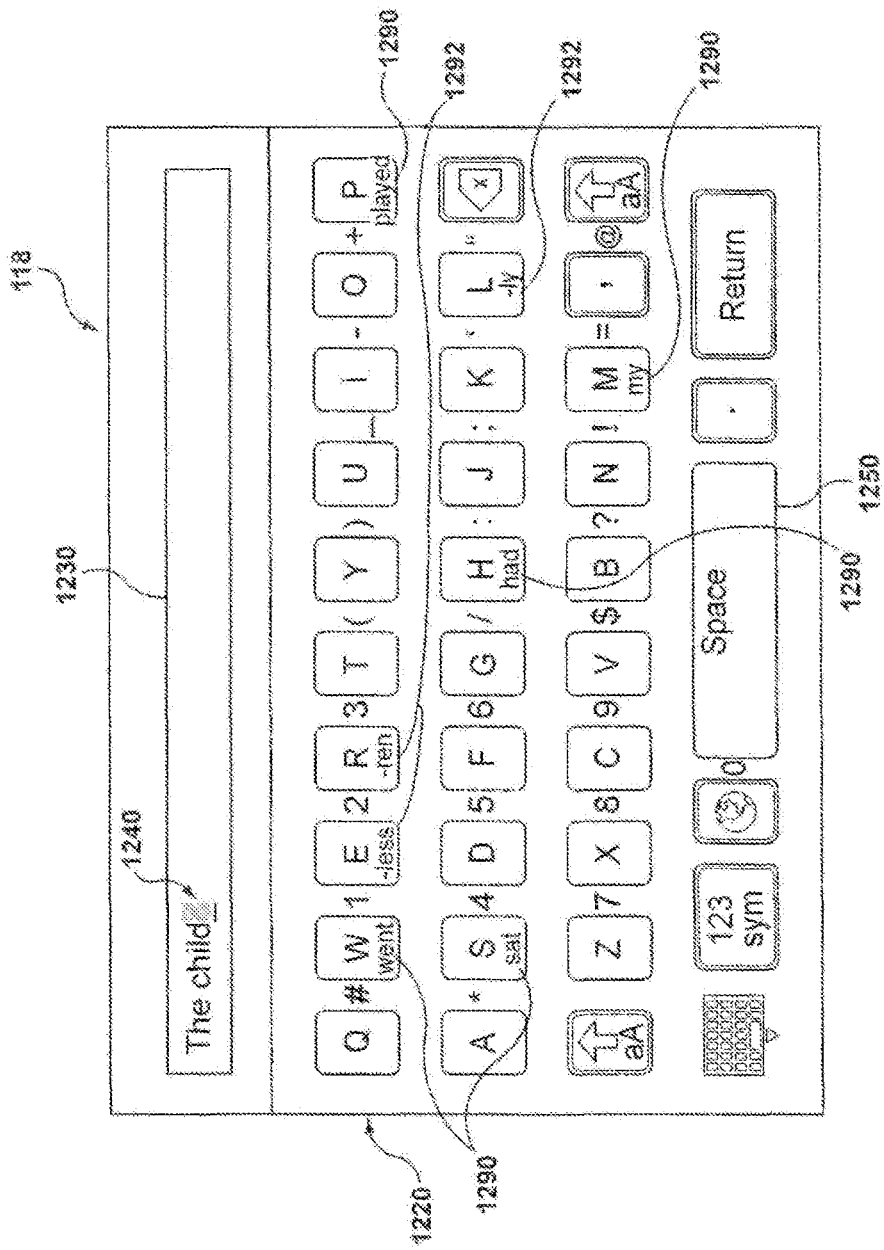

FIG. 12B shows an example where touchscreen 118 receives the set of characters "child" as input after the user has selected the generated set of characters "child" 1260. The set of characters "child" is inserted in input field 1230 and, in this example, a <SPACE> character is not inserted. Predicted set of characters (such as words 1290 and affixes 1292) are now displayed at subsequent candidate input characters. In this example, while affixes "ly" and "-less" both correspond to the "L" key, touchscreen 118 displays "-ly" with the "L" key and "-less" with the "E" key. As stated above, the predicted affix may be assigned to a certain key based on a ranking, on conventional data, or a combination of both. In this embodiment, the "ly" affix may have had a higher ranking than the "-less" affix and was thus assigned to the "L" key. Accordingly, the "-less" affix was assigned to the "E" key based on the corresponding "E" character being in the "-less" affix.

Figure 13A:
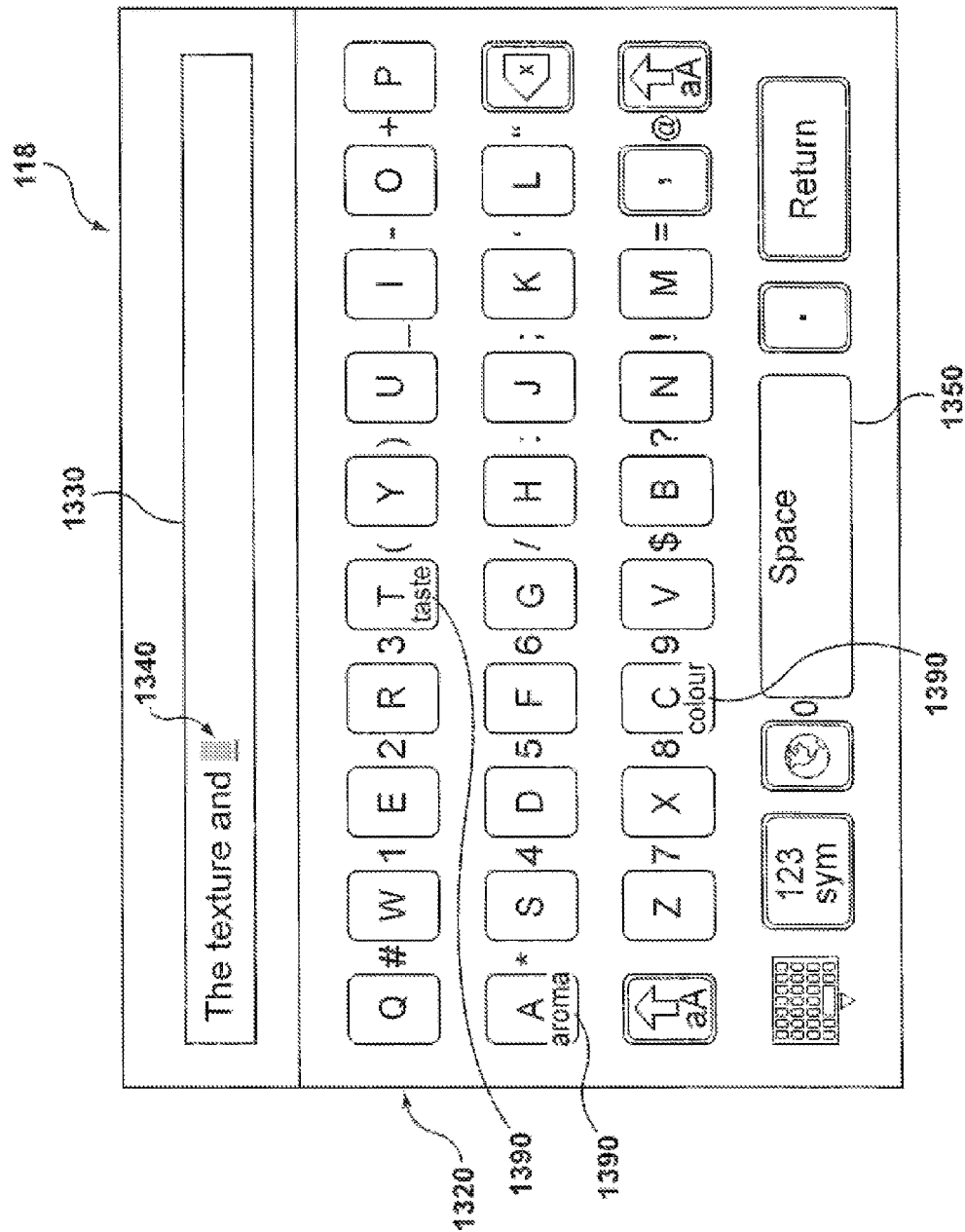
FIGS. 13A and 13B show example front views of a touchscreen, consistent with embodiments disclosed herein.
Figure 13B:
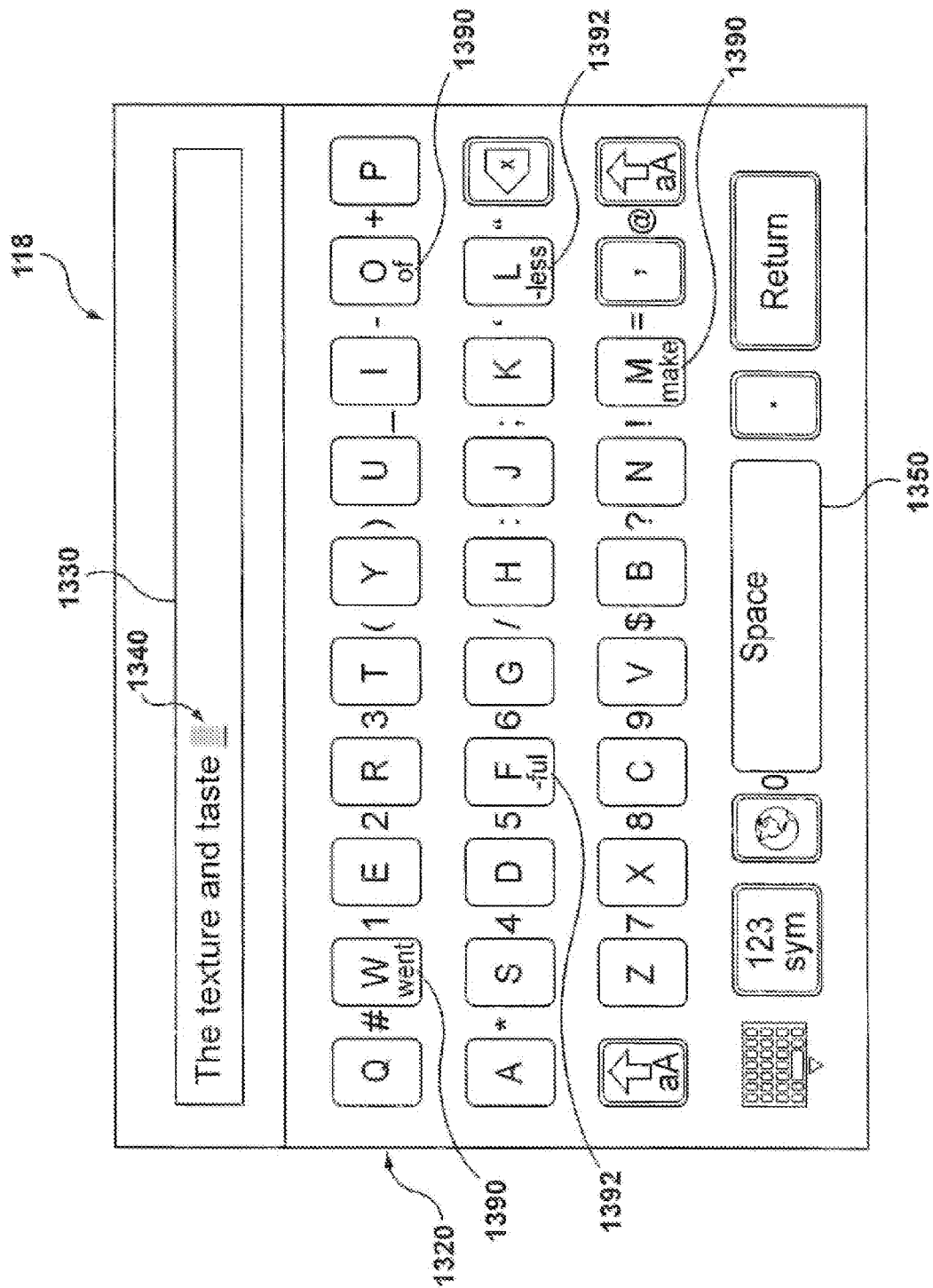

FIG. 13A shows an example where touchscreen 118 displays "The texture and" in a text bar 1330 and several predicted set of characters (for example, words 1390) are displayed at subsequent candidate input characters. FIG. 13B shows an example where touchscreen 118 received the set of characters "taste" as input after the user had selected the predicted set of characters "taste." In this example, a <SPACE> character was inserted after "taste." Consequently, predicted set of characters (such as, words 1390 and affixes 1392) are displayed at subsequent candidate input characters.

Figure 14A:
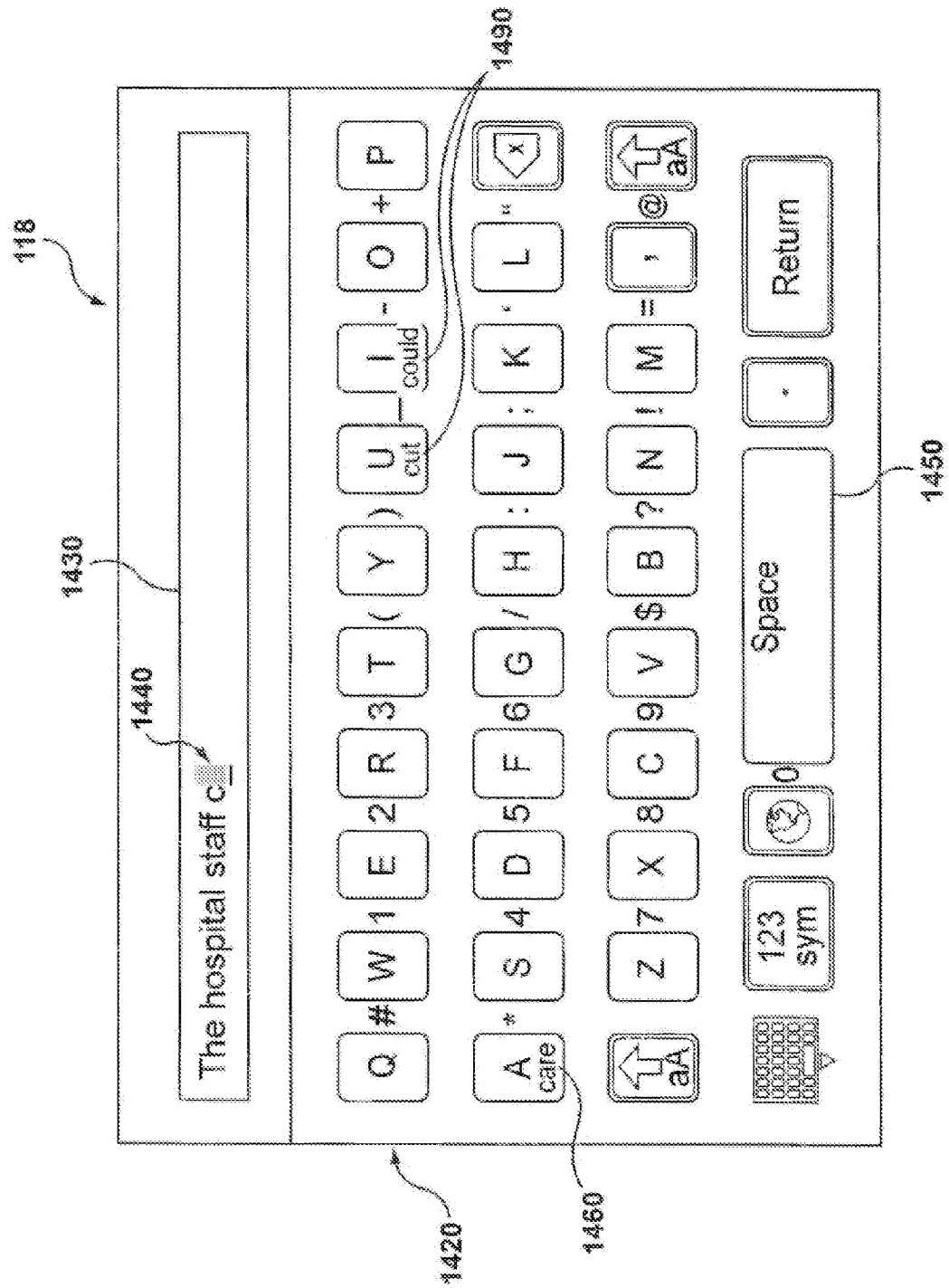
FIGS. 14A, 14B, and 14C show example front views of a touchscreen, consistent with embodiments disclosed herein.
Figure 14B:
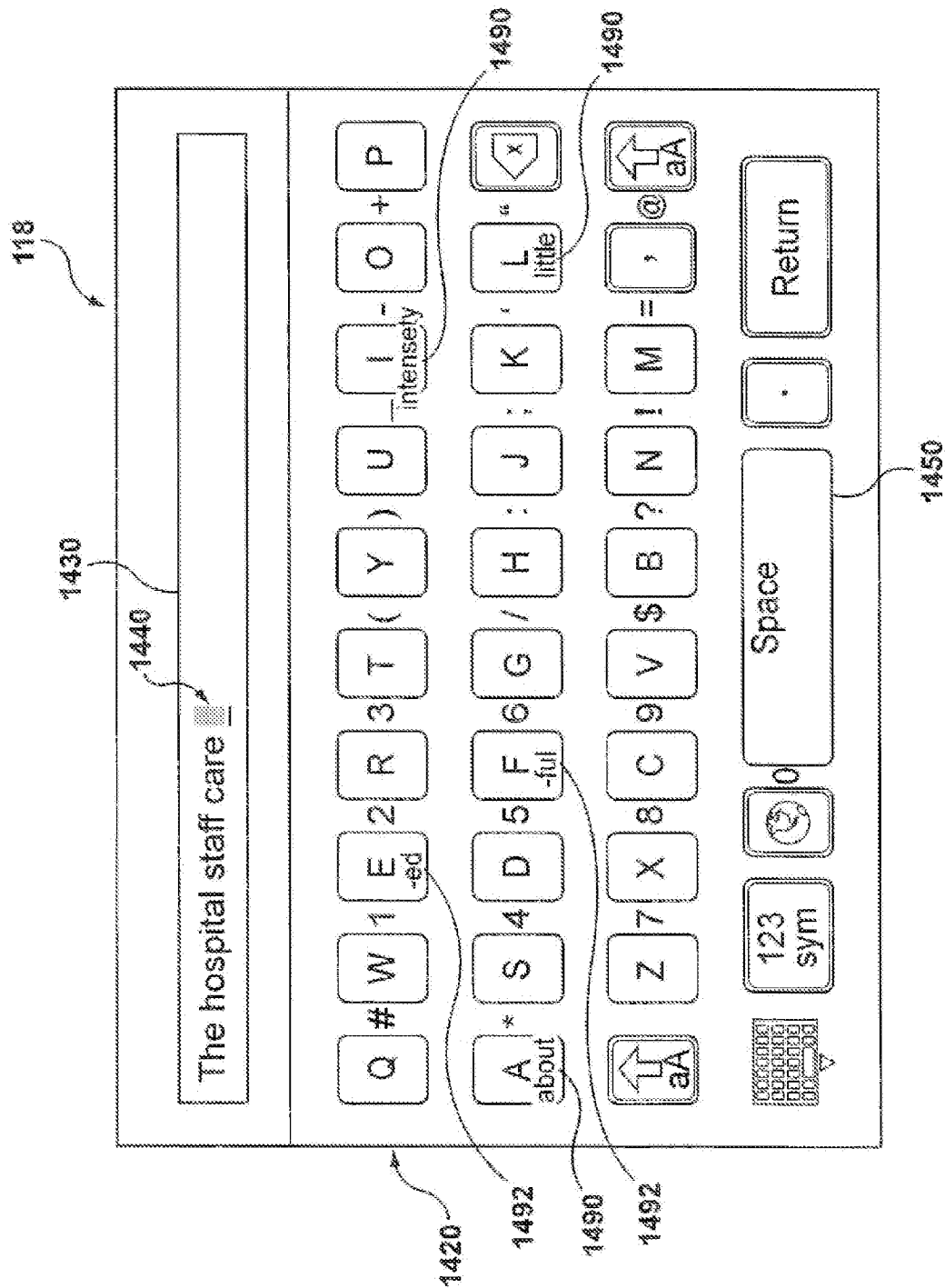
Figure 14C:
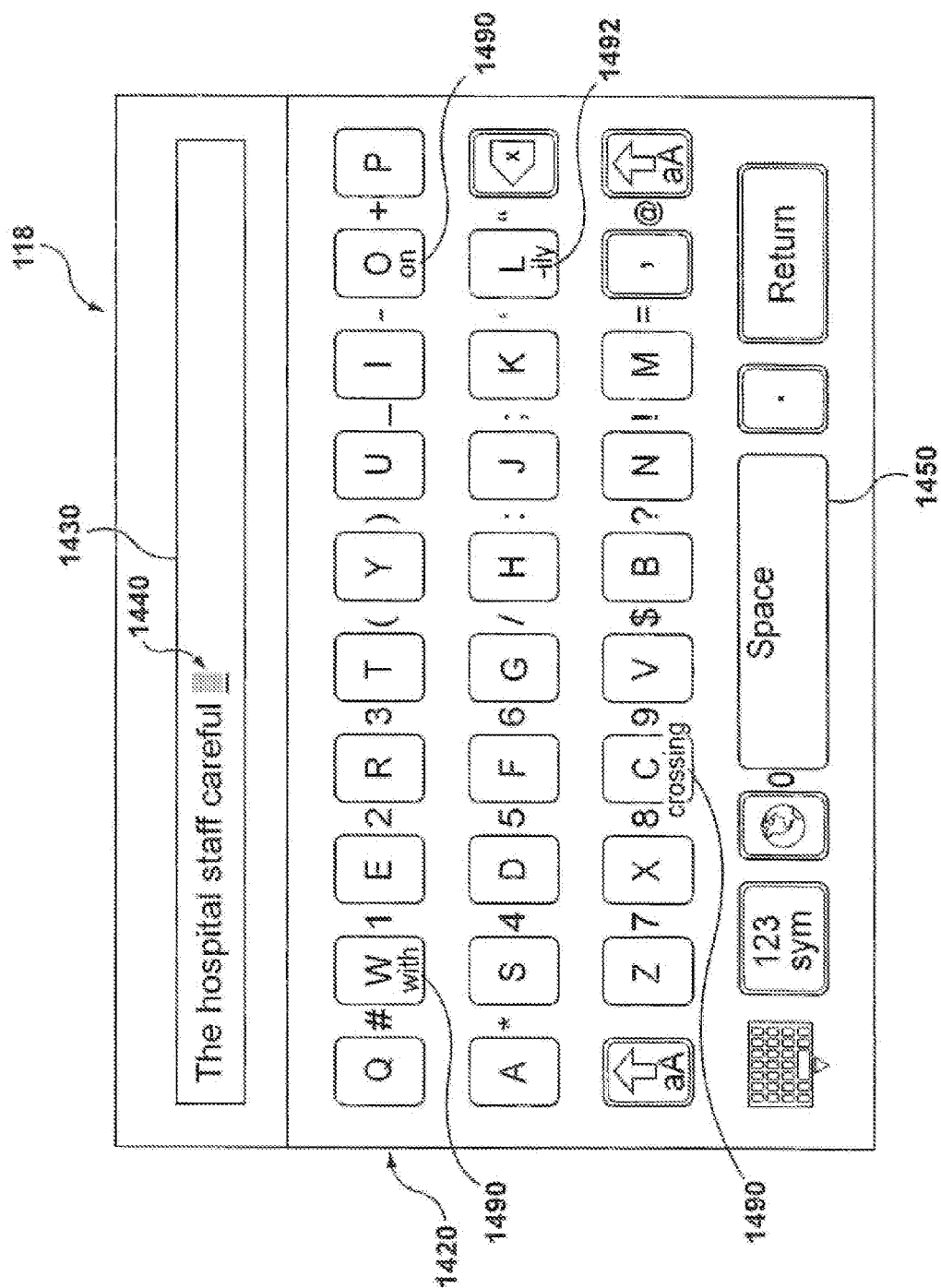

FIG. 14A shows an example where touchscreen 118 displays "The hospital staff c" in a text bar 1430 and several generated set of characters 1460 are displayed at subsequent candidate input characters. FIG. 14B shows an example where touchscreen 118 received the set of characters "care" as input after the user had chosen the generated set of characters "care." Generated set of characters "care" is now placed in input field 1430 along with a <SPACE> and predicted set of characters (such as, words 1490 and affixes 1492) are displayed at subsequent candidate input characters. FIG. 14C shows an example where touchscreen 118 received the affix "-ful" as input (thereby modifying the set of characters "care" to "careful") after the user had chosen the predicted affix "-ful." Thus, the set of characters "careful" is now inserted into input field 1430. Note, in some embodiments, inputting a word or affix can modify the input word or word fragment. For example, if "spicy" was input by a user, and "ness" is a predicted affix and is inputted, "spicy" would change to "spiciness," dropping the "y" and adding "iness". In other embodiments, "happy" could change to "happiness" or "conceive" could change to "conceivable".

Figure 15:
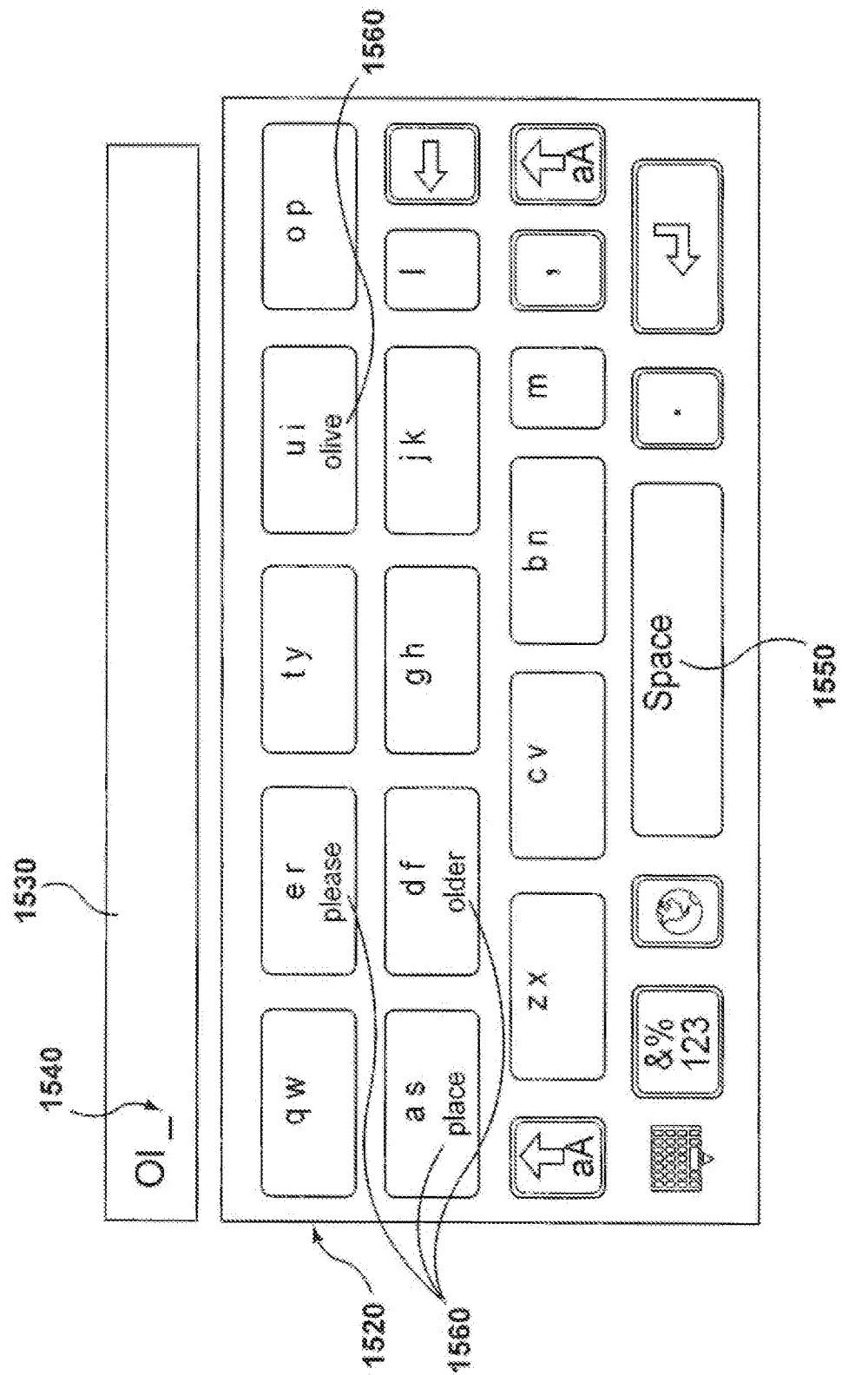
FIG. 15 shows an example front view of a touchscreen, consistent with embodiments disclosed herein.

FIG. 15 shows an example of an ambiguous keyboard 1520, which can have multiple characters assigned to a key (for example, such as a telephone keypad where "A", "B" and "C" are assigned to key 2; "D", "E" and "F" are assigned to key 3, and so on). For example, the characters "Q" and "W" can be assigned one key, and the characters "E" and "R" assigned to another key. In this example, the user has input the characters "Ol" by pressing the "op" key followed by the "L" key. Using a predictor, generated set of characters 1560 are displayed at subsequent candidate input characters. Since the first pressed key can input either an "O" or a "P" and the second pressed key inputs an "L", generated set of characters 1560 will begin with "OL" or "PL", such as shown by generated set of characters 1560 in FIG. 15.

Figure 16:
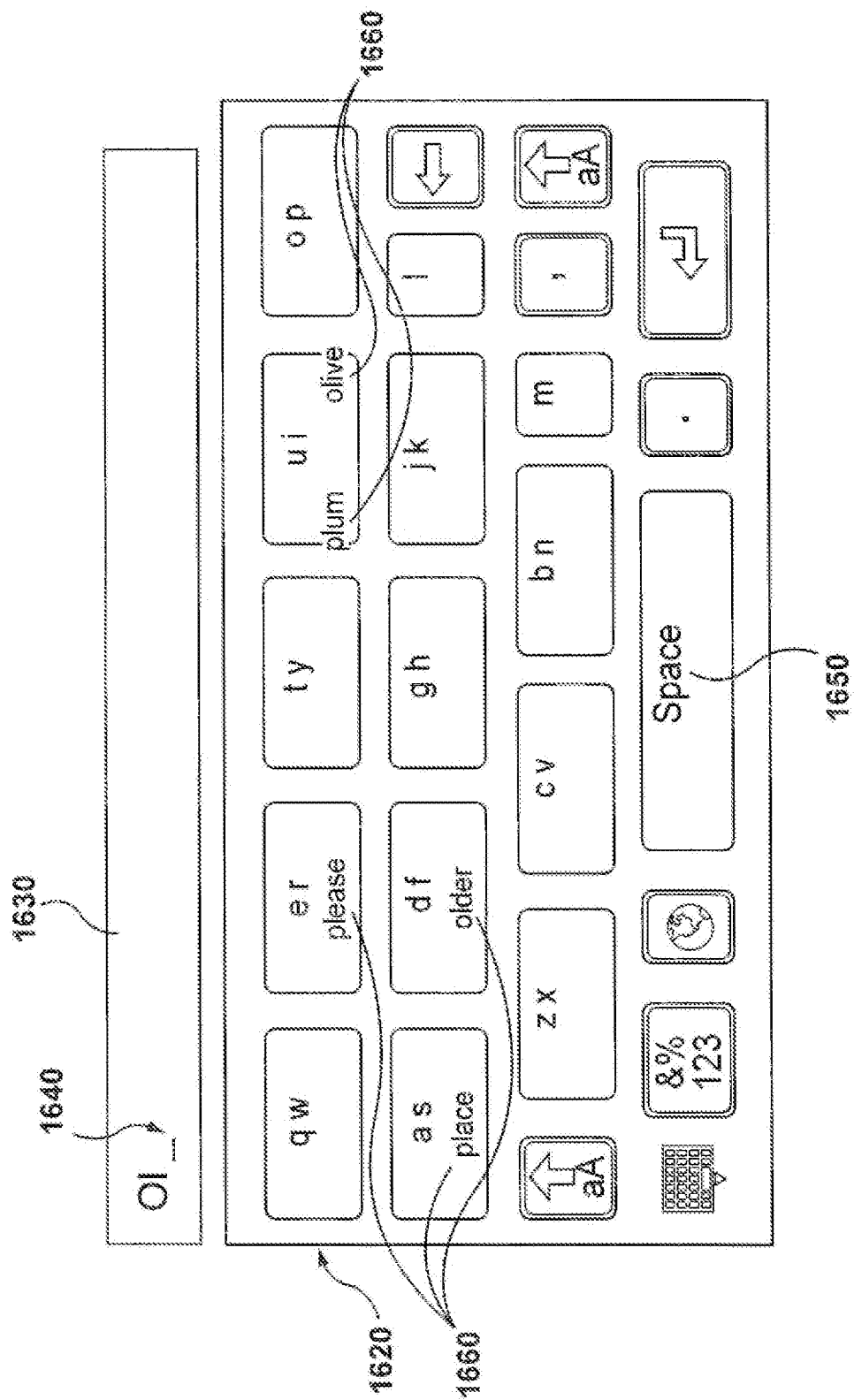
FIG. 16 shows an example front view of a touchscreen, consistent with embodiments disclosed herein.

FIG. 16 shows another example of an ambiguous keyboard 1620. In this example, generated sets of characters "plum" and "olive" 1660 are displayed near the "ui" key. The sets of characters could also have been displayed at or on the "ui" key. Here, both sets of characters correspond to a particular input corresponding to a key, namely the third letter of plum is a "u" and the third letter of olive is an "i." Touchscreen 118 (via main processor 102) can differentiate between the input of either set of characters based on the user's action. For example, the user can swipe at or near the right of the "ui" key to input "olive", or swipe at or near the left of the "ui" key to input "plum".

Figure 17:
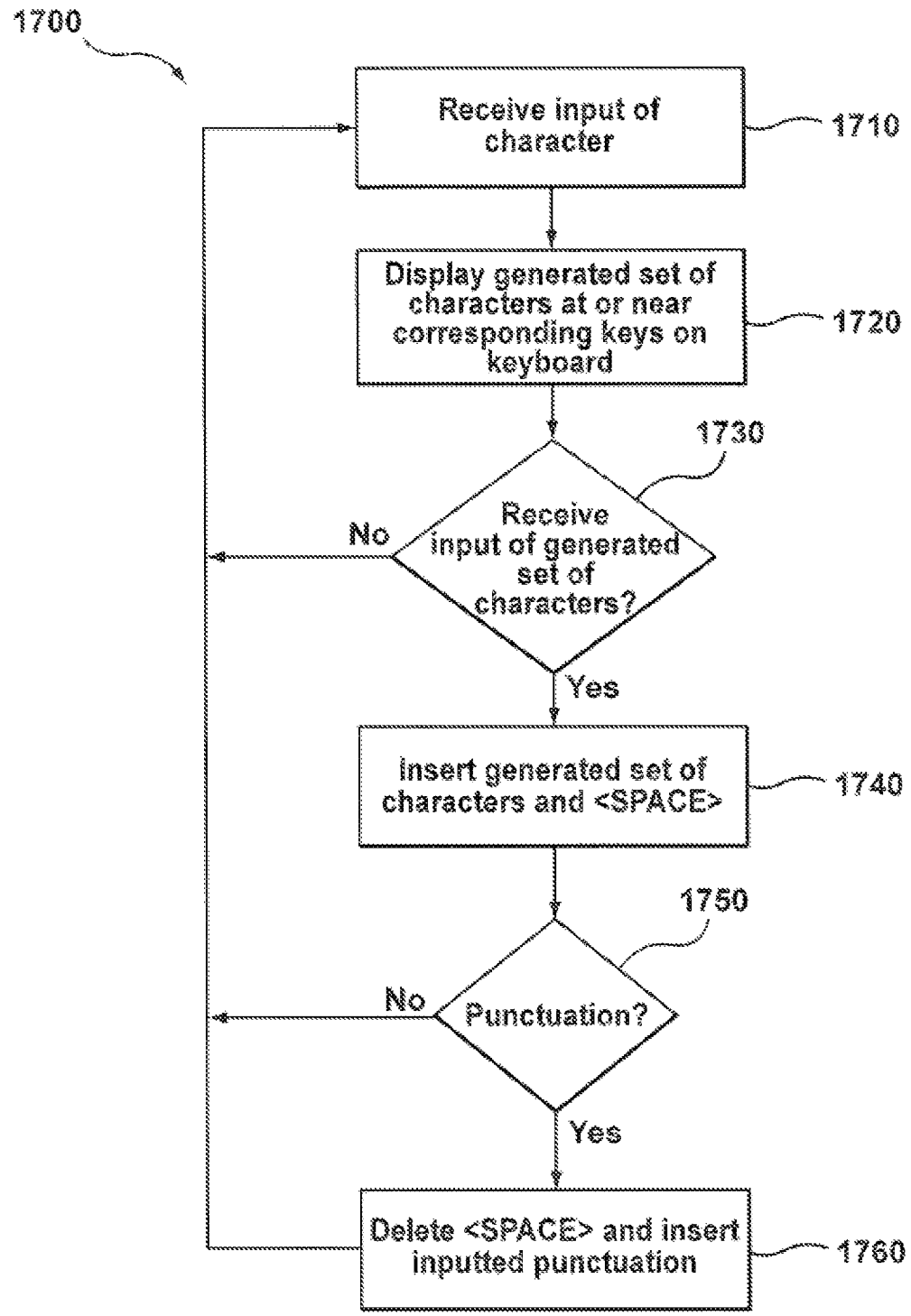
FIG. 17 is a flowchart illustrating an example method, consistent with embodiments disclosed herein.
Figure 18:
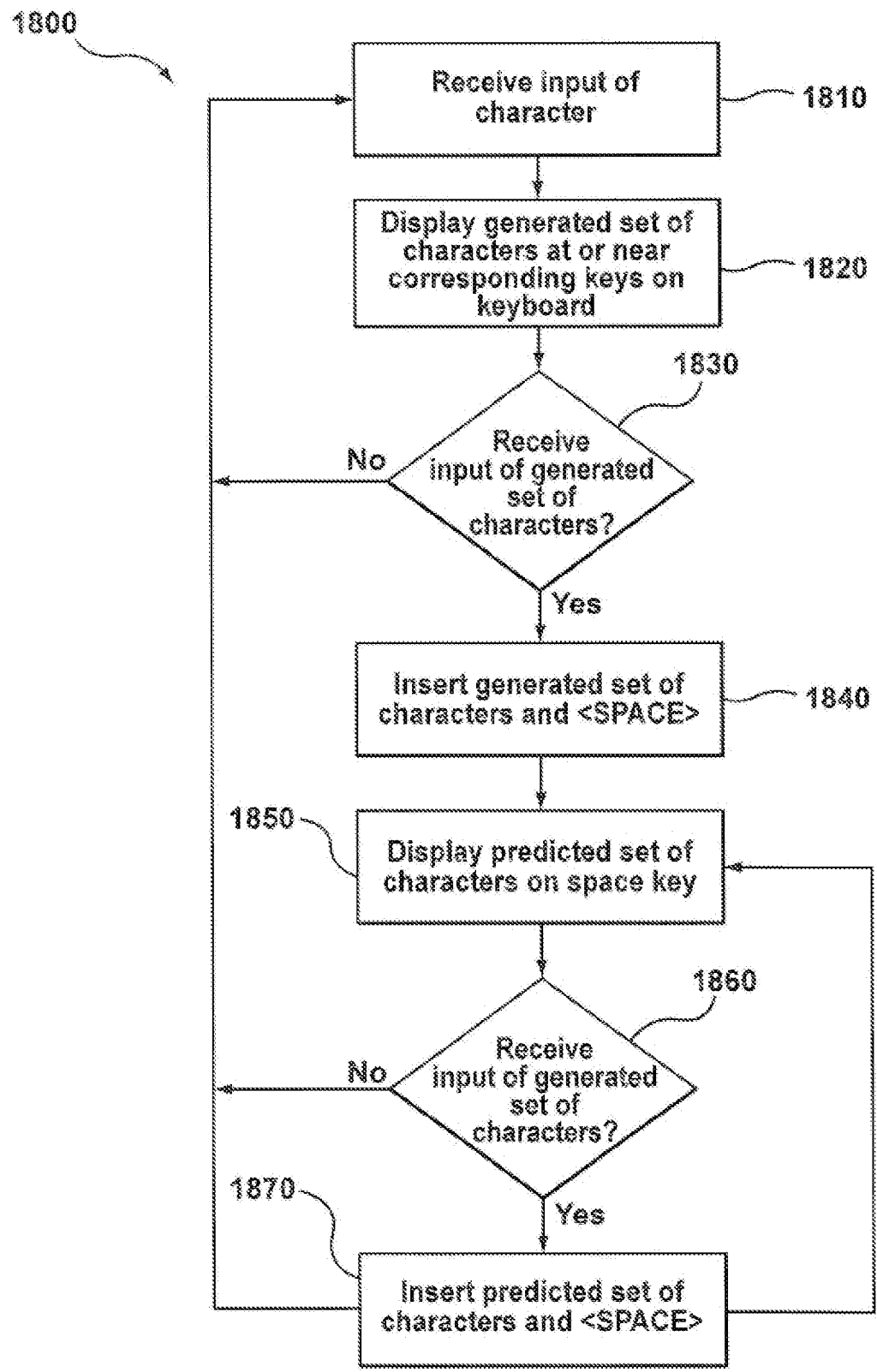
FIG. 18 is a flowchart illustrating an example method, consistent with embodiments disclosed herein.
Figure 19:
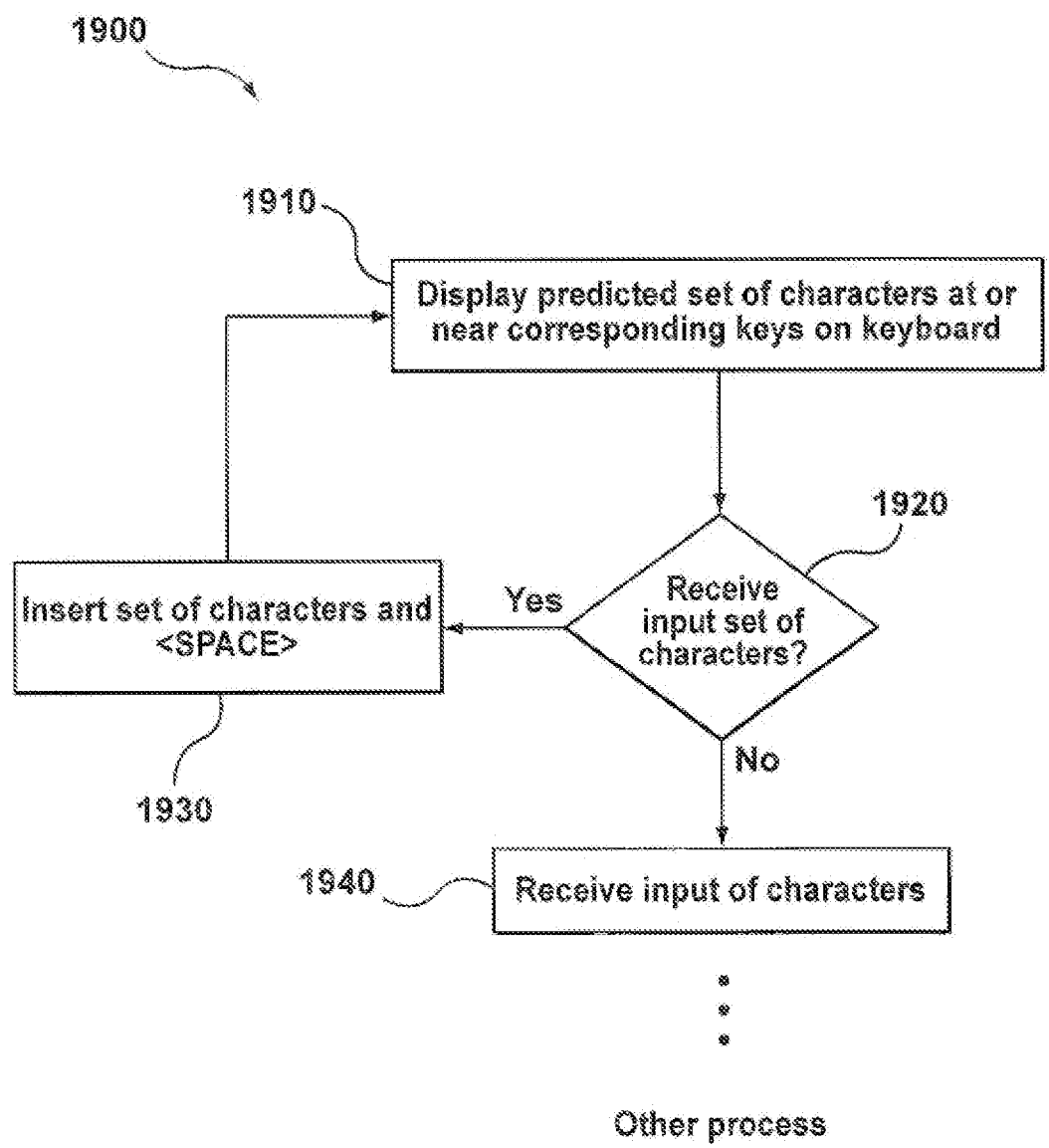
FIG. 19 is a flowchart illustrating an example method, consistent with embodiments disclosed herein.

The examples and embodiments illustrated in FIGS. 17, 18, and 19 can be implemented with any set of characters such as words, phrases, acronyms, names, slang, colloquialisms, abbreviations, or any combination thereof.

FIG. 17 shows in flowchart form a method 1700 in accordance with some embodiments. Method 1700 can be implemented with a processor, such as main processor 102, and stored on a tangible computer readable medium, such as hard drives, CDs, DVDs, flash memory, and the like. At block 1710, the processor receives an input of a character. At block 1720, the processor displays a generated set of characters at or near keys of subsequent candidate input characters on the touchscreen, such as described above.

At block 1730, the processor receives an input of the generated set of characters chosen by a user. If the user does not choose a generated set of characters displayed at or near keys of subsequent candidate input characters, the method restarts at block 1710, where the touchscreen can receive an input of another character. If a generated set of characters is received as input, at block 1740 the generated set of characters and a <SPACE> character is inserted in an input field (for example, input field 330 of FIGS. 3-9). As mentioned previously, the user can choose the generated set of characters, for example, by swiping at or near it or by long pressing a key corresponding to the subsequent candidate input character.

Continuing at block 1750, if the processor detects that punctuation is not to be inserted, the method restarts at block 1710. If punctuation is to be inserted, the method continues to block 1760 where the <SPACE> character is deleted and the appropriate punctuation is added to the input field. After block 1760, the method starts over at block 1710.

FIG. 18 is a flowchart illustrating example method 1800 in accordance with some embodiments. Method 1800 can be implemented with a processor, such as main processor 102, and stored on a tangible computer readable medium, such as hard drives, CDs, DVDs, flash memory, and the like. At block 1810, the processor receives an input of a character.

At block 1820, the processor displays a generated set of characters at or near a location on the keyboard corresponding to a subsequent candidate input character on a touchscreen. At block 1830, the processor receives an input of a generated set of characters chosen by a user. If the user does not choose a generated set of characters displayed at or near keys of subsequent candidate input characters, the method restarts at block 1810, where the processor can receive an input of another character. If a generated set of characters is received as input, at block 1840 the generated set of characters and a <SPACE> character is inserted in an input field (for example, input field 330 of FIGS. 3-9). As mentioned previously, the user can choose the generated set of characters, for example, by swiping at or near it or by pressing a key corresponding to the subsequent candidate input character for a predetermined period of time.

At block 1850, a predicted set of characters, different from the generated set(s) of characters, is displayed on a space key of the keyboard after the input of the generated set of characters in block 1830. The predicted set of characters displayed in block 1850 is determined by using a predictor. In some embodiments, the one or more predicted sets of characters can be placed on one or more keys other than the space key.

At block 1860, the processor can determine whether it has received an input of the predicted set of characters based on a user input. If the touchscreen has not received an input of the predicted set of characters because the user has not chosen the predicted set of characters, the method restarts at block 1810. If the processor has received the input of the predicted set of characters, the method continues to block 1870, where the chosen predicted set of characters and a <SPACE> character is inserted in the input field. From here, method 1800 can return to either block 1810 or block 1850.

Even though method 1800 does not display the punctuation illustration as shown in method 1700, the punctuation illustration, as shown in blocks 1750 and 1760, can likewise be applied to method 1800.

FIG. 19 is a flowchart illustrating an example method 1900 in accordance with some embodiments. At box 1910, predicted set of characters is displayed at corresponding subsequent candidate input characters. In these embodiments, an input has not been received or a delimiter has been activated, such as inputting a <SPACE>. Here, one or more predicted set of characters (such as, words, affixes, or a combination thereof) are placed on subsequent candidate input characters that correspond to the first letter of the generated set of characters. Moving to box 1920, it is determined whether the touchscreen receives an input of the set of characters (such as, word or affix) based on a user's selection. If an input is received, the method moves to block 1930 where the predicted set of characters and a <SPACE> character are inserted into an input field. Then the method starts over at block 1910. If the touchscreen does not receive an input of the set of characters, the touchscreen is available to receive an input of a character (as described by block 1710 of FIG. 17 or block 1810 of FIG. 18) and proceed through methods (such as methods 1700 of FIG. 17 or 1800 of FIG. 18 or even method 1900 of FIG. 19).

Figure 20:
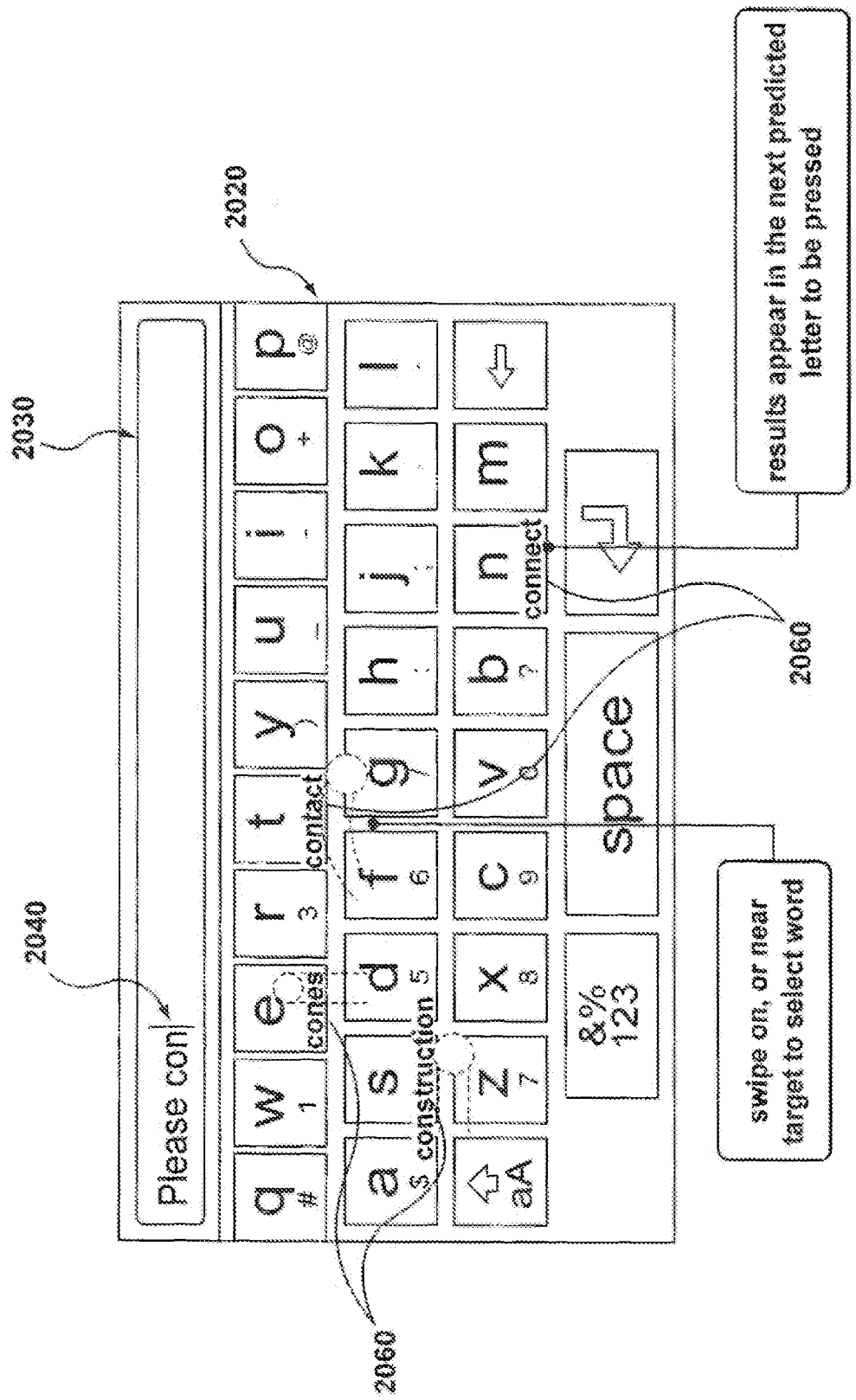
FIG. 20 shows an example front view of a virtual keyboard for display on a touchscreen, consistent with embodiments disclosed herein.

FIG. 20 shows another example of a virtual keyboard 2020 having an input field 2030. The set of characters "Please con" are received as input by the touchscreen and displayed in the input field 2030 followed by a cursor 2040, which can be a vertical line (as shown) or any other shape, such as an underscore as mentioned previously. A predictor determines one or more generated set of characters 2060 based in part on the received input for the current position of cursor 2040 within the current word, which is in the fourth character position of the current word, as shown in input field 2030. The current word is the word in which the cursor is currently located. In the shown example, generated set of characters 2060 "cones", "contact", "construction" and "connect" are displayed. Each generated set of characters 2060 is displayed at a key corresponding to a subsequent candidate input character (for example, under the E, T, S and N keys of the virtual keyboard 2020, respectively), for the current position of cursor 2040, which is in the third character position, as shown in input field 2030.

In the shown example, each generated set of characters 2060 is displayed at or near keys on the virtual keyboard 2020 associated with the subsequent candidate input characters. The display of a generated set of characters 2060 at or near a key corresponding to a subsequent candidate input character depends, for instance, on the size of the generated set of characters 2060 and the size of generated set of characters associated with nearby keys of other subsequent candidate input characters. When the generated set of characters associated with nearby keys in the same row of keys in the virtual keyboard 2020 are too large to be displayed at the same time without overlapping with each other or without a predetermined distance between the generated sets of characters, the processor 102 limits the generated set of characters which are displayed. The processor 102 may limit the generated set of characters which are displayed using one or any combination of the rank of each generated set of characters, the size of each generated set of characters, and a distance between each generated set of characters which are displayed so that a predetermined distance between the generated set of characters is maintained. This may result in the display of one or more generated sets of characters which are larger than the associated key in the virtual keyboard 2020.

In some examples, if two generated sets of characters are both ranked high, and these sets of characters would otherwise be displayed at nearby keys but cannot be displayed and still maintain a predetermined distance between the generated sets of characters at the display text size, the electronic device could be configured to display only the highest ranked generated set of characters. This results in the display of the most likely generated set of characters. In other examples, only the longest of the generated set of characters is displayed. This may be beneficial in that allowing faster entry of longer words saves time and processing cycles, thereby leveraging the predictive text input solution. In yet other examples, only the shortest generated set of characters is displayed. This may be beneficial in that shorter words can be more common, at least for some users, thereby allowing faster entry of words which saves time and processing cycles, thereby leveraging the predictive text input solution.

In some examples, the processor 102 may only limit the generated set of characters which are displayed in neighboring/adjacent keys in the same row of keys in the virtual keyboard 2020. In some examples, the processor 102 may limit the generated set of characters which are displayed in neighboring/adjacent keys in the same row of keys in the virtual keyboard 2020 so that a generated set of characters is never displayed in neighboring/adjacent keys irrespective of the size of the generated set of characters or distance between each generated set of characters. In such examples, the processor 102 uses the rank to determine which generated set of characters are displayed.

In other examples, the processor 102 can limit the generated set of characters which are displayed when the generated set of characters associated with nearby keys in different rows of keys in the virtual keyboard 2020 are too large to be displayed at the same time without overlapping with each other or without a predetermined distance between the generated sets of characters. In other examples, the processor 102 can limit the generated set of characters which are displayed when the generated set of characters associated with nearby keys in the same or different columns of keys in the virtual keyboard 2020 are too large to be displayed at the same time without overlapping with each other or without a predetermined distance between the generated sets of characters As mentioned previously, a user can use a finger or stylus to swipe a generated set of characters to input that generated set of characters. An individual letter, in contrast, can be input by tapping a respective key in the virtual keyboard 2020 using a finger or stylus. The touchscreen differentiates between tap and swipe events using movement and duration of touch events, the details of which are known in the art and need not be described herein. Each key in the virtual keyboard 2020 and each generated set of characters 2060 which is displayed has an associated target area on the touchscreen. The target area associated with each generated set of characters can be larger than and/or overlap with the target area of the key corresponding to the subsequent candidate input character with which it is associated and possibly nearby keys, such as neighboring keys in the same row. A user need only swipe on or nearby a displayed generated set of characters to input the generated set of characters. This permits faster input of a generated set of characters by creating larger and more accessible target areas, thereby saving time and processing cycles. In some examples, a generated set of characters can be input by detecting a swipe in any direction at or near the displayed generated set of characters. In other examples, a generated set of characters can only be input by detecting a swipe in a particular direction at or near the displayed generated set of characters. The particular direction may be associated with a direction in which the particular direction displayed generated set of characters (e.g., left or right in the shown example). In some examples, the swipe is at or near the displayed generated set of characters when the swipe has an initial contact point within the target area associated with the displayed generated set of characters (which may be the same or larger than the displayed generated set of characters).

Figure 21:
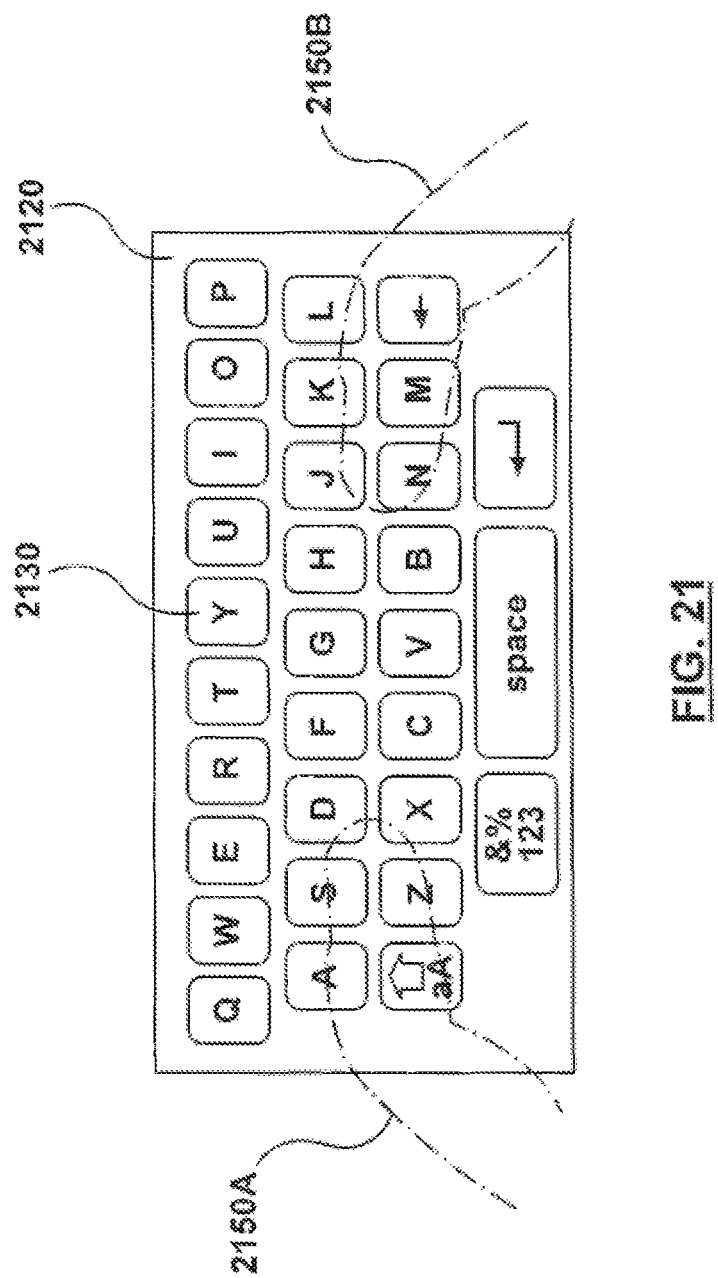
FIG. 21 shows an example front view of a virtual keyboard for display on a touchscreen, consistent with embodiments disclosed herein.

When inputting characters, users may hold the device in both hands using only their thumbs to activate the keys on the virtual keyboard. Two-thumb typing is common in landscape screen orientations but may also be used in portrait screen orientations (typically only when the size of the touchscreen 118 is sufficiently large). Referring to FIG. 21, an example virtual keyboard 2120 having a number of keys 2130 is shown along with a user's thumbs 2150A and 2150B, respectively.

As illustrated in FIG. 21, a user's thumbs 2150A and 2150B may obscure large portions of the virtual keyboard 2120 from the user's eyes. In some instances, this may make it difficult for the user to discern whether he/she has activated the desired key. In some electronic devices, the activated key will flash or a visual cue such as a tooltip may be displayed above the activated key to inform the user of which key has been activated. As appreciated by persons skilled in the art, a tooltip is a user interface element provided by the GUI which provides a hint associated with another user interface element. The hint provides a visual cue directing the user's attention to the other user interface element. Tooltips used in conventional virtual keyboards are displayed above the activated key in the virtual keyboard. The tooltip typically hovers above the activated key for a short duration, typically while the contact with the activated key on the touchscreen 118 is maintained (e.g., the tooltip disappears/is removed when the user lifts his/her finger. In one example as seen in FIG. 21, if the user is activating the "N" key with the right thumb 2150B, the user's thumb may obscure the flash of the "N" key or the display of a tooltip above the "N" key. Accordingly, conventional tooltips are limited in the extent to which the notification function of the tooltips is effective.

Figure 22:
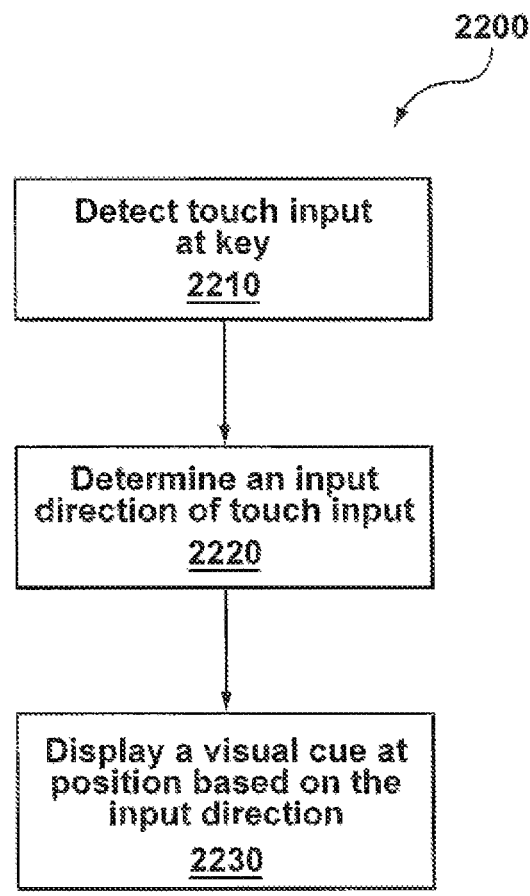
FIG. 22 is a flowchart illustrating an example method, consistent with embodiments disclosed herein.

FIG. 22 shows in flowchart form a method 2200 in accordance with some example embodiments. The example method 2200 and any methods described herein can be implemented with a processor, such as main processor 102, and stored on a tangible computer readable medium, such as hard drives, CDs, DVDs, flash memory, and the like.

At block 2210, the device detects a touch input at a key 2130 of the virtual keyboard 2120. In some examples, the touch input may be a tap or a prolonged touch on or around a key 2130 of the virtual keyboard 2120. In some examples, the touch input may be one of the contact points of a multi-touch input.

At block 2220, the device determines an input direction of the touch input. The input direction of the touch input is a direction from which the device determines a user has provided the touch input. For example, when a user is holding a device in the manner illustrated in FIG. 21, the user's left thumb 2150A will likely approach and provide a touch input from the left side of the virtual keyboard 2120. Accordingly, the determined input direction in such cases is left. Conversely, the user's right thumb 2150B will likely approach and provide a touch input from the right side of the virtual keyboard. Accordingly, the determined input direction in such cases is right.

As described above, in at least some examples, the input direction may be left or right of the virtual keyboard. In some examples, the input direction may be top or bottom of the virtual keyboard. Other input directions are also possible, such as a diagonal direction, which may be at any angle.

The input direction may be determined in accordance with the direction of a touch input, such as the direction in which a contact point moves after initially contacting the touchscreen 118, the shape of the contact area of the touch input, the proximity of the touch input to a respective edge of the touchscreen 118, or other suitable means, examples of which are provided below. The proximity of the touch input may be determined relative to a screen orientation of the GUI (e.g., input is closest to left, right, top or bottom of the virtual keyboard 2120). Alternatively, the proximity of the touch input may be determined relative to the touchscreen 118 (e.g., input is closest to left, right, top or bottom of the touchscreen 118).

At block 2230, a visual cue of the key at which the touch input was detected is displayed on the display. This visual cue is displayed at a position on the display based on the input direction of the touch input. In some examples, the visual cue is displayed proximate to the touched key and offset in a direction away from the input direction of the touch input.

In some examples, the input direction provides a proxy for determining which of the user's hands is being used, i.e. to which hand the finger causing the touch input belongs, so that the visual cue may be located accordingly. When the touch input is associated with the user's left hand, the visual cue is located to the right of the activated key (typically above and to the right of the activated key). When the touch input is associated with the user's right hand, the visual cue is located to the left of the activated key (typically above and to the left of the activated key).

Figure 23:
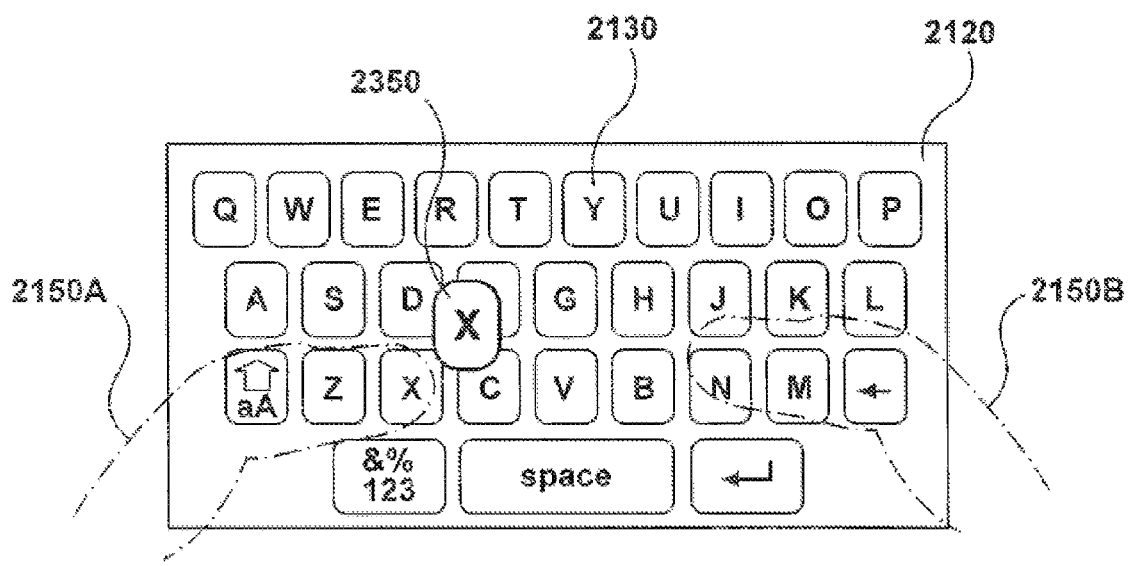
FIGS. 23 to 24 show example front views of a virtual keyboard for display on a touchscreen, consistent with embodiments disclosed herein.

FIG. 23 shows an example of a virtual keyboard 2120 on which a user provides a touch input on the "X" key with the user's left thumb 2150A. The device determines that the input direction of the touch input is from the left side of the device. The device displays a visual cue in the form of a character icon 2350 showing that the "X" key has been touched. Based on the left input direction of the touch input, the device displays the "X" character icon 2350 proximate but offset to the right of the "X" key. In other words, in this example, the visual cue is offset in a direction away from the input direction. In some instances, by displaying the visual cue in this manner based on the input direction of the touch input, the chance of the visual cue being obscured by an input implement may be reduced, and in some instances, the visibility of the touch input feedback to the user may be improved.

Generally, a user's eyes are above the user's hands relative to the device. Therefore, in some examples including the example in FIG. 23, the visual cue is offset above and in a direction away from the input direction. In FIG. 23, the visual cue in the form of character icon 2350 is offset above and to the right of the touched "X" key. In some examples, additionally offsetting the visual cue in a direction above the touch input will reduce the chance of the visual cue being obscured, and in some examples may increase the visibility of the visual cue to the user. In some examples, discussed in more detail below, the visual cue (e.g., tooltip) may be selectable. For example, tapping the visual cue may cause an action associated with the visual cue, such as a character input, to be performed. In such examples, it is easier for a finger in the opposite hand to select the visual cue (e.g., tooltip) if the visual appears in the direction of the opposite hand. For example, in FIG. 23, if the character icon 2350 for the 'X' key was an actionable item, the directional bias would make it easier for the right hand thumb to tap the character icon 2350 to input the character "x" or perform a command associated with the "X" key.

Figure 24:
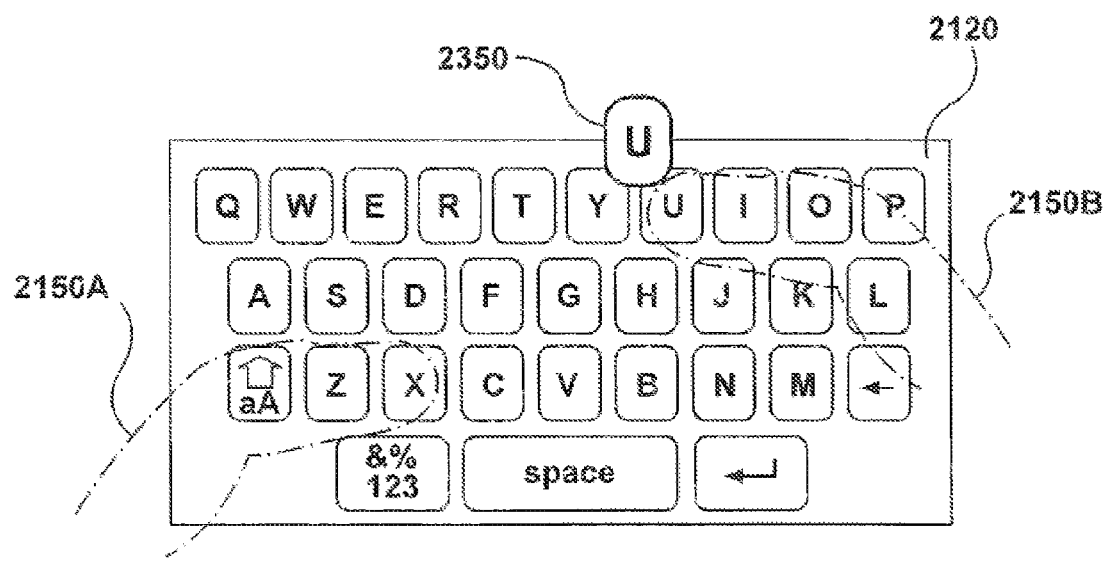

FIG. 24 shows another example of a virtual keyboard 2120 on which a user is providing a touch input on the "U" key with the user's right thumb 2150B. In this example, the device detects the touch input and determines that the input direction of the touch input is from the right. Based on this input direction, the device displays a visual cue in the form of a "U" character icon 2350 which is offset above and to the left of the touched "U" key.

In some examples, the visual cue is displayed for a short duration before disappearing again. In some examples, the visual cue is displayed for as long as the touch input is maintained at the key. For example, if a user presses and holds a key, the visual cue may remain displayed on the display until the user releases the key.

As mentioned above, in some examples, the input direction may be determined in accordance with the shape of the contact area of the touch input. As part of the determining the input direction in such examples, the device determines a shape of the contact area of the touch input. Each touch input is caused by a touch event detected by the touchscreen 118. The touch event is defined by a contact area caused by interaction of a user's finger or stylus with the touchscreen 118. The touchscreen 118, or the main processor 102, may determine a shape or profile of the contact area of the user's finger.

Figure 25:
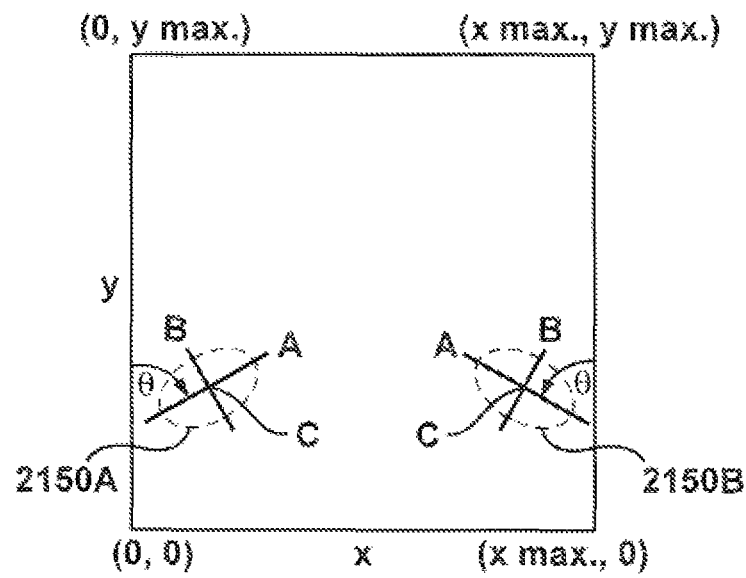
FIG. 25 illustrates a Cartesian dimensional coordinate system suitable for mapping locations of the touchscreen and determining a shape of the contact area of the user's finger in accordance with one embodiment of the present disclosure.

Referring now to FIG. 25, a Cartesian (two dimensional) coordinate system suitable for mapping locations of the touchscreen 118 and determining a shape of the contact area of the user's finger will be described. The touchscreen 118 defines a Cartesian coordinate system defined by x and y-axes in an input plane of the touchscreen 118. The x and y-axes of the Cartesian coordinate system are used to map locations of the touchscreen 118 and are aligned with the x and y-axes of the positional sensor; however in other embodiments these may be different. Each touch event on the touchscreen 118 returns a touch point defined in terms of an (x, y) value. The returned touch point is typically the centroid of the contact area. In the shown embodiment, the coordinate system has an origin (0, 0) which is located at a bottom-left corner of the touchscreen 118; however, it will be appreciated that the origin (0, 0) could be located elsewhere such as a top-left corner of the touchscreen 118.

The contact area caused by a user's finger roughly represents an ellipse. In at least some examples, the touchscreen 118, or the main processor 102, may determine an input direction based on the shape of the contact area of the user's finger by performing a mathematical analysis on the contact area. As part of calculating performed in the mathematical analysis, a center point (or centroid) of the contact area and two lines which symmetrically bisect the ellipse through the center point are determined. The longer of the bisectors represents a major axis (A) of the ellipse and the shorter of the bisectors represents a minor axis (B) of the ellipse. The angle (θ) of the major axis (A) relative to an edge of the display 112 or a screen orientation may be used to determine the direction of the touch input. The screen orientation of the content displayed on the display 112, which is a parameter of the GUI and known to the device, or a device orientation of the display 112 which is detected by the orientation sensor 197, may be used to determine the direction along the major axis (A). More details of an example method of calculating a shape of the contact area of the user's finger is found in U.S. Patent Publication No. 2007/0097096, which is incorporated herein by reference.

The centroid of the contact area is calculated based on raw location and magnitude data (e.g., capacitance data) obtained from the contact area. The centroid is typically defined in Cartesian coordinates by a value $(X_c, Y_c)$. The centroid of the contact area is the weighted averaged of the pixels in the contact area and represents the central coordinate of the contact area. By way of example, the centroid may be found using the following equations:

$$X_c = \frac{\sum_{i=1}^{n} Z_i * x_i}{\sum_{i=1}^{n} Z_i} \tag{1}$$

$$Y_c = \frac{\sum_{i=1}^{n} Z_i * y_i}{\sum_{i=1}^{n} Z_i} \tag{2}$$

where $X_c$ represents the x-coordinate of the centroid of the contact area, $Y_c$ represents the y-coordinate of the centroid of the contact area, x represents the x-coordinate of each pixel in the contact area, y represents the y-coordinate of each pixel in the contact area, Z represents the magnitude (e.g., capacitance value) at each pixel in the contact area, the index i represents the pixel (or electrode) in the contact area and n represents the number of pixels (or electrodes) in the contact area. Other methods of calculating the centroid will be understood to persons skilled in the art.

In other examples, the touchscreen 118, or the main processor 102, may determine an input direction based on the shape of the contact area of the user's finger by performing a comparative analysis on the contact area. As part of the comparative analysis, the detected contact area is compared to one or more touch profiles stored, for example, in the memory 110 on the device. In some examples, the touch profiles may include common shapes of touch inputs by a left thumb press or right thumb press. In some examples, profiles may also include common shapes for left or right finger touches. In some examples, these profiles may include common shapes of stylus touches when held by a left hand or when held by a right hand.

In some examples, the device determines the input direction of a touch input by determining whether the shape of the touch input corresponds to one of the touch profiles stored in memory. For example, if the device determines that a touch input shape corresponds to a touch profile for a left thumb press, the device may determine that the input direction of the touch input is from the left.

The shape of the touch input does not necessarily have to identically match a touch profile. In some examples, the device may determine the corresponding touch profile by selecting the touch profile which most closely resembles the shape of the touch input.

Figure 26:
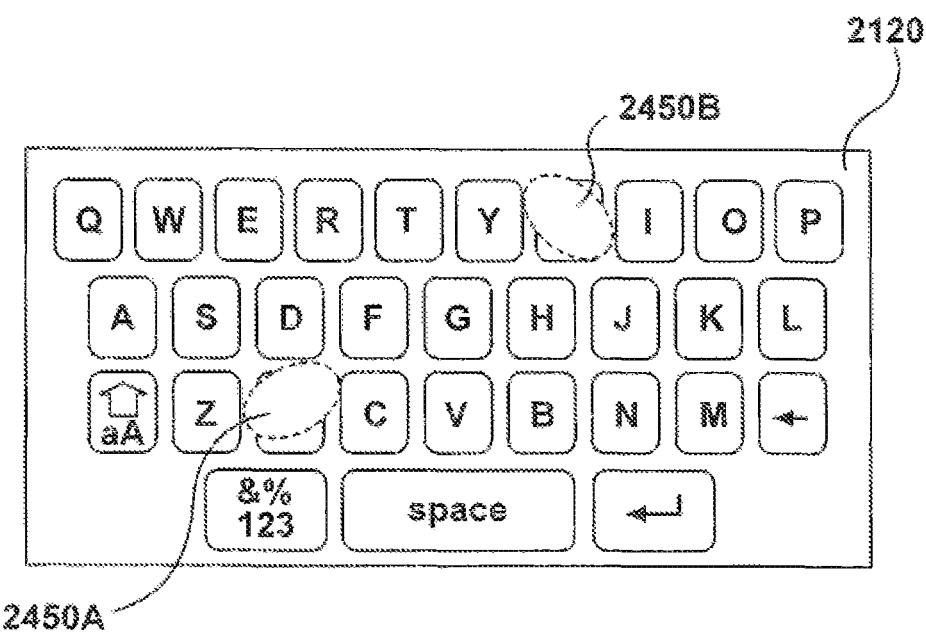
FIGS. 26 to 28 show example front views of a virtual keyboard for display on a touchscreen, consistent with embodiments disclosed herein.

FIG. 26 illustrates non-limiting example touch shapes of a left thumb touch 2450A and a right thumb touch 2450B. The touch shapes have been shown as ellipses for illustrative purposes; however, the shape of actual contact areas may vary. In other examples, the device may determine the input direction of the touch input based on which portion of the device the touch input was received. In some examples, if the touch input is detected on a left portion of the virtual keyboard, the device determines that the input direction of the touch input is from the left. Similarly, in some examples, if the touch input is detected on a right portion of the virtual keyboard, the device determines that the input direction of the touch input is from the right.

Figure 27:
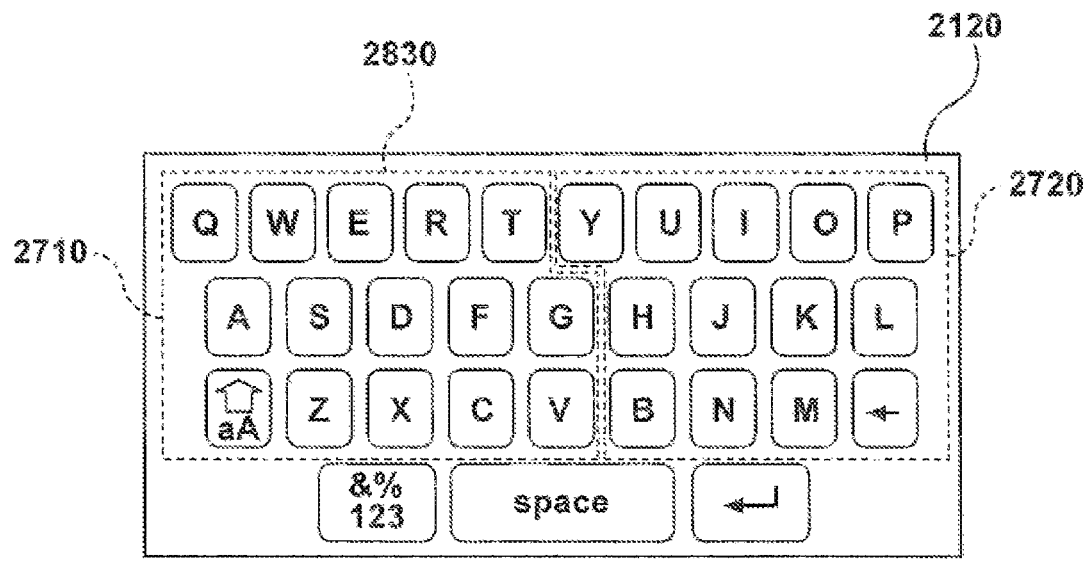

FIG. 27 shows an example virtual keyboard 2120 having a number of keys in a left portion 2710 and a number of keys in a right portion 2720. A different number of divisions of the keyboard may be used in other examples. In some examples, the keys may be assigned into upper and lower portions instead of or in addition to, the left portion 2710 and the right portion 2720.

Figure 28:
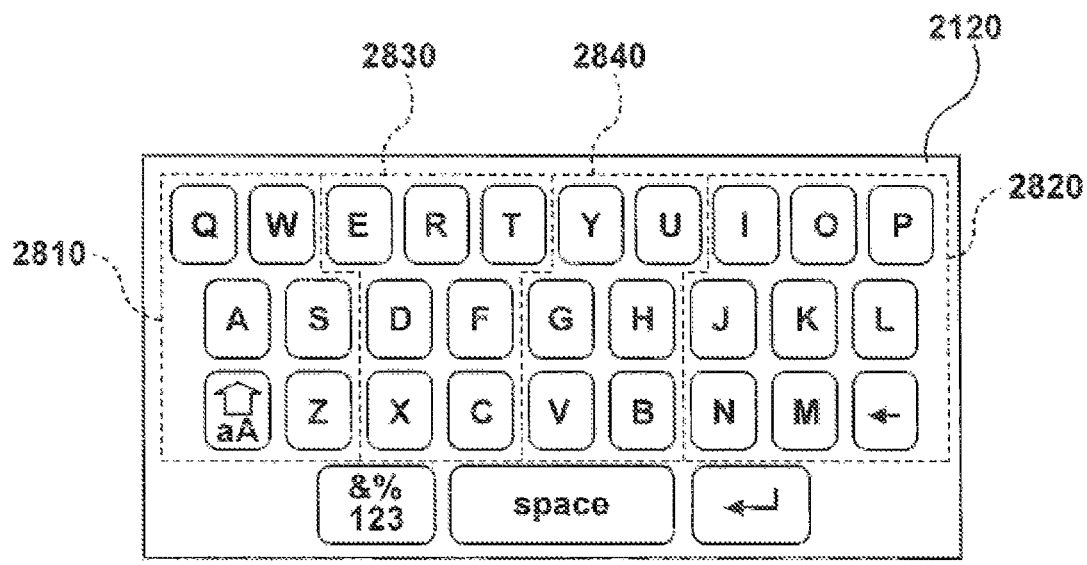

FIG. 28 shows an example virtual keyboard 2120 having keys in a left portion 2810, a right portion 2820, a mid-left portion 2830, and a mid-right portion 2840. In some examples, a touch input at a key in the left portion 2810 may cause the electronic device 100 to display a visual cue above and to the right of the touched key at an offset n degrees (e.g., 45 degrees) from the vertical, while a touch input at a key in the mid-left portion 2830 may cause the electronic device 100 to display a visual cue above and to the right of the touched key at an offset m degrees (e.g., 30 degrees) from the vertical, where n and m are different. Similarly, a touch input at a key in the right portion 2820 may cause the electronic device 100 to display a visual cue above and to the left of the touched key at an offset n degrees (e.g., 45 degrees) from the vertical, while a touch input at a key in the mid-right portion 2840 may cause the electronic device 100 to display a visual cue above and to the left of the touched key at an offset m degrees (e.g., 30 degrees) from the vertical, where n and are different. Accordingly, the offset distance and/or position between the touched key and the visual cue may vary based on which portion the activated key is located in. This solution allows the offset distance and/or position to more precisely adjust to the position of the user's finger.

In some examples, when a touch input is detected in a middle portion of the virtual keyboard such as mid-left 2830 and mid-right 2840 portions illustrated in FIG. 28, the electronic device 100 may display a visual cue offset such that it is directly above the touched key.

In some examples, when a touch input is detected in a middle portion of the virtual keyboard (such as mid-left 2830 and mid-right 2840 portions illustrated in FIG. 28, such as mid-left 2830 and mid-right 2840 portions illustrated in FIG. 28), the electronic device 100 may display a visual cue offset in a direction away from the next most probable letter based on letter or word predictions, as mentioned previously.

In some examples, the electronic device 100 may determine the input direction of the touch input, at least in part, by detecting proximity information on the one or more proximity sensor 198 or detecting ambient light information on the one or more ambient light sensors 199. The electronic device 100 detects proximity of an object at or near the display 112 at a time when the touch input was detected (using proximity information and/or ambient light information), and determines the input direction as left or right in accordance with a side of the display at which proximity of an object was detected. In some examples, a first proximity sensor 198 on a left side of the electronic device 100 and a second proximity sensor 198 on the right side of the electronic device 100 may detect the proximity of a user's hand approaching from the left or right side of the electronic device 100. In some examples, a single proximity sensor 198 at a central position on the electronic device 100 may be configured to detect objects in close proximity to either the left or the right sides of the electronic device 100. In some examples, the one or more proximity sensors 198 may also detect the proximity of an object close to the top or bottom of the electronic device 100. In any of these examples, the proximity of an object to a particular side of the electronic device 100 may correspond to a determination that a touch input is coming from that particular side of the electronic device 100.

Similar to the proximity sensor examples described above, the ambient light sensor 199 may detect proximity of an object at or near the display 112 in accordance with a lower intensity ambient light at a particular side of the electronic device 100. In some examples, the lower intensity ambient light may correspond to a shadow cast by an object approaching from that particular direction, and may therefore correspond to a determination that a touch input is coming from that direction.

In some examples, the electronic device 100 may determine the input direction of the touch input, at least in part, by detecting the orientation of the electronic device 100 using an orientation sensor 197 such as an accelerometer. In some examples, the electronic device 100 may determine that the electronic device 100 is lying on a flat surface such as a desk when the orientation sensor 197 detects that the electronic device 100 is horizontal with the face of the touchscreen 118 facing upwards. With this information, the electronic device 100 may determine that touch input corresponds to a finger other than the user's thumbs because it would be difficult for a user to use his/her thumbs when the device is lying on a flat surface. In such cases, any analysis of the shape of the contact area of the touch input may be restricted to fingers other than the thumbs, and may be restricted to index fingers, which are typically used for typing when using the electronic device 100. This allows, for example, shape analysis to be limited to a subset of data, such as fingers other than thumbs or merely index fingers.

In some examples, the orientation sensor 197 may detect that the electronic device 100 is partially upright with the top of the electronic device 100 facing upwards and slightly to the right. In this orientation, a user may be holding the device only in his/her right hand, and therefore, a user may likely be using his/her right hand to provide touch inputs. Accordingly, the device may use the detected orientation information to determine that a touch input is from the right side of the electronic device 100. Similarly, in some examples, the orientation sensor 197 may detect that electronic device 100 is in a position which may correspond to a user holding the electronic device 100 only in his/her left hand, and therefore, the electronic device 100 may use the detected orientation information to determine that a touch input is from the left side of the electronic device 100.

Other techniques may be used alone or in conjunction with other techniques to determine the finger input direction and/or where the visual cue (e.g., tooltip) should be located. For example, settings may be used. The electronic device 100 may allow users to specify which finger he or she uses for which key. This may be useful to adjust a mapping model which, for example, may have been learned by the electronic device 100 through other means. For example, the electronic device 100 may determine that a left-hand finger is being used when the character 'g' is typed and a right-biased visual cue (e.g. tooltip) appears whereas the user may want the tooltip direction to be biased to the left because the user uses the right-hand finger when the character 'g' is typed or for other reasons. A settings menu to modify the behaviour of the visual cues may be useful. Finger mapping may also be used. Finger mapping, i.e., which finger tapped which character key in a particular context, may be learned from an external camera-based system which analyses the virtual keyboard or other means.

While the foregoing description in connection with FIG. 21-28 has been focused on two-finger typing, the teachings of the present disclosure can also be applied to one-finger typing. One-finger typing (e.g., one-thumb typing) is typically performed when users hold the device in one hand and use only one finger (typically a thumb) to activate the keys on the virtual keyboard. One-thumb typing is common in portrait screen orientations but may also be used in landscape screen orientations (typically only when the size of the touchscreen 118 is sufficiently small).

The device may be able to detect one-finger typing, for example, by the shape of the touch inputs as described previously. The direction/angle of the major axis of the contact area of touch inputs can be used to identify the handedness of the user, or at least the hand with which the user is typing. The angle ($\Theta$) of the major axis (A) forms an acute angle relative to a vertical component (y-axis) of the GUI in a given screen orientation as shown in FIG. 25. The angle ($\Theta$) is positive relative to the vertical component when the user is typing with the left hand, whereas the angle ($\Theta$) is negative relative to the vertical component when the user is typing with the right hand. When a threshold amount of detected touch events are associated with one hand, one-finger typing is detected. The particular hand with which the touch events are associated is determined to be the typing hand. One-finger typing may be presumed when a portrait screen orientation is used. In such cases, only handedness needs to be determined. Alternatively, handedness may be a known parameter, for example, a parameter stored in the memory 110.

When left-handed typing is determined or detected, the visual cue is located to the right of the activated key (typically above and to the right of the activated key). When right-handed typing is determined or detected, the visual cue is located to the left of the activated key (typically above and to the left of the activated key).

Figure 29:
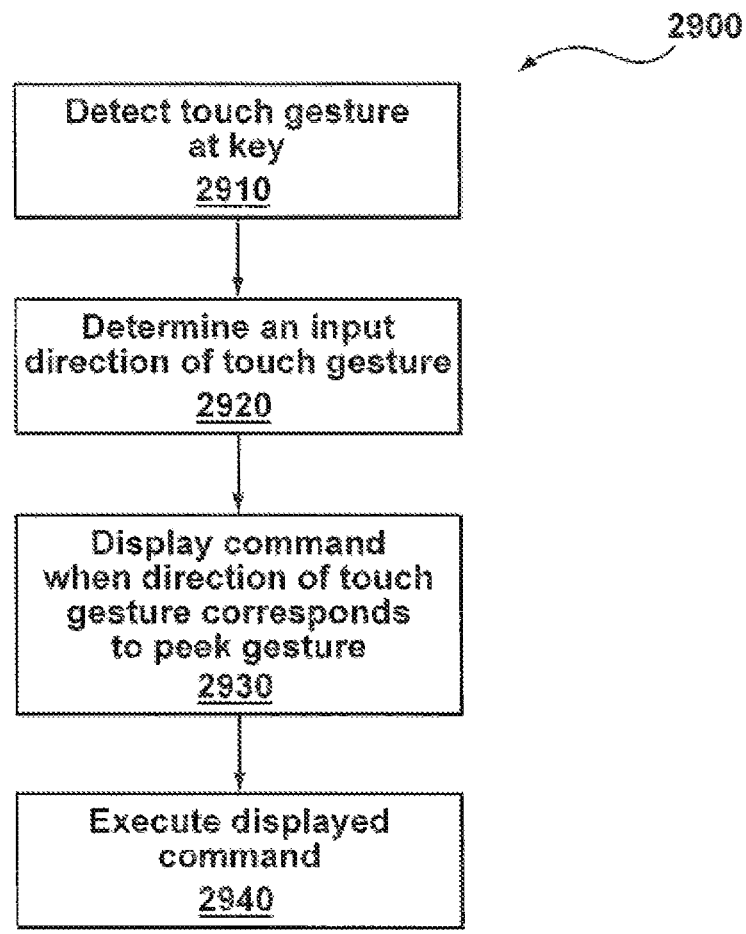
FIG. 29 is a flowchart illustrating an example method, consistent with embodiments disclosed herein.

FIG. 29 shows in flowchart form a method 2900 in accordance with some example embodiments. The example method 2900 described herein can be implemented with a processor, such as main processor 102, and stored on a tangible computer readable medium, such as hard drives, CDs, DVDs, flash memory, and the like. At block 2910, the device detects a touch input at a key 2130 of the virtual keyboard 2120 in the form of a touch gesture.

At block 2920, the device determines the input direction of the touch input. In some examples, the input direction of the touch input corresponds to the direction of the touch gesture in relation to an initial contact point of the touch input.

At block 2930, when the direction of the touch motion corresponds to a peek gesture, a visual cue of a command associated with the key at which the touch input was detected (i.e., the activated key) is displayed. In some examples, the visual cue is displayed proximate to the activated key. In some examples, the visual cue is displayed proximate to the activated key and offset in a direction away from the input direction of the touch input as described similar to visual cues described previously.

In some examples, the peek gesture is a small touch gesture having a travel distance which is greater than a first threshold distance but less than a second threshold distance. The use of a small touch gesture in a given direction may be used to differentiate from the touch input from a longer touch gesture in the same direction which is associated with another action. The touch gesture, in some examples, may be a downward gesture (such as a downward swipe). In other examples, the peek gesture may be a small upward gesture (e.g., upward swipe). In other examples, the peek gesture may be any direction, pattern or combination of touch gestures such as a circular gesture around the key, or an L-shaped gesture comprising a downward gesture (e.g., swipe) followed by a left-to-right downward gesture (e.g., swipe).

Alternatively, in another embodiment, at block 2930, when the direction of the touch motion corresponds to a peek gesture, a visual cue of an alternate character associated with the key at which the touch input was detected (i.e., the activated key) is displayed rather than a visual cue of a command associated with the key.

At block 2940, the command associated with the activated key is executed by the device in response to a trigger. Alternatively, in other examples the alternate character associated with the key may be input in response to the trigger. The trigger may be that contact with virtual keyboard 2120 is released at or near an end of the peek gesture. In contrast, the command associated with the activated key is not executed if the contact point is moved back towards its initial position before being released, or is otherwise within a threshold distance of the initial position when contact with virtual keyboard 2120 is released. In other examples, the trigger is continuing the peek gesture until a second threshold distance has been travelled by the touch input. In yet other examples, the trigger is determining a duration of the touch input exceeds a threshold duration (also known as a touch-and-hold or press-and-hold). Typically, the touch-and-hold or press-and-hold is performed at or near an end of the peek gesture.

Figure 30:
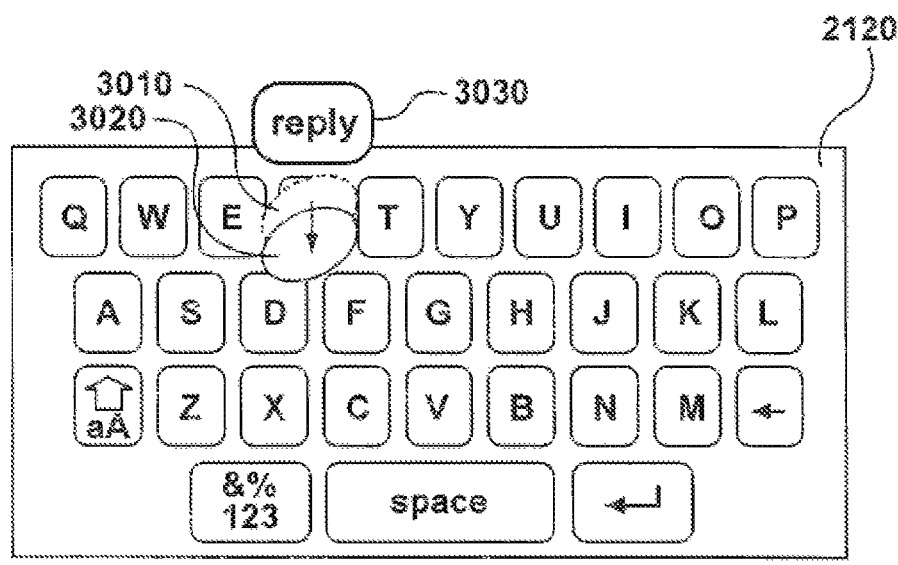
FIG. 30 shows an example front view of a virtual keyboard for display on a touchscreen, consistent with embodiments disclosed herein.

FIG. 30 shows an example of a virtual keyboard 2120 on which a user provides a touch gesture on the "R" key. Initially, the user touches the virtual keyboard 2120 at the initial contact point indicated by the reference 3010. While maintaining contact with the virtual keyboard 2120, the user moves the contact point downwards to the contact point indication by the reference 3020. In this example, the downward touch gesture corresponds to a peek gesture, and the device displays a visual cue in the form of a "reply" command icon 3030 which is associated with the "R" key. In the shown example, the command icon 3030 is displayed proximate to the associated key. In other examples in which predicted words are shown in a prediction bar, the command icon 3030 may be shown in the prediction bar.

As mentioned above, after the command icon 3030 is displayed, the command (e.g., reply command for replying a received communication such as an email) associated with the activated key is executed by the device in response to a trigger.

In the example shown in FIG. 30, the "R" key is associated with the "Reply" command. In the context of messaging, this command may reply to a sender of a currently selected or displayed email message. In some examples, different keys may be associated with different commands and in different contexts. In a messaging context, in some examples, the "R" key may be associated with the "Reply" command as noted above, the "L" key may be associated with the "Reply All" command to reply to all recipients of the currently selected or displayed email message, the "F" key may be associated the "Forward" command to forward the currently selected or displayed email message, the "S" key may be associated the "Send" command to send an open message under composition, the "N" key may be associated with a "Next Message" command to display a next message in a list (e.g., inbox or folder), a "P" key may be associated with a "Previous Message" command to display a previous message in a list (e.g., inbox or folder), or any combination thereof. Alternatively, the "Send" command for sending an electronic message may be associated with an "Enter" key in the virtual keyboard. In a text entry mode, which may be in a messaging context, the "Backspace" key may be associated with a "Delete" command for deleting an input character at the position of a cursor in an input field rather than the "Backspace" command for deleting an input character at a position before the position cursor in the input field.

In the example described above, a "Reply" command icon associated with the "Reply" command is displayed when the touch gesture is performed on the "R" key, a "Reply All" command icon associated with a "Reply All" command is displayed when the touch gesture is performed on the "L" key, a "Forward" command icon associated with a "Forward" command is displayed when the touch gesture is performed on the "F" key, a "Send" command icon associated with the "Send" is displayed when the touch gesture is performed on the "S" key (or possibly "Enter" key), a "Next Message" command icon associated with the "Next Message" is displayed when the touch gesture is performed on the "N" key, a "Previous Message" command icon associated with a "Previous Message" command is displayed when the touch gesture is performed on the "P" key, "Delete" command icon associated with the "Delete" command is displayed when the touch gesture is performed on the "Backspace" key.

In a navigating or browsing context, in some examples, the "N" key may be associated with a "Next Page" command for displaying a next page of content, "P" key may be associated with a "Previous Page" command for displaying a previous page of content, the "T" key may be associated with a "Top" command which displays a top portion of a currently displayed item (e.g., web page, document, list, electronic message etc.), the "B" key may be associated with a "Bottom" command which displays a bottom portion of the currently displayed item, or any combination thereof. Accordingly, a "Next Page" command icon associated with the "Next page command is displayed when the touch gesture is performed on the "N" key, a "Previous Page" command icon associated with the "Previous Page" command is displayed when the touch gesture is performed on the "P" key, a "Top" command icon associated with the "Top" command is displayed when the touch gesture is performed on the "T" key, and a "Bottom" command icon associated with the "Bottom" command is displayed when the touch gesture is performed on the "B" key.

Other keys may be associated with a command (a so-called key-command assignment), and may have a peek gesture associated with it in a similar manner to the example commands described above. The commands associated with the keys may be context dependent, for example, depending on an active mode or open application.

The virtual keyboard 2120 is typically displayed or invoked automatically in response to the display or selection of a text entry field. In some examples, the virtual keyboard 2120 may be toggled between a hidden state and a shown state in response to respective input such as, but not limited to, an onscreen virtual keyboard toggle button. In some examples, the virtual keyboard 2120 may be displayed or invoked out-of-context when no text entry field is present to permit the peek gestures and associated shortcuts for executing commands to be used. The associated shortcuts may be faster and more intuitive for some users compared with navigating a menu or other graphical user interface element to select the appropriate command. For example, users familiar with shortcuts on a device with a physical keyboard may be familiar with certain key-command associations and may be able to execute commands more quickly using the key-command associations via the virtual keyboard 2120, even if the virtual keyboard 2120 has to be invoked to access the keys and activate the shortcut commands. Advantageously, this solution can be used to leverage shortcuts conventionally used in devices having physical keyboards in a virtual way.

The visual cues described above are believed to have potential advantages in several respects which provide a more natural interaction with the device. Offsetting visual cues based on the input direction of the touch input, reduces or eliminates obscuring of the visual cue by an input implement (e.g., finger or stylus) and facilities interaction with the visual cue (e.g., tooltip). Moreover, in some instances, the visibility of the touch input feedback to the user may be improved. Providing more natural interaction with the device involves identifying efficient interactions (such as gestures) which are relatively easy to perform, relatively easy to remember, have discoverability which allows users to "discover" functions during normal use without formal training, and which can be differentiated from other interactions (such as gestures) by users (and by the device) relatively easily. Arbitrary or poorly considered interaction-action assignments (e.g., gesture-action assignments) tend to create awkward and unnatural user experiences which make the required interaction harder to perform, harder to remember, undiscoverable (or at least less discoverable), and harder to differentiate from other interactions by users.

Unlike a conventional physical keyboard, a virtual keyboard presents an opportunity for shortcuts, hot keys or other commands to be discovered by the user. This allows users to "discover" functions during normal use without formal training. The specific interaction-action assignments described herein are also believed to be relatively easy to perform, relatively easy to remember, have good discoverability, and which can be differentiated from other interactions by users (and by the device) relatively easily.

Figure 31:
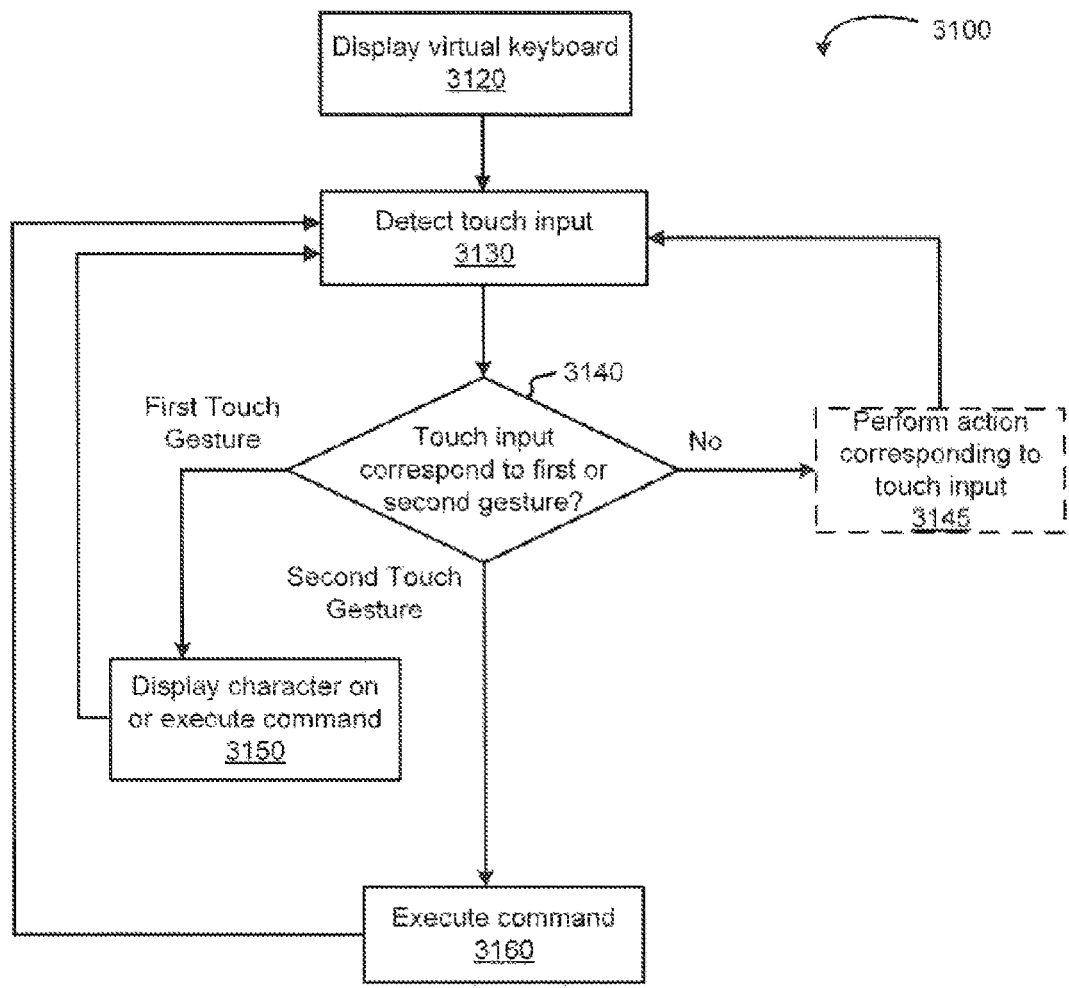
FIG. 31 is a flowchart illustrating an example method, consistent with embodiments disclosed herein.

FIG. 31 is a flowchart of a method 3100 for input using a virtual keyboard rendered on a display of an electronic device 100 in accordance with one example embodiment of the present disclosure. The virtual keyboard has at least two input states but could have more than two input inputs. The method 3100 may be carried out, at least in part, by firmware or software executed by the processor 102. Coding of software for carrying out such a method 3100 is within the scope of a person of ordinary skill in the art provided the present disclosure. The method 3100 may contain additional or fewer processes than shown and/or described, and may be performed in a different order. Computer-readable code executable by the processor 102 to perform the method 3100 may be stored in a computer-readable medium such as the memory 110.

At 3120, a virtual keyboard is rendered and displayed on the touch-sensitive display 118. The virtual keyboard may be displayed automatically when an input field is displayed or may be called or invoked, for example, in response to corresponding input (such as activation of a keyboard button or icon). The virtual keyboard includes a plurality of keys including a plurality of character keys as previously described. Each key in the plurality of character keys corresponds to a character in an input character set. The input character set, in at least some examples, is an English alphanumeric character set. The plurality of character keys are arranged in a familiar QWERTY layout in the shown example but may be arranged in another suitable format in other examples. The virtual keyboard may be arranged in the same or similar configuration to those described above.

At block 3130, a touch input is detected on the touchscreen 118 at a location associated with a key.

At block 3140, the electronic device 100 determines a type of touch gesture of the detected touch input. In some examples, the electronic device 100 determines whether the touch input is a first type of gesture input or a second type of gesture. In some examples, the first type of gesture is a tap on or near the key and the second type of gesture is a swipe in a particular direction (e.g., down swipe) which has an initial contact point on or near the key.

At block 3150, when the touch input is a first type of gesture, a first input associated with the key is input. When the key is a character key, the first input is character input which corresponds to a character displayed in the key in the virtual keyboard. For example, tapping a character key inputs a character from an input character set associated with the key. The first input may be a command when the key is a non-character key (e.g., function key).

At optional block 3145, the electronic device 100 may perform an action if the touch input does not correspond to either the first touch gesture or second touch gesture but does correspond to other designated input (such as a third touch gesture). The action could be input of an alternative character or execution of an alternative command different than that associated with the first touch gesture and second touch gesture for the particular key.

At block 3160, when the touch input is a second type of gesture and a command is associated with the key and the second type of gesture, the command associated with the key is executed by the electronic device 100 is executed by the electronic device 100. Unlike the previously described example in FIG. 29, no visual cue of the command is provided.

In a messaging context, in some examples, the "R" key may be associated with the "Reply" command, the "L" key may be associated with the "Reply All" command, the "F" key may be associated the "Forward" command, the "S" key may be associated the "Send" command to send an open message under composition, the "N" key may be associated with the "Next Message" commands the "N", the "P" key may be associated with the "Previous Message" command, or any combination thereof. Alternatively, the "Send" command may be associated with the "Enter" key. In a text entry mode, which may be in a messaging context, the "Backspace" key may be associated with the "Delete" command.

In a navigating or browsing context, in some examples, the "N" key may be associated with the "Next Page", the "P" key may be associated with the "Previous Page" commands, the "T" key may be associated with the "Top" command, the "B" key may be associated with the "Bottom" command, or any combination thereof.

Other keys may be associated with a command (a so-called key-command assignment) in a similar manner to the example commands described above. The commands associated with the keys may be context dependent, for example, depending on an active mode or open application.

While the various methods of the present disclosure have been described in terms of functions shown as separate blocks in the Figures, the functions of the various blocks may be combined during processing on an electronic device. Furthermore, some of the functional blocks in the Figures may be separated into one or more sub steps during processing on an electronic device.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. All changes that come within the meaning and range of equivalency of the claims are intended to be embraced within their scope.

The invention claimed is:

1. A method for providing visual cues rendered on a display, comprising:
   detecting a touch input associated with a user interface element rendered on the display;
   determining an input direction of the touch input from a contact point for the touch input and an additional input derived from signals reflecting a continuous contact with the display and a movement of the contact point, the input direction being a direction with respect to the display from which the touch input is provided; and
   displaying on the display a visual cue associated with the user interface element, wherein the visual cue is located at a position near the user interface element and is offset to a direction opposite the input direction of the touch input.

2. The method of claim 1, wherein displaying the visual cue comprises displaying a command icon of a command associated with the user interface element when a direction of a touch gesture of the touch input corresponds to a peek gesture.

3. The method of claim 2, further comprising:
   executing the command associated with the user interface element in response to a trigger.

4. The method of claim 2, wherein a "reply" command icon associated with a reply command is displayed when the user interface element is a "R" key, a "reply all" command icon associated with a reply all command is displayed when the user interface element is an "L" key, a "forward" command icon associated with a forward command is displayed when the user interface element is an "F" key, and a "send" command icon associated with a send command for sending an open message under composition when the user interface element is an "S" key.

5. The method of claim 1, wherein displaying the visual cue comprises displaying an alternate character associated with the user interface element when a direction of a touch gesture of the touch input corresponds to a peek gesture.

6. The method of claim 5, further comprising:
   inputting the alternate character associated with the user interface element in response to a trigger.

7. The method of claim 1, wherein the user interface element is a key of a virtual keyboard rendered on the display.

8. An electronic device, comprising:
   a touch-sensitive display;
   a processor configured to:
   detect a touch input associated with a user interface element rendered on the display;
   determine an input direction of the touch input from a contact point for the touch input and an additional input derived from signals reflecting a continuous contact with the display and a movement of the contact point, the input direction being a direction with respect to the display from which the touch input is provided; and display on the display a visual cue associated with the user interface element, wherein the visual cue is located at a position near the user interface element and is offset to a direction opposite the input direction of the touch input.

* * * * *